US010121061B2

(12) United States Patent
Dickinson et al.

(10) Patent No.: US 10,121,061 B2
(45) Date of Patent: Nov. 6, 2018

(54) IMAGE CAPTURE, PROCESSING AND DELIVERY AT GROUP EVENTS

(71) Applicant: SocialVenu, Inc., Oakland, CA (US)

(72) Inventors: William Dickinson, San Diego, CA (US); Daniel Magy, Encinitas, CA (US); Marco Correia, San Diego, CA (US)

(73) Assignee: SocialVenu, Inc., Oakland, CA (US)

( * ) Notice: Subject to any disclaimer, the term of this patent is extended or adjusted under 35 U.S.C. 154(b) by 0 days.

(21) Appl. No.: 15/720,624

(22) Filed: Sep. 29, 2017

(65) Prior Publication Data

US 2018/0025220 A1 Jan. 25, 2018

Related U.S. Application Data

(63) Continuation of application No. 14/654,485, filed as application No. PCT/US2013/076757 on Dec. 19, 2013.

(Continued)

(51) Int. Cl.
*G06K 9/00* (2006.01)
*H04N 5/232* (2006.01)
(Continued)

(52) U.S. Cl.
CPC ..... *G06K 9/00302* (2013.01); *G06K 9/00778* (2013.01); *H04N 5/2259* (2013.01);
(Continued)

(58) Field of Classification Search
None
See application file for complete search history.

(56) References Cited

U.S. PATENT DOCUMENTS 5,598,208 A 1/1997 McClintock
5,729,471 A 3/1998 Jain et al.
(Continued)

FOREIGN PATENT DOCUMENTS

JP 2006-174195 6/2006
JP 2007-142896 6/2007
(Continued)

OTHER PUBLICATIONS

International Search Report and Written Opinion dated Apr. 3, 2014 for International Application No. PCT/US2013/076757, filed Dec. 19, 2013 (11 pages).

(Continued)

*Primary Examiner* — Atiba O Fitzpatrick
(74) *Attorney, Agent, or Firm* — Perkins Coie LLP

(57) ABSTRACT

Methods, systems, and devices are disclosed for image acquisition and distribution of individuals at large events. In one aspect, a method for providing an image of attendees at an event includes operating one or more image capturing devices to record images of attendees of an event situated at locations in an event venue, processing the images to form a processed image, and distributing the processed image to the individual. The processing includes mapping the locations to a grid including coordinates corresponding to pre-determined positions associated with the event venue, defining an image space containing an individual at a particular location in the event venue based on the coordinates, and forming the processed image based on the image space.

20 Claims, 37 Drawing Sheets

Related U.S. Application Data

(60) Provisional application No. 61/739,586, filed on Dec. 19, 2012.

(51) Int. Cl.

| | | |
|---|---|---|
| *H04N 7/18* | (2006.01) | |
| *H04N 5/225* | (2006.01) | |
| *H04N 21/81* | (2011.01) | |
| *H04N 21/4788* | (2011.01) | |
| *H04N 21/2187* | (2011.01) | |
| *H04N 21/218* | (2011.01) | |
| *G08B 13/196* | (2006.01) | |

(52) U.S. Cl.
CPC ..... *H04N 5/23206* (2013.01); *H04N 5/23212* (2013.01); *H04N 7/181* (2013.01); *H04N 7/188* (2013.01); *H04N 21/2187* (2013.01); *H04N 21/21805* (2013.01); *H04N 21/4788* (2013.01); *H04N 21/8153* (2013.01); *G08B 13/1963* (2013.01)

(56) References Cited

U.S. PATENT DOCUMENTS

| | | | |
|---|---|---|---|
| 6,532,345 B1* | 3/2003 | Gluck | G03B 17/00 348/157 |
| 6,698,943 B2 | 3/2004 | Gluck | |
| 7,077,581 B2 | 7/2006 | Gluck | |
| 7,301,558 B2 | 11/2007 | Gluck | |
| 7,321,387 B2 | 1/2008 | Novais et al. | |
| 7,607,843 B2 | 10/2009 | Gluck | |
| 7,683,937 B1 | 3/2010 | Blumenfeld | |
| 7,800,646 B2* | 9/2010 | Martin | G06F 17/30247 348/143 |
| 7,876,352 B2 | 1/2011 | Martin | |
| 8,169,492 B2 | 5/2012 | Blumenfeld | |
| 8,321,231 B2 | 11/2012 | Torrens-Burton | |
| 8,358,345 B1 | 1/2013 | Fiore et al. | |
| 8,442,922 B2 | 5/2013 | Martin | |
| 8,643,746 B2 | 2/2014 | Karn et al. | |
| 2003/0023452 A1* | 1/2003 | Novais | G06Q 30/02 348/211.11 |
| 2003/0086123 A1* | 5/2003 | Torrens-Burton | H04N 1/00132 358/402 |
| 2005/0031335 A1 | 2/2005 | Itzkowitz | |
| 2005/0286640 A1 | 12/2005 | Gaylord | |
| 2006/0056832 A1 | 3/2006 | Yamaguchi et al. | |
| 2006/0235765 A1 | 10/2006 | David | |
| 2006/0274166 A1 | 12/2006 | Lee et al. | |
| 2007/0154113 A1 | 7/2007 | Chang et al. | |
| 2007/0214180 A1 | 9/2007 | Crawford | |
| 2007/0236595 A1 | 10/2007 | Pan et al. | |
| 2008/0129825 A1 | 6/2008 | Deangelis et al. | |
| 2009/0232354 A1 | 9/2009 | Camp, Jr. et al. | |
| 2009/0284601 A1 | 11/2009 | Eledath et al. | |
| 2010/0026811 A1 | 2/2010 | Palmer | |
| 2010/0110195 A1 | 5/2010 | McIntosh | |
| 2010/0214398 A1 | 8/2010 | Goulart et al. | |
| 2010/0238351 A1 | 9/2010 | Shamur et al. | |
| 2011/0055045 A1 | 3/2011 | Smith et al. | |
| 2011/0115930 A1 | 5/2011 | Kulinets et al. | |
| 2011/0119743 A1 | 5/2011 | Gleim et al. | |
| 2012/0002054 A1 | 1/2012 | Ohkawa et al. | |
| 2012/0069131 A1 | 3/2012 | Abelow | |
| 2012/0123830 A1 | 5/2012 | Svendsen et al. | |
| 2012/0162436 A1 | 6/2012 | Cordell et al. | |
| 2012/0230540 A1 | 9/2012 | Calman et al. | |
| 2012/0233000 A1 | 9/2012 | Fisher et al. | |
| 2013/0014142 A1 | 1/2013 | Newell | |
| 2015/0062334 A1 | 3/2015 | Dickinson et al. | |
| 2016/0205358 A1 | 7/2016 | Dickinson | |

FOREIGN PATENT DOCUMENTS

| | | |
|---|---|---|
| WO | 2008138144 | 11/2008 |
| WO | 2010075430 | 7/2010 |

OTHER PUBLICATIONS

International Search Report and Written Opinion dated Jan. 16, 2015 for International Application No. PCT/US2014/053598, filed Aug. 29, 2014 (12 pages).

International Search Report and Written Opinion dated May 26, 2015 for International Application No. PCT/US2015/015071, filed Feb. 9, 2015 (17 pages).

International Search Report and Written Opinion dated Nov. 5, 2014 for International Application No. PCT/US2014/043272, filed Jun. 19, 2014 (10 pages).

Australian Exam Report for Application No. 2013361214, dated Jun. 2, 2017 (4 pages).

Canadian Office Action for Application No. 2,895,537 dated Jan. 7, 2016 (5 pages).

Canadian Office Action for Application No. 2,895,537 dated Jul. 14, 2016 (4 pages).

Supplementary European Search Report for Application No. 13865812, dated Jun. 27, 2016 (9 pages).

Chinese Office Action for Application No. 201380073389.6, datd Jan. 19, 2018, with translation (21 pages).

USPTO Non-Final Office Action for U.S. Appl. No. 14/915,184, dated Jun. 29, 2018 (20 pages).

* cited by examiner

IMAGE CAPTURE, PROCESSING AND DELIVERY AT GROUP EVENTS

CROSS-REFERENCE TO RELATED APPLICATIONS

This patent document is a continuation of U.S. patent application Ser. No. 14/654,485, filed on Jun. 19, 2015, which is a 35 U.S.C. § 371 National Stage application of International Application No. PCT/US2013/076757, filed on Dec. 19, 2013, which claims the benefit of priority of U.S. Provisional Patent Application No. 61/739,586, filed on Dec. 19, 2012. The entire contents of the above patent applications are incorporated by reference as part of the disclosure of this patent document.

TECHNICAL FIELD

This patent document relates to systems, devices, and processes for image capture, processing and delivery to various users at group events including attendees at sporting events and entertainment events.

BACKGROUND

Group events typically bring large crowds of people to event venues for watching live activities or performances, often to the enjoyment of the spectator. During various group events, particularly large group events including sports or concerts, the reactions of individuals watching the live performances can be highly animated. A photograph taken at such an event may provide the individual with pleasant memories of the event.

Photos are becoming more commonly shared through social media using online social networks. An online social network is an online service, platform, or site that focuses on social networks and relations between individuals, groups, organizations, etc., that forms a social structure determined by their interactions, e.g., which can include shared interests, activities, backgrounds, or real-life connections. A social network service can include a representation of each user (e.g., as a user profile), social links, and a variety of additional services. For example, user profiles can include photos, lists of interests, contact information, and other personal information. Online social network services are web-based and provide means for users to interact over the Internet, e.g., such as private or public messaging, e-mail, instant messaging, etc. Social networking sites allow users to share photos, ideas, activities, events, and interests within their individual networks.

SUMMARY

Techniques, systems, and devices are disclosed for implementing an image-capture, processing and delivery system to obtain the reaction images of individuals at large events, e.g., including sports games, and to provide a crowd sourced security system.

In one aspect, a method for providing an image of attendees at an event includes operating one or more image capturing devices to record images of attendees of an event situated at locations in an event venue, processing the images to form a processed image, and distributing the processed image to the individual. The processing includes mapping the locations to a grid including coordinates corresponding to predetermined positions associated with the event venue, defining an image space containing an individual at a particular location in the event venue based on the coordinates, and forming the processed image based on the image space.

Implementations of the method can optionally include one or more of the following features. For example, the event venue can include at least one of a stadium, an arena, a ballpark, an auditorium, a music hall, an amphitheater, a building to host the event, or an outdoor area to host the event. For example, the attendees can include fans or spectators at a sporting event. For example, the predetermined positions can include seating in the event venue. In some implementations of the method, for example, the operating the one or more image capturing devices can include manually triggering them to record the images at an operator-selected instance based on an occurrence of the event. In some implementations of the method, for example, the operating the one or more image capturing devices can include automatically triggering them to record the images based on at least one of sound, visual stimulus, or mechanical perturbation generated at the event venue. In some implementations of the method, for example, the operating the one or more image capturing devices can include temporally capturing a series of images of the attendees after one of a manual triggering or an automatic triggering of the one or more image capturing devices. For example, the series of images can be captured at a speed of at least two images per second. For example, the one or more image capturing devices can be automated to record the images by continuously panning in one or both of horizontal and vertical directions along a predetermined trajectory to capture the series of images with a predetermined focusing of the locations in the event venue. For example, the one or more image capturing devices can be automated to record the images by moving to and stopping at a plurality of imaging positions along a predetermined trajectory to capture the series of images while stopped at the corresponding imaging position, in which the one or more image capturing devices are configured to have a predetermined focusing of the locations in the event venue. For example, the one or more image capturing devices can be configured to have a predetermined focusing of the locations in the event venue. In some implementations of the method, for example, the forming the processed image based on the image space can include producing a segmented image. For example, the producing the segmented image can include cropping at least one of the recorded images to a size defined by the image space. For example, the producing the segmented image can further include overlapping two or more of the recorded images to form a merged image. In some implementations of the method, for example, the distributing can include wirelessly transmitting the processed image to a mobile device of the individual. In some implementations, for example, the method can further include producing a graphical user interface on the mobile device to present the processed image to the individual. For example, the graphical interface can also presents event-related content with the processed image. For example, such event-related content can include information associated with the event and an image of an occurrence of the event, in which the occurrence temporally corresponds to the processed image. For example, the graphical interface can include an interface to report a security-related incident to authorities at the event venue. In some implementations of the method, for example, the processing the images can further include attaching meta data with image data of the processed image, in which, in some examples, can provide links to external websites as part of the processed image. In some implementations, for example, the method further includes wirelessly transmitting a message to prompt the individual of the event to provide location information via the graphical user interface on the mobile device.

In another aspect, an imaging service system includes a plurality of cameras arranged in an event venue to capture images of attendees at an event corresponding to an occurrence of the event, a trigger module in communication with the plurality of cameras to initiate the capture of the images, and one or more computers in communication with the cameras to receive the captured images and provide coordinates to the captured images that correspond to locations in the event venue to associate individuals among the attendees to respective locations in the event venue.

Implementations of the imaging service system can optionally include one or more of the following features. For example, the captured images of the attendees display one or more attendees' reaction to the occurrence of the event. For example, the event venue can include at least one of a stadium, an arena, a ballpark, an auditorium, a music hall, an amphitheater, a building to host the event, or an outdoor area to host the event. For example, the attendees can include fans or spectators at a sporting event. For example, the locations can correspond to seating in the event venue. For example, the plurality of cameras are arranged in the event venue to capture the images of the attendees at multiple directions. For example, the plurality of cameras can temporally capture a series of images of the attendees. In some implementations of the system, for example, the one or more computers can form a processed image of an individual or individuals proximate the location of the individual using the coordinates. In some implementations of the system, for example, the one or more computers can distribute the processed image to the individual using wireless communication to a mobile device of the individual. For example, the one or more computers can send the processed image to a social network site. For example, the one or more computers can allow purchase of the processed image by the individual. In some implementations of the system, for example, the trigger module can be a manual trigger to initiate the capture of the images at an operator-selected instance based on the occurrence of the event. In some implementations of the system, for example, the trigger module can be an automatic trigger to initiate the capture of the images based on a detection of at least one of a sound, visual stimulus, or mechanical perturbation at the event. In some implementations, for example, the system can further include a plurality of lighting devices to direct light at selected sections of the event venue corresponding to sections where the plurality of cameras capture the images, in which the lighting devices are in communication with the trigger module and configured to emit light when triggered on the selected sections to be imaged. For example, the plurality of lighting devices can be configured to direct the light at the selected sections with angles corresponding to imaging angles formed between the camera and the section to be imaged.

In another aspect, an imaging system for providing images of attendees at an event includes a plurality of cameras arranged in an event venue to capture images of attendees at an event corresponding to an occurrence of the event, and one or more computers in communication with the cameras to receive the captured images and provide coordinates to the captured images that correspond to locations in the event venue to associate individuals among the attendees to respective locations in the event venue, in which the captured images of the attendees display one or more attendees' reaction to the occurrence of the event.

Implementations of the system can optionally include one or more of the following features. In some implementations, for example, the system can further include a trigger module in communication with the plurality of cameras to initiate the capture of the images. In some implementations, for example, the system can further include a plurality of lighting devices to direct light at selected sections of the event venue corresponding to sections where the plurality of cameras capture the images, in which the lighting devices are in communication with the trigger module and configured to emit light when triggered on the selected sections to be imaged. For example, the trigger module can be a manual trigger to initiate the capture of the images at an operator-selected instance based on the occurrence of the event. For example, the trigger module is an automatic trigger to initiate the capture of the images based on a detection of at least one of a sound, visual stimulus, or mechanical perturbation at the event. For example, the event venue can include at least one of a stadium, an arena, a ballpark, an auditorium, a music hall, an amphitheater, a building to host the event, or an outdoor area to host the event. For example, the attendees can include fans or spectators at a sporting event. For example, the locations can correspond to seating in the event venue. For example, the plurality of cameras are arranged in the event venue to capture the images of the attendees at multiple directions. For example, the plurality of cameras can temporally capture a series of images of the attendees. In some implementations of the system, for example, the one or more computers can form a processed image of an individual or individuals proximate the location of the individual using the coordinates. In some implementations of the system, for example, the one or more computers can distribute the processed image to the individual using wireless communication to a mobile device of the individual. For example, the one or more computers can send the processed image to a social network site. For example, the one or more computers can allow purchase of the processed image by the individual.

In another aspect, a method for providing crowd sourcing for security at an event includes operating one or more image capturing devices to capture images of attendees of an event situated at locations in an event venue, processing the captured images to form security reference images, in which the processing includes mapping the locations of the attendees in the captured images to a grid including coordinates corresponding to predetermined positions associated with the event venue, distributing at least one of the security reference images to at least some of the attendees, receiving a message from an attendee identifying at least one of a position or an object in the security reference image, in which the message indicates an alleged disturbance in the event venue, processing the message to determine the location of the alleged disturbance using the identified position or object in the security reference image, and providing an alert message to an authority associated with the event to alert the authority of the alleged disturbance, the alert message including the determined location.

Implementations of the crowd sourcing security method can optionally include one or more of the following features. For example, the one or more image capturing devices can be configured to capture the images of attendees at one or more instances prior to and during the event. For example, each of the security reference images can be associated with a particular section or sections of the event venue. In some implementations of the method, the processing can further include defining an image space based on a particular location in the event venue using the coordinates, and segmenting the captured images to a size defined by the image space to form a reduced-size security reference image. In some implementations of the method, for example, the distributing can include wirelessly transmitting the security reference images to a mobile device of the attendee. For example, the message received from the attendee can be an anonymous message.

The subject matter described in this patent document can be implemented in specific ways that provide one or more of the following features. For example, some implementations of the disclosed technology includes a hardware and software system and a user interface, e.g., for capturing, processing, distributing and viewing images of crowds during large events. The hardware system can include digital cameras and imagers that are used to rapidly capture attendees of the crowd at an event, e.g., in short periods of time, during specific moments of the event. A variety of mechanisms can be used to adjust the camera-viewing/imaging angle and ensure the images captured are of the correct subject and the image quality and capture speed is high. For example, the captured images can be processed using attendee location information and predetermined locations of the event venue, e.g., including mapping the images to a grid. In some implementations, for example the image processing can include segmenting, overlapping, and/or dividing the captured images. For example, the processed images can be packaged so the individuals in the crowd can easily and rapidly obtain their photograph. The exemplary packaging system can also provide a tool in which individuals can drop indicators on the images to identify other people in the crowd, e.g., based on the grids. The content generated by this hardware and software systems can be viewed in an interface that combines event-related content with images captured during a moment that generates reactions by the attendees, in which such combined is presented and displayed to a user in real-time during or after the event it in a specific manner.

DETAILED DESCRIPTION

Figure 1:
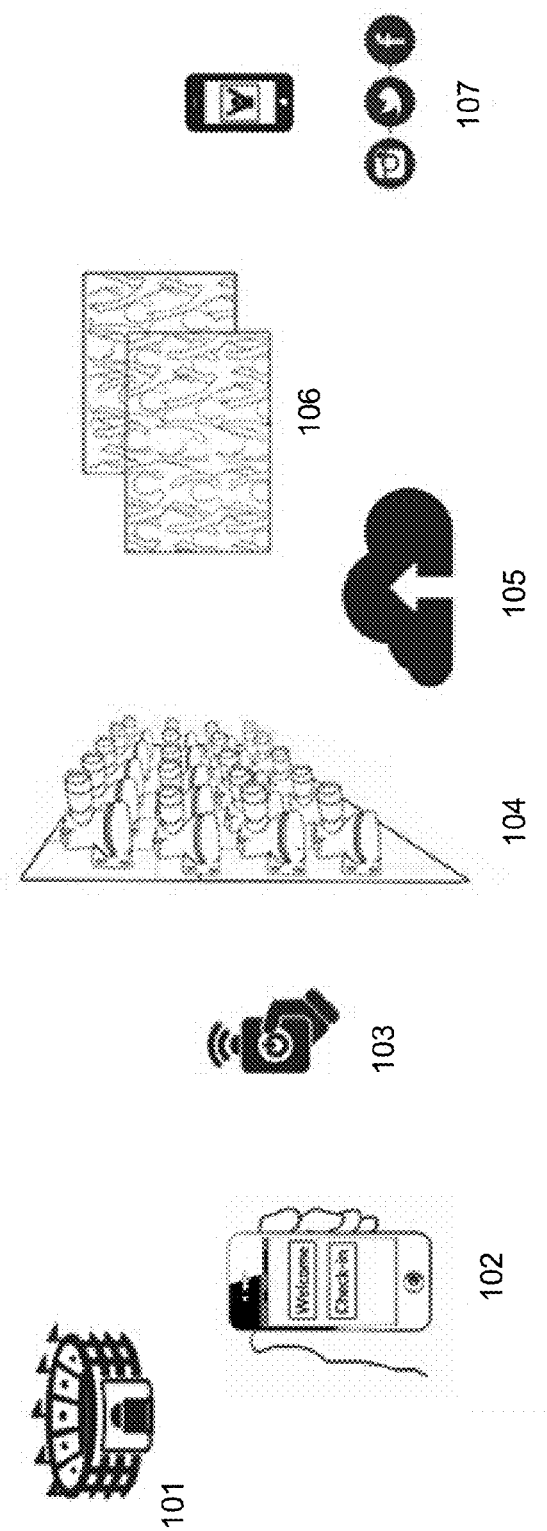
FIG. 1 shows a diagram illustrating a user experience using the disclosed image capture, processing, and delivery technology.

During various group events, particularly large group events including sports or concerts, the reactions of individuals watching the live performances are highly animated. A photograph of these situations provides a unique and yet highly beneficial and desired memento or keepsake for a spectator, especially if the image can be captured at a precise moment, tailored to remind the spectator of that specific moment, and easily and rapidly obtained. However, to achieve this, there are many technical difficulties. For example, some main issues or difficulties include capturing the image or images in a short period of time and at just the right moment, capturing the image or images in focus of the individual spectator and/or group of spectators in the context of the moment, preparing the captured image or images so they can be easily and rapidly accessed, e.g., such as delivering the image or images directly to the user and/or integrating the image content and/or the image or images into a social network, e.g., particularly a social network with a series of specific mechanisms with a unique interface.

One of the easiest forms of communication is through photos. Photos capture and convey special moments, and sharing them is a way to show others that moment. Images form the core of an interactive social media network. Today, large social networks users are starting to experience social media fatigue. For example, large social network users can have too many friends who share information they are not interested in, and thus there is an opportunity for smaller, niche social networks focusing on a specific interest. As the social media market continues to segment, users may no longer spend a majority of time on one network and instead may visit a number of smaller networks that are more in line with their interests. The disclosed technology can be used to address this social networking shift, e.g., such as providing a sports specific social network.

Techniques, systems, and devices are disclosed for rapid acquisition, processing, and delivery of images that capture the reaction images of individuals at group events, e.g., including, but not limited to, large events such as sports games, concerts, etc. The disclosed techniques, systems, and devices can also be implemented to provide a crowd sourced security system.

The disclosed technology can include a platform to capture photos of individuals at an event and process and distribute the photos to users of the platform. For example, a series of images can be taken and made available rapidly, providing a virtual layout of the individuals in the crowd during the event. When shared, the photos show images of users enjoying themselves, which is an entirely new medium through which fans and advertisers/brands can interact with one another. Also, this allows a unique security function for other crowd members to highlight any issues caused by other individuals. For example, using a mobile application, a user can visually identify (e.g., using their image as a reference) the inappropriate individual and give a reason to why they are raising this issue. This can alert event security staff and can provide an image and pre-mapped seat number of the accused perpetrator.

In some aspects, the disclosed technology includes a camera system that captures images of individuals in a crowd during time periods of an event at an event venue, e.g., in which the time periods can be associated with crowd reactions to instances, moments, or occurrences of the event. For example, the camera system can include one or more camera devices or modules configured in the event venue to capture one or more images of locations corresponding to predetermined positions (e.g., seats, aisles, sections, sky boxes, locations the field, court, etc.) in the event venue. The disclosed technology includes a processing system that processes the captured images to produce one or more processed images corresponding any individual in the crowd (e.g., based on the predetermined positions) during the captured time period showing the individual's reaction for the associated instance, moment, or occurrence of the event. In some implementations, the processing system can distribute the processed images to the individuals via an application on a mobile device.

The disclosed camera system can include a trigger system to activate the camera devices or modules to take the images. For example, the trigger system can be activated manually, e.g., by an on-site person at the event venue or remotely by an off-site person viewing the event live from an off-site facility. For example, the trigger system can be used to trigger individual or multiple designated modules or devices of the camera system.

The disclosed camera system can be configured to upload the images to a server from which the individuals can access their own images. For example, the disclosed technology includes an image content management system that allows the individuals to share their images on social networks.

In some implementations, the camera system can include static cameras focused on specific sections of the crowd (e.g., the predetermined positions).

In some implementations, the camera system can include the one or more camera devices or modules in a panning system that captures images while moving. For example, the cameras in the panning system can be configured such that the focus is pre-set to change as it pans and is timed to be at an optimum focus when an image is taken.

The disclosed camera system can include a mechanism to rapidly move the one or more camera devices or modules to focus on a specific area of the crowd and then stop it to take an image, e.g., which can continue for a series of images. For example, the camera can be a DSLR camera with a telephoto lens, which is attached to a stepper motor to rapidly change the camera angle and stop to take an image and then move to the next position to capture the next image in the series. For example, the camera can be configured with a pre-set focus to change as it pans and is timed to be at an optimum focus when an image is taken, e.g., when stopped. The camera system can include a mechanism (e.g., such as another stepper motor attached to the camera) to adjust the camera angle along a different axis, in which the movements (e.g., of the motors) are timed together. In some examples, the mechanism can be configured such that a physical blocking mechanism accurately stops the camera moving mechanism. In other examples, the mechanism can be configured such that a friction mechanism accurately stops the camera moving mechanism. For example, the mechanism can be configured such that elastic tension is used to act as the camera moving mechanism. For example, the mechanism can be configured such that a spring force is used to act as the camera moving mechanism. For example, the mechanism can be configured such that gas or liquid injection is used to act as the camera moving mechanism. In some examples, the one or more camera devices or modules are triggered by the stopping/stabilization movement mechanism, in which the image can be captured when the camera is static and stabilized, and once the image has been taken, this relays to the camera moving mechanism so that the next movement can occur. In some implementations, once the series of images has been taken, the camera moving mechanism can return the camera devices or modules to their original position and ready the devices to be retriggered. In some implementations, once the series of images has been taken, the camera moving mechanism of the camera system can stay in the finished position so that when the system is next triggered, the images are taken in the reverse manner.

In some implementations, the one or more camera devices or modules of the camera system can focus into a mirror such that the mirror changes angle to adjust the section of the crowd being captured. In some implementations, the one or more camera devices or modules of the camera system can be attached to one or more vibration platforms to prevent shaking of the environment in which they are housed. In some implementations, a gyro can be used to pre-gauge how much overshoot or shake a movement causes when stopping and stabilizing, in which the gyro can then cancel out the movement, e.g., using pre-set calibrations to balance the over/undershoot movement, e.g., using precise timings. For example, an external counterbalance can be used to cancel out the over/undershoot.

The disclosed processing system can be configured to label each captured image corresponding to the what section of the crowd for which it was captured and to what instance, moment, or occurrence for which it was captured (e.g., the camera system was triggered). For example, the processing system can attach the label to pre-made grids, e.g., specific to the section of the crowd of which the image was captured. For example, the processing system can form the processed images corresponding to defined sections (e.g., by assigning sections to the grid for a particular location) to include a particular individual that is coded to his/her location in the event venue, e.g., in which the processed image can be sent to the individual. For example, the individuals can use a mobile device, via an application, to access the images. For example, the processed images can be sent to the particular individual's mobile device, e.g., via the application. For example, the particular individual can be displayed as part of the image they are in. In some implementations, the disclosed processing system can be configured to label the images taken, and specific grids are added to these specific labels.

In some implementations, described system can include an image flow from the camera system to a cloud or laptop then cloud or laptop to a mobile device. For example, the individuals can request these images by providing the details of their specific area or location during the event. The processing system can pool the captured images together for each set of images taken of the individual. For example, this can allow these images to be accessed together by using coordinates of the predetermined positions to quickly direct the user to the correct image locations or by moving the segmented images to a separate location to be viewed in sequence. In some implementations, the captured images can be connected to specific information of the moment captured. For example, the captured images can be connected to specific images of the event moment. In some examples, the images can be captured to include a slight overlapping area, in which the processing system processes the areas to be split into sections, thereby producing a choice depending on individual's location that ensures that when an image is requested, a cropped image isn't displayed/delivered. For example, the captured images can be instantly overlaid on other images.

The described system can also be utilized for crowd source security using the captured images by the camera system. For example, in some implementations, the camera system can capture images of the crowd rapidly, e.g., and the captured images can be provided to the attendees at the event, e.g., via their mobile device, to aid event security. The exemplary crowd source security system can utilize the grid to reference the images taken. For example, the exemplary crowd source security system can send a reference image to attendees displaying their location in order to locate other individuals in the crowd, e.g., including images taken prior to the start of the event or at intermittent instances during the event. For example, the exemplary system can send the attendees their location displayed in real time, e.g., based on a request, in order to locate other individuals in the crowd. The attendees can drop identifying markers or tags on other individuals. For example, the attendees can choose from a list of reasons to why they were identifying another individual, e.g., such as 'disturbing other attendees', or the attendees can write a statement to why they were identifying an individual. The exemplary crowd source security system can send an image of the accused individual to event security staff. For example, a dropped marker can be included on the image sent to event security staff that is associated with a seating or position information of the accused individual (e.g., based on the location grid) so that that seat or location is now identified. The exemplary crowd source security system can be configured such that only a selected group of the total event staff are sent notifications of images and/or seat locations of the accused individual(s), e.g., the selected group corresponding to a specific section of the event that they are working in. The exemplary crowd source security system can be configured to notify users that are located (e.g., checked-in) close to the accused individual(s) to confirm or disconfirm the allegations.

The described system can also include a user interface implemented in a software and/or mobile application ('app') or Internet site such as a web portal and executed on a variety of devices to be operated by one or more types of various users.

In some implementations, the user interface can implemented on a mobile device as a mobile device application or website accessed on a browser on the mobile device that receives image content, e.g., the processed image from the processing system. For example, the user interface can use a user's mobile device location signal to display the event they are attending. For example, the user interface can use a user's mobile device location signal and time of the event to notify the user to access the application content and/or after the event to access the application content. For example, the user interface can use a user's mobile device to store the user's location at the event so that the content can be sent or accessed later. For example, users can specify their exact location or seating during the event so that a specific image, or series of images, can be sent to the user after they have been captured. For example the series of images can be of the same moment or of different moments of the event. For example, the user interface can include a user profile to store user data, e.g., including location or seat number for a series of events or a season.

In some implementations, for example, the user interface can be operated by the individual such that the individual can choose the image he/she desires and a size or portion (e.g., how much of the photograph) desired within that image, in which the size can be reduced by cropping it. The user interface can include linking the crowd content images to images of the event moment (e.g., such as a sports player scoring the goal), e.g., in which these images are 'twinned', such that they can be uploaded to a social network and associated together. For example, the 'twinned' images can include one of the user's reaction moments and the other one of the moment causing the reaction. The user interface can include linking the crowd content images to information of that event, e.g., such as emblems or text, which can be displayed in a connected manor, such that they can be uploaded to a social network and associated together. In some implementations, the user interface can be operated to collaborate the image content to produce a social network newsfeed, e.g., each specific to that user's connections. For example, the connections can be from other social networks. In some implementations, the user interface can be operated such that, when displaying the two images in a social network newsfeed, they interact by one overlapping the top of the other until scrolled, when scrolled these images adjust to reveal the image below, to provide a seamless adjustment in image display. For example, the overlapping image reduces in size as the interface is scrolled. Also, for example, the overlapping image reduces in visibility as the interface is scrolled. Also, for example, the overlapping image slides out of the way as the interface is scrolled. In some implementations, the user interface can be operated such that, when displaying the two images in a social network newsfeed, they interact when scrolled, by adjusting the prominence of one of the images.

In some implementations, the user interface can be operated to display a panoramic image in which a series of images are loaded with various levels of resolution, e.g., all specific to the requested image, so that the user can rapidly see the detail of their specific image without waiting for all the other images detail to load, but is still able to witness the scale of the panoramic. For example, when viewing the panoramic image, the sections of images are loaded in specific areas around the user's image, e.g., which can be horizontally or vertically loaded after viewing each section. The user interface can be operated such that, when the user checks-in or receives image content for a specific game, the data of the game (e.g., such as the result or scorers) are logged and combined to other game stats the user has collected from other games to produce a statistics display, personalized to the user.

In some implementations, images and links can be displayed attached to each of the pieces of content, such as images, added by users, e.g., in which these links can be specific to the viewer's data and data in the news feed of their social network. For example, the user interface can be operated to display images and content when checking into games and when obtaining a reaction photo.

In some implementations, the user interface can provide the user with an option to purchase a hardcopy of their image after viewing it. In some examples, the user interface can provide the user with an option to purchase a hardcopy of another user image after viewing it. For example, the user interface can be configured to store the users payment details, e.g., so the hardcopy image can be purchased with less steps required, including quick click through and saved details for repeat purchases.

In some implementations, the user interface can enable the processed image to be shared on social networks. For example, for each image shared on social networks, displays a specific website link, which is attached, and can be viewed by other social network users. For example, the link attached is specific depending on a variety of factors, e.g., including determined by the user, the event, the moment captured, the sharing time, which alter the content within the link or alters the link itself. The content that is displayed in the link is specific to the user that supplied the link, e.g., this content can be other images taken of that user during the event during different moments. The content that is displayed in the link is specific to that event/moment.

The processing system can include an image database, in which the images collate from the cloud and are labeled under each moment. For example, these images are pre-grouped so that once captured they go to the appropriate group, e.g., so users and/or image publishers can locate a desired image faster, e.g., groups including families, best quality, passionate fans, etc.

The described system can include a lighting system, which can be configured to operate with the disclosed camera system. In some implementations, the lighting system can focus light rays on specific sections of a crowd when an image of that section is being captured, e.g., in which the light rays move with the camera angle. The lighting system can be configured to utilize a mirror or reflective surface to redirect light rapidly instead of the whole lighting system moving.

In an aspect of the disclosed technology, a method for providing an image of an attendee at an event includes operating one or more image capturing devices to record images of attendees of an event situated at locations in an event venue; processing the images, in which the processing includes mapping the locations to a grid including coordinates corresponding to predetermined positions associated with the event venue, defining an image space containing an individual at a particular location in the event venue based on the coordinates, and forming a processed image based on the image space; and distributing the processed image to the individual, or, focusing their display on the image location and area of that processed image that is specific to them.

In another aspect, an imaging service system of the disclosed technology includes a plurality of cameras arranged in an event venue to capture images of attendees at an event, and one or more computers in communication with the cameras to receive the captured images and provide coordinates to the captured images that correspond to locations in the event venue to associate individuals among the attendees to respective locations in the event venue.

Exemplary Hardware

The present technology includes: a series of rapidly moving mechanisms that alters, either the specific position of the camera's or cameras' angle, to focus on specific areas or, the angle of a reflective mirrored surface that a camera or cameras are facing, allowing a series of photographs to be taken. Each camera system focuses on a specific section of the crowd.

A variety of mechanisms can be used to rapidly move the cameras or mirrors angle, stop at specific positions and then rapidly stabilize for the image to be taken, if the camera or mirror requires stopping at all. Magnets/electromagnets, including stepper motors, an electric motor, elastic tension, a spring mechanism, pistons or compression supplying a movement through an gas or liquid medium and gravity can power the movement of the cameras or mirrors position. The camera can take images while continually moving or during the mirrors continual movement or be stopped and stabilized to take the image by using magnets/electromagnets, a physical barrier, friction or a stop in power to stop the movement mechanism. There are multiple combinations of these rapid camera/mirror movement mechanisms combined with the precise and rapid stop/stabilization mechanisms to photograph fan reaction images. Multiple cameras can be held by the moving mechanism as well as multiple cameras can focus on one moving mirror mechanism.

If the images are taken while the system is panning the images are timed with the moving mechanism to ensure each shot is taken of a specific and predetermined area.

If stopping the camera/mirror to take the image, the camera is triggered remotely. The focus function of the camera can be triggered as the movement for each shot is nearing the static position or when fully static and stabilized, to ensure the correct focus is used for that section of crowd to obtain a clear image. The image can be captured when the camera is static and stabilized. Once the image has been taken this relays to the moving mechanism via optics or other signal such as an electric signal so that the next movement can occur. The amount of movement degrees can be varied for each shot to ensure that only the specific people in that area are captured. The movement could also be timed in-between a timing of image capture, both mechanisms are triggered at the same time.

If stopping the camera to take an image, the system is triggered remotely and an image is taken, this triggers the movement of the motor or motors to the next position and also the next focus position, both of which have been preset. When the camera arrives at the next position and once the focus is correct the next image is triggered. This sequence continues until the series of images have been taken, the system is then placed in standby ready to be retriggered.

If multiple cameras are used for one moving mechanism, the movement can be delayed until all cameras have signaled that the shot has been taken or a specific amount, for example 5 of 8 are complete so the next movement is made so the delay does not heavily affect the system. If each camera controls the robotics then the above point does not need to apply.

If the images are being captured without the system stopping, the focus of the lens, on the cameras, can be adjusted manually in a predetermined manner, either manually using a robotic adaption that turns the lens dial to a specific point or electronically. This is timed so that during the camera/mirror panning, in between the shots, the focus is adjusted so that when the camera angle is pointing at the desired subject area the shot is taken with the specific focus corresponding with it. Therefore each image will have its own focus setting predetermined. This mechanism can also briefly stop for the image to be taken, without having to reduce the systems speed by waiting for the focus to adjust.

If the camera does not require a manual focus adjustment the images are taken timed specifically to the mechanism movement.

This cycle continues until a series of images have been captured and once complete, the camera or mirror can then be moved back to its starting position ready to repeat the process. The camera or mirror may not require to be moved back to its starting position, it could remain at its finishing position and move in the reverse way to the previous series of images. Both methods could be repeated after the system or systems have been triggered to produce repeat images of the series that has been taken after the same trigger moment.

The system set up involves one or more stations, within the zoom proximity of the cameras focus. The cameras and moving mechanism modules are then positioned on or are attached to these areas. Once calibrated, these modules are placed in the same specific area for each use. The trigger of the modules, to start taking photographs and movement, is done remotely and manually. A central trigger can control multiple mechanisms, ensuring all images are captured from the same reaction moment and reduce the operators required.

The mirror mechanism can also capture large amounts of images in a different set up. This is a series of mirrors aligned at different angles which rapidly drop down after each image has been taken.

This movement can again be controlled as stated above using the camera, have multiple cameras focusing on the aligned mirrors and have the manual focus altering mechanism.

A final method that involves no movement is to have a series of cameras or image taking devices set to a specific subject that is triggered to take an image of only that subject during the event, once triggered at specific moments.

Due to potential blurring of images, caused by the vibration of either the adjacent mechanisms movement or vibrations from the stadium, a stabilization platform will absorb any unwanted shake from the system.

Exemplary Software

The series of images captured can be labeled in a specific order and then relayed to an area in which software adds a specific grid to each, or the labeled images can be added/overlaid on the specific grid. This grid is coded to specific predetermined co-ordinates which will relate to individual sections on each image once the grid and image have combined. This area could be an on-site laptop, a cloud system or an external computer.

The image flow is: from the camera to the cloud/laptop, then the labeled image and specific grid are assigned together.

Individuals can request these images by providing the details of their specific area during the event, for example this could be seat numbers. The area or seat code specified by an individual relates to a specific code on the specific grid that is attached to the image taken of them. They can then be sent the specific area of the specific image that they are in. This means that every image request for each seat or area will obtain a specific area part of the image that is sent. This could also operate using another method which directs the individual to the part of the image/grid they have requested, sending them to a specific location on the specific image taken.

Multiple images can be captured per moment when the camera system is triggered and set to repeat its cycle. When the images are requested, or position of an individual is identified, the images of each moment captured are pooled so that when the user wishes to view them they can quickly see each image after one another. This can be done by the images being prepared or pooled together for each set of images taken of the individual, or by loading or pooling the co-ordinates to quickly direct the user to the correct image. These two methods can also be implemented for all images taken throughout the event, so the user can view different moments instantly too.

The images taken are connected to specific information and images of the moment captured.

So that all of the users can be captured in a group for every moment in the same photograph, each image can be taken of an overlapping area. The software ensures that when an image is requested, it can deliver the image from the appropriate photograph, which has the larger area away from the photograph edge. This ensures no individuals are cut in half, if at the edge of the photograph, ensuring individuals can be reliably supplied with a full image for each moment captured.

These images may also be instantly overlaid on a previously made panoramic image, to portray the impression that the whole panoramic was produced during the period in which the 'moment' images were taken.

For the security side, a series of images are rapidly taken during a period in the event, these images are attached with the seating/area grids and are available to be accessed by the users during the event. Users can then identify another individual by placing a marker on their image. This marker can identify the seat number using the predefined grid attached using either the marker being placed in an area of the grid relating to a seat number/area or the marker being closest to a specific point, again attached to a specific seat number or area. The image and/or seat number of the accused is then sent to a database or to mobile devices. Each image/seat number/area is coded to a specific area that device is operating in, e.g., only the specific image/seat number is sent to the event steward which has a particular area of the crowd to manage. The users can also identify what the accused individual has supposedly done by using a drop down option or comment on the incident.

The software system can differentiate the security image set taken from the reaction moment images taken, and both sets of images are placed into separate functional routes.

Exemplary App and Internet Site

In some aspects, the disclosed technology includes a software application ('app') to provide users with the disclosed technology with a unique experience to receive, enjoy, and share content associated with the events attended by the users. The exemplary app can be implemented by the user on his/her mobile device in real-time during an attended event and after such events, as well as on his/her computer devices.

For example, images can be accessible via an Internet site or mobile application. This content will form a social network in which individuals can connect with other users to share photographs of the events attended. A personal profile can be used store the images they have requested or have taken. When utilizing the mobile application the users' device will utilize its location signal to prioritize the event they are attending, it will also notify them if they are in the vicinity of the event, during the event.

The individual will be able to specify their exact location or seating during the event so that the specific image, or series of images can be sent to them after they have been captured. This relates to the grids on the coded photographs produced by the software. There is also an option to keep this specific area/seat location saved for the duration of multiple events at the same venue, e.g., during a season.

The specific image, or code to access the image, within the photograph is sent to the individual after every 'moment' captured and can be pooled together so the individual can browse multiple images taken during the same moment or different moments. The individual can choose the image they desire and how much of the photograph they desire within that image. They can also edit the image by adding a variety of personalization options, such as filters, captions, templates, joining images accessed within the network together etc.

The images taken can be linked to images of the event moment and information of that event, such as emblems or text, and are displayed in a connected manor. This specifically could be by combining the user image with or an image of the moment. The interface in which the two images, one of the user and of one of the moment, interact is that one is on top of the other until scrolled. This adjusts the users' view of one of the images so the other becomes more prominent. This could be the image reducing in size, slides out the way, fading. This interface allows a viewer to scroll through other users images in a 'newsfeed' to view both the moment and the reaction of the movement in an uninterrupted manor on a small screen. As the vertical or horizontal movement of the scrolling news feed occurs, one of the overlapping images alters to reveal the 'twinned' image, during the same scrolling movement.

When an individual accesses their specific image, in order for them to experience the scale of the panoramic movement captured, without a large loading time, a series of images are loaded with various levels of resolution, all specific to the requested image. This starts with the whole panoramic with very low resolution, each image, that is further zoomed into, towards the desired image, has a higher resolution. This is a seamless process and allows the user to witness the manual or automatic appearance of a high-resolution rapid zoom interface, when only the final requested image area is loaded in full resolution.

If accessing another image, in the series of images of that user, the final images also load during the same panoramic-loading-period, so the user can quickly access each one. The same previously loaded, low-resolution panoramic images are kept for the same experience to be repeated but the final few zoomed in images of the different moment is replaced. After the loading has completed, gradually images around the users image begin to load.

Due to the large amounts of high resolution images being viewed, and for a better user experience, the pixels are loaded in specific areas of each photograph, which could be horizontally or vertically loaded, opposed to waiting for the whole image to load. As the user views images in the panoramic, the adjacent images load, the images that are activated for loading also take into account scrolling behavior and which direction the user is generally moving towards.

Another interface option for mobile applications involves having a specific image load depending in which direction is swiped/pressed, representing a batch of images that are viewed, opposed to a seamless transition.

The finalized image can then be shared on the social network as well as other social networks or email addresses.

For each image shared, a specific link to additional website content is attached. Depending on a variety of factors, determined by the user, the event, the moments captured, the sharing time, all alter the content within the link or alters the link itself. This content/link can be adjusted based on a predetermined formula related to specific content of the image sharer.

The mobile application is the primary point of interaction for users. The app is meant to enhance the event experience through a number of features. Primarily, a simple means to connect with friends and fellow fans to share photos of each other that were captured with the camera technology during the event. Second, if used at a sports event the mobile app will record the outcome of the game (win or loss) to the profile of the user. This data will become the basis of a "Stat Tracking" system that allows sports fans to keep track of their teams performance specifically when they (the user) is in attendance. Third, the mobile app will allow users to anonymously report other fans that are being disruptive, aggressive or ruining the match day experience for others. When referring to sports events the following can also be applied to all events which draws large crowds such as concerts, festivals celebrations etc. When referencing sports or games this can also be replaced with other events mentioned previously. Seat numbers may also be replaced with a different method of locating an individual such as stand names, sections or areas etc.

Exemplary Advantages

For example, the disclosed technology can be implemented at sports events, in which the camera system and data processing systems of the disclosed technology operate together to create a unique user experience and an entirely new advertising medium that directly benefits sports teams, fans, and advertisers. This is achieved by capturing emotional photos with the hardware, uploading these photos to a cloud server and then using an app and social network platform to retrieve and deliver this data/photos to users. These images can then be shared on a social platform or through a variety of existing platforms.

Advertisers, brands, and sports teams are in a constant battle to create and deliver new and engaging content that allows them to connect better with their consumers. For example, nothing conveys emotion and feeling better than a reaction image during the event.

Some exemplary advantages of the hardware include the following. The rapid image capture will ensure each image can be taken as close as possible in time to the previous image, to capture the same reaction moment. This will mean fewer cameras will be required to capture images of the entire audience. Having a manual control of the focus will further reduce the delay time. The flow of controls mean that the images captured will be in focus and also respond as quickly as possible.

If using mirrors with multiple cameras, less moving modules will be required to produce the same series of images. If using drop down mirrors this allows a very quick change in camera angle by having no need for stopping or stabilization delay time. The manual remote triggering will allow the specific moments to be captured at an accurate point by reacting to crowd behavior.

Some exemplary advantages of the software include the following. The photographs being instantly assigned to grids allow individuals to access their images as soon as they are available. Having individual grids with each image allow the user to receive their exact location within the image. This allows them to instantly view the area of the image they are in without searching within the photograph; it brings the image to the user. The images being pooled for each moment allow the user to instantly see a series of images capturing them for each moment. The specific information the image is assigned to allows the user to view this information on a mobile or website interface acting as a reference to the event and moment their image is assigned to.

By ensuring that the most suitable image is sent, without photograph edge or 'stitching' issues, ensures a reliable image quality received. Overlaying the 'moment' images on a previously made panoramic enables the users to experience the scale of the image taken instantly, without the time delay of stitching the panoramic images together required.

By being able to rapidly take the images and build a virtual map of the crowd allows an interface in which the users can anonymously and rapidly notify security of issues as soon as the event begins. This not only provides the event security with specific alerts on issues occurring during the event but also provides a list of faces and seat numbers to deal with after the hectic event.

Some exemplary advantages of the app/site include the following. By notifying users with the application who are near a venue during the event period allows a specific reminder to access the images, timed to users precisely and in a targeted manor, avoiding the annoyance when the content doesn't relate to that user.

Allowing the user to send information to locate them within all the images allows the images or image location to be sent to them, avoiding the hassle of manually locating them. By pooling these images together enables the user to rapidly compare the images taken of them during the event.

Having a 'twinned' image interface allows the two (or more) images to be associated with each other displaying both the moment of the event and users reaction in a seamless scrolling interface on a newsfeed, allowing rapid viewing of many different user 'moments'.

By having a quick panorama loading method, it allows the users to gain a sense of scale of the event while not having to wait for the loading of many groups of pixels they do not wish to view in detail.

By changing the content or link, that is associated to the images uploaded, based on the user, event and moment, allows the content to remain dynamic and specific so there is more of an incentive to click through.

In some implementations of the disclosed technology, for example, the disclosed image capture, image processing, and social networking platform can be directed to sporting events. Sports are filled with those dramatic moments—the Hail Mary, the walk-off homerun, the buzzer beater. But after it's all over, how can people preserve and share these great memories? What if a fan was able to go back and relive these moments? The disclosed technology allows fans to capture and share pictures of themselves during the most amazing moments in sports, e.g., without ever touching a camera. For example, the camera technology is preinstalled in stadiums, and the camera system captures images of every fan during key, e.g., including the historic, highly emotional moments of games or matches. Fans then type their seat number or spectator location into a user interface implemented on a mobile application or website to access and share their photos, e.g., with friends or with other fans or the sporting organizations. Exemplary images captured by the camera system can offer users content that cannot otherwise be captured and never before seen. For example, the reactions of passionate fans when their team scores is uncontrollable, which is what makes this content hilarious, entertaining and timeless.

For example, the exemplary hardware component of the described systems can capture photos to generate the base of the content that can form the backbone of the social network and photo-sharing platform. These photos are of specific reaction moments of fans watching the live events. For example, the sports social network are focused on sharing users experiences from sporting events. This will create a simple way for fans to keep track of each other and the events they attend. These photos represent visual souvenirs during the most interesting moments. Users can download the app of the disclosed technology to access their photos, and this can be interfaced with existing social networks, e.g., such as Twitter, Facebook, and Instagram, or others. This photo content can leverage these existing social networks to create impressions of the images and to bring greater demand for them.

Exemplary Embodiments

FIG. 1 shows a diagram illustrating a user experience using the disclosed image capture, processing, and delivery technology. As shown in the diagram of FIG. 1, a user enters an event venue 101, e.g., including, but not limited to a stadium, arena, ballpark, auditorium, music hall, amphitheater, or other building, structure, or indoor or outdoor area to host an event. The event venue 101 includes image capture devices capable of capturing the images, as described in this patent document. The user experience can include notifying the user through communications using the user's mobile device 102 (e.g., such as through an application ('app'), text message, call or other type of communication) to remind him/her to declare their location, e.g., such as the user's seat number, in response to the notification. For example, the user can enter his/her seat number using a mobile software application accessible on the user's mobile device, e.g., if the user has pre-downloaded it or signed up to a website. The user experience includes, when an emotional moment occurs at the event, one or more triggering modules 103 being remotely triggered, e.g., automatically and/or manually, such that the image capturing modules 104 (e.g., housing cameras and/or other image capturing devices) begin capturing images of some or all of the attendees of the event, e.g., such as a sequence of images during a movement sequence of the image capturing modules 104 initiated by the triggering module 103. The captured images are then uploaded to one or more image processing computers, e.g., which can be run locally on a computer at the event venue and/or remotely, such as on a computer system or communication network accessible via the Internet (referred to as 'the cloud') that includes one or more remote computational processing devices (e.g., servers in the cloud). For example, after the one or more image processing computers receives the captured images, the images can be indexed to a specific grid and image-processed so that a processed image or images 106 of the user and other individual in proximity to the user can be sent to the user, e.g., directly to the user's mobile device 102 in real-time (e.g., during the event, just after the special moment that triggered the image capturing) via the exemplary mobile software app or other communication types, e.g., such as text/MMS messaging or posting to a web site. For example, using the exemplary app of the disclosed technology, the processed image or images 106 can be saved and shared on one or more social networks 107. In some implementations, a user experience can include providing the user with notification after the event to access the images from the event, which can be pooled and labeled for each of the moments captured.

Figure 1A:
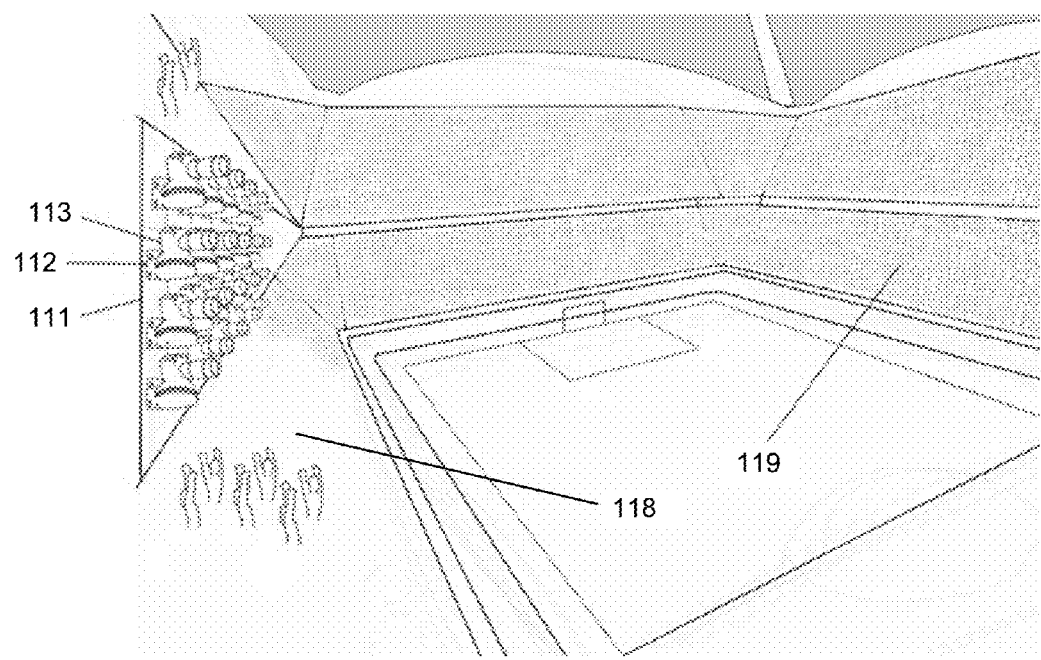
FIGS. 1A and 1B show diagrams illustrating an exemplary configuration of exemplary camera modules in an event venue.

An image capture, processing, and delivery system of the disclosed technology includes a plurality of the image capturing modules 104 arranged in the event venue 101 to capture the images of attendees at an event. In some implementations of the system, for example, the image capturing modules 104 are configured within stations, which are fixed to the event venue 101. These exemplary stations house the image capturing modules 104 (e.g., camera modules, which include a camera moving mechanism holding and camera/lens). The exemplary camera modules can each have power and Internet cabling connected to the module, e.g., from the existing infrastructure of the event venue 101, to transfer electricity to and data to/from the module. FIG. 1A shows an illustrative diagram of an exemplary station 111, which is fixed to part of the event venue 101 (e.g., such as a stadium, as shown in FIG. 1A), and structured to include camera modules 112. In some implementations, for example, a vibration absorption platform can be configured to the station 111 and/or on the individual camera modules 112 to prevent shaking of the stadium, e.g., during spectator reaction moments or natural events, from effecting the image quality when capturing fans during the emotional moment that results in triggering of the image capturing by the trigger modules 103. For example, each camera module 112 can house a camera and lens 113, such that the camera module 112 is fixed to station 111 while still allowing the movement of the camera/lens 113 to move to the angles it requires to capture that module's specific, predetermined area of crowd. For example, to obtain the optimum image angle, the cameras of the camera modules 112 shown in FIG. 1A on side 118 of the stadium can focus on the opposite side 119 of the stadium to that which they are fixed to.

Figure 1B:
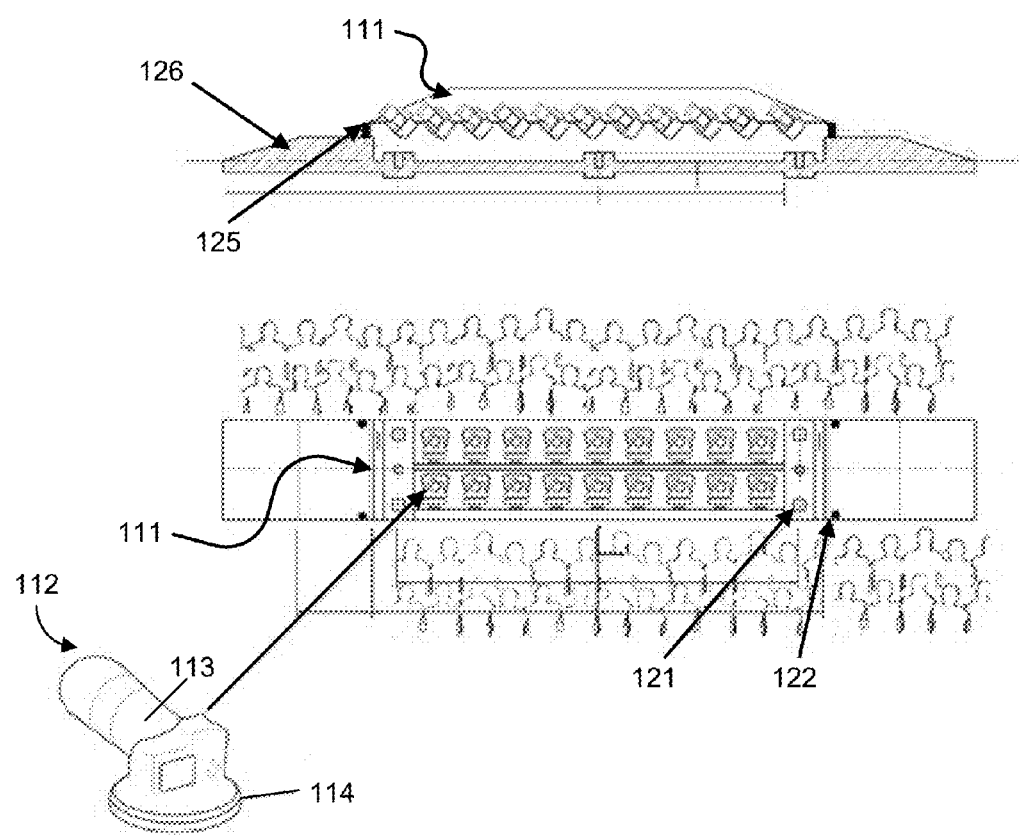

FIG. 1B shows a diagram illustrating an exemplary configuration of the camera modules 112 in the exemplary stadium, e.g., depicting how the modules are aligned within the station 111. As shown in this example, there can be multiple rows of camera modules 112, having adequate spacing between them, for the are panning when capturing images. The station 111 can be fixed to a part of the stadium infrastructure 126 at locations 121 and 122. Fixed part 125 shows a coupling of the station 111 to part of the stadium infrastructure 126. The camera modules 112 can be fixed to the station 111 by a moving mechanism 114 that allows a set position but allows the camera/lens 113 to move in the range of movement required.

In some implementations, for example, to capture an image of the moment the crowd is reacting to, separate cameras can be located either on or off the station. These can have a set position or be remotely controlled to follow the action, take continuous shots of the action or be triggered manually.

The image capture, processing, and delivery system can be used to acquire images at daytime events in outdoor event venues where ambient is present or indoor event venues that provide adequate lighting. Also, the image capture, processing, and delivery system is capable of taking images at night events and/or poorly lit events, e.g., such as concerts or poorly lit sporting events deep within some stands. To provide light to the subject, without affecting the users experience, the disclosed image capture, processing, and delivery system can include one or more light sources that can be timed to focus on the section of crowd from which the images are to be taken, and pulsed while the image is being captured. For example, implementation of the exemplary lighting system of the disclosed technology can ensure that a user does not receive constant glare, and the light sources can be used for multiple sections of crowd. The light sources can move to focus on a desired focus point or can be focused on a moving mirror that reflects the light to the correct angle required, e.g., producing an easier method to rapidly move the focus area of the light. For example, the camera and pulsing and positioning of the light sources are configured to interact so the timings are precise.

Figure 2A:
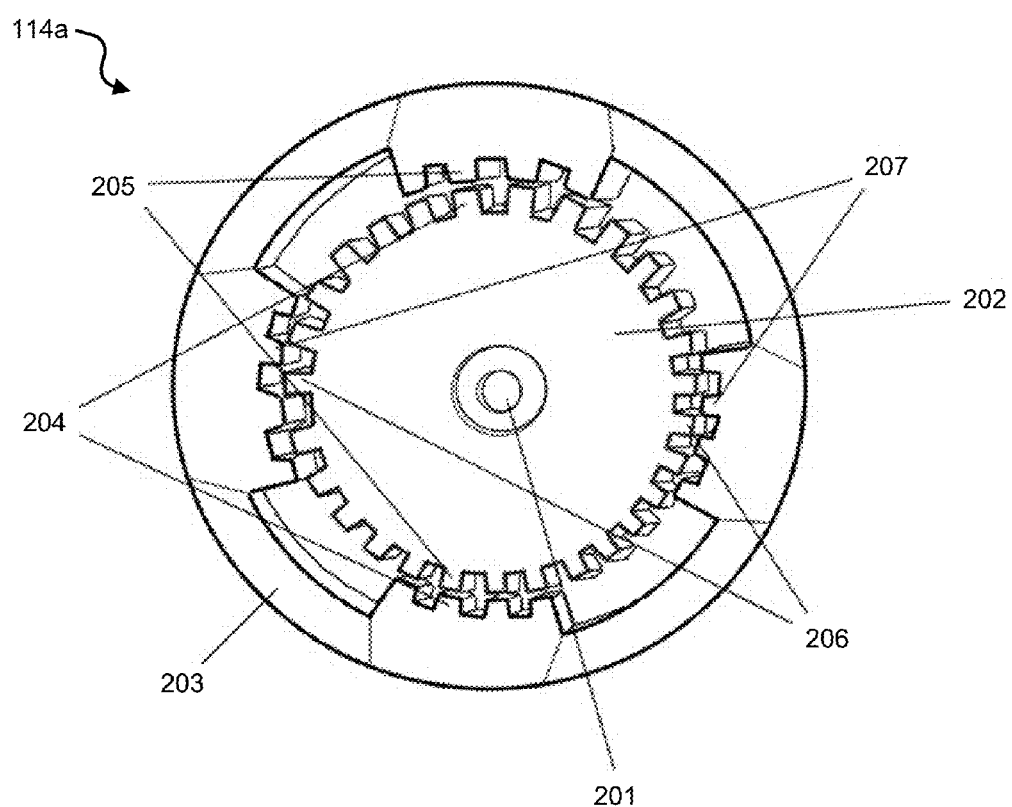
FIGS. 2A and 2B show diagrams of exemplary embodiments of an electromagnetic stepper motor to rapidly move and stop/stabilize a camera or mirror of an exemplary image capturing module.

In one embodiment, for example, the moving mechanism 114 of an image capturing module can be configured as an electromagnetic stepper motor 114a. FIG. 2A shows a diagram of the exemplary electromagnetic stepper motor 114a that rapidly moves a camera or mirror of an image capturing module by electric current causing magnetic forces along the circumference of the unit, as well as causing a rapid stop and stabilization from the same magnetic forces, e.g., which can be implemented to aid the rapid capture of reaction images of the spectators during large events. For example, each of the rapid moving mechanisms of the exemplary electromagnetic stepper motor 114a shown in FIG. 2A can be combined with any of the rapid stopping and stabilization mechanisms shown in later figures, e.g., including FIGS. 2B, 3, 4 and 5.

The combination of the rapid moving mechanisms and the rapid stopping and stabilization mechanism can form a hardware robotics system of the disclosed technology for unmanned control of the image capturing system configured at an event venue that rapidly moves an imaging unit (e.g., camera (or a mirror in the imaging direction of the camera) to change the image angle and then stop and stabilize it to capture an image.

For example, multiple movement mechanisms and stop/stabilization mechanisms can be combined to enhance speed and precision of the image capturing modules. For example, such movement can be horizontal and vertical panning. In some implementations, for example, the cameras or mirrors may not need to be stopped/stabilized while panning to capture the photographs in focus. In some implementations, for example, the images can be timed with the movement speed to ensure each image is taken of a particular section of crowd. For example, positional and temporal data can be associated with each captured image. In some implementations, for example, the cameras may also not need to be moved at all, in which each is positioned to focus on a section of crowd and the images are taken when triggered.

Referring to FIG. 2A, the stepper motor 114a can be used as part of the moving mechanism 114 of the camera modules 112 for rapidly moving the camera, or in some implementations, a mirror. In this example, one of the components 202 or 203 is fixed to a stable unit and the other of the components 202 or 203 rotates around pivot 201 or across vertically or horizontally along a rail or on part of an extended pivot. This allows rapid movement of the camera or mirror when triggered so the camera module 112 can move into the next position without delay. The camera/lens 113 (or mirror) is attached to the moving part, e.g., either the component 202 or 203. Electromagnets are represented in the diagram of FIG. 2A by exemplary teeth components 204, 205, 206 and 207, in which electrical signals adjust based on whether the magnets attract or repel each other. This causes a rapid movement of the moveable component 202 or 203 with respect the fixed/stationary one by the magnetic forces created. For example, these forces can be geared in order to maximize torque and acceleration required to deal with the camera and lens 113 attached. Implementation of the exemplary electromagnetic stepper motor 114a may not only cause movement but can also rapidly stop and stabilize the movement by using the magnetic forces again in a different combination. This also can ensure that the camera or mirror stops at a specific angle/degree to take an image of a specific area. The magnetic forces are also used to stop the movement of either of the moveable components 202 or 203 at a specific point or position, e.g., dependent on the electrical configuration controlled either by time or to react to a specific distance moved, as well as stopping any movement if using a lateral moving mechanism. For example, the amount of teeth components influences the degree of movement and stops that can be achieved. The diagram of FIG. 2A highlights how the two moving parts interact along their edges.

Figure 2B:
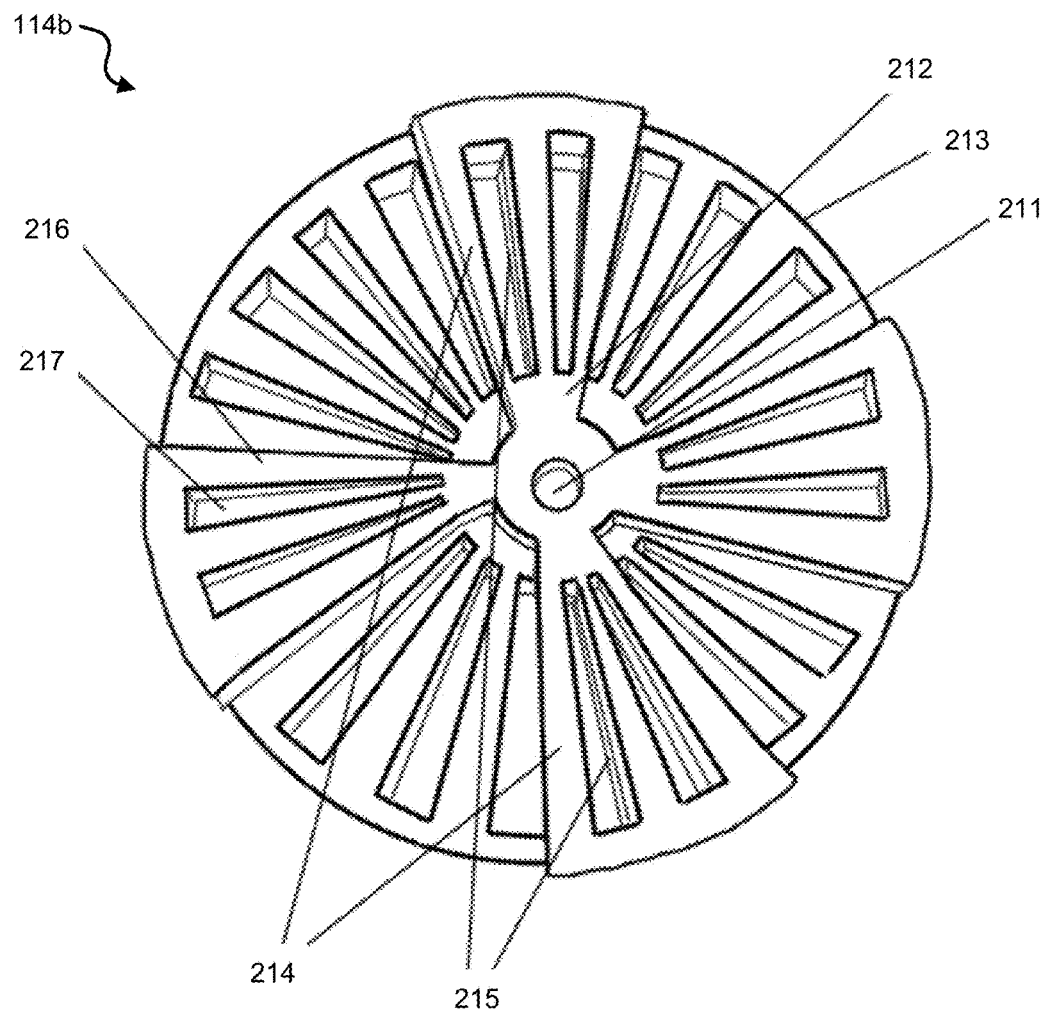

In another embodiment, for example, the moving mechanism 114 of an image capturing module can be configured as an electromagnetic stepper motor 114b. FIG. 2B shows a similar concept of the stepper motor 114b to that of FIG. 2A, but the interactions occur along the face of the moving components 212 and 213, instead along the edges as by the components 202 and 203 of stepper motor 114a in FIG. 2A. This diagram of FIG. 2B also shows the electromagnetic parts 214 and 215 attracting while electromagnetic parts 216 and 217 are repelling. This drives camera/lens 113 of the camera module 112 (or mirror) movement and stopping/stabilization. For example, implementation of the stepper motor 114b may not require stopping the panning while the images are being taken, e.g., as in this case the movement speed is controlled, as opposed to the stopping points.

Figure 3:
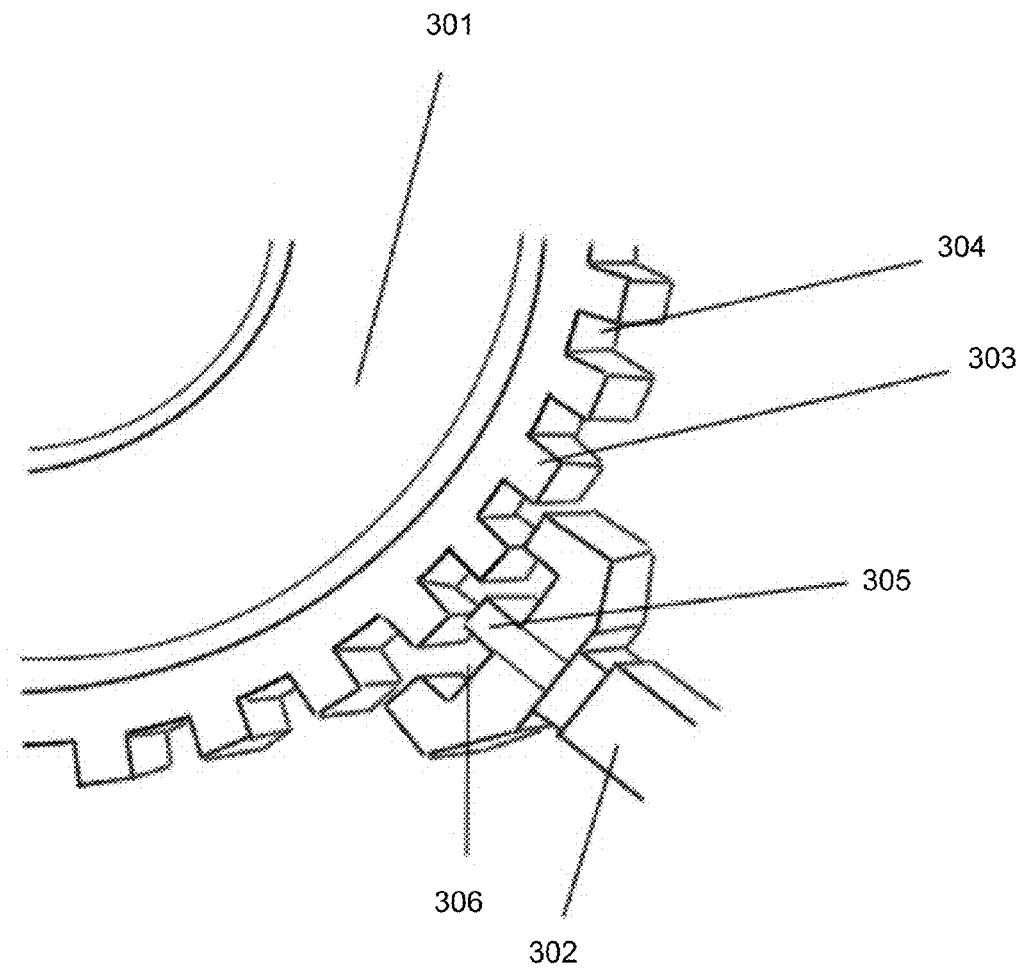
FIG. 3 shows an exemplary physical blocking mechanism to accurately stop the movement of the exemplary camera modules at precise positions along the movement trajectory.

In another embodiment, for example, the moving mechanism 114 can be configured to rapidly stop/stabilize the moving camera/lens 113 (or mirror) by using a physical block that halts the movement at a specific place. This block can be timed to move into place or may receive a trigger when a specific part of the moving piece is in the correct place to be stopped. FIG. 3 shows an exemplary physical blocking mechanism to accurately stop the moving mechanism 114 of the camera module 112 (or mirror) at precise positions at the circumference of the moving component of the moving mechanism. As shown in the diagram of FIG. 3, the physical blocking mechanism includes a moving component 301, which can be rotated or moved vertically or horizontally along a rail, such that component 303 having teeth 304 interact with the teeth 306 and central tooth 305 of component 302. Alternatively, for example, the moving component can be the component 302 while the component 301 is stationary. Additionally, for example, the physical blocking mechanism can be configured such that both components 301 and 302 move about each other. The physical blocking mechanism can be operated to accurately stop the moving mechanism 114. For example, anything that causes a physical block, stronger than the movement, will cause the movement to stop, and can be implemented to be properly timed or sensed to ensure that the camera or lens 113 is positioned at the correct angle to take the desired image while the system is still (e.g., and therefore not causing any blurring of the image). The physical blocking mechanism can include a variety of physical barrier designs that can be used, e.g., such as cogs or bars. In the example shown in FIG. 3, the physical block is represented by cog-like teeth, however any shape could be used to cause the blocking. The teeth components 304 of the component 303 and the teeth components 305 and 306 of the component 302 are configured to interact when pushed together to stop the moving component 301, for example, to halt the moving component 301 from continuing its rotational path; and to permit the moving component 301 to continue along its rotational path, the component 302 must be removed from blocking it.

Figure 4:
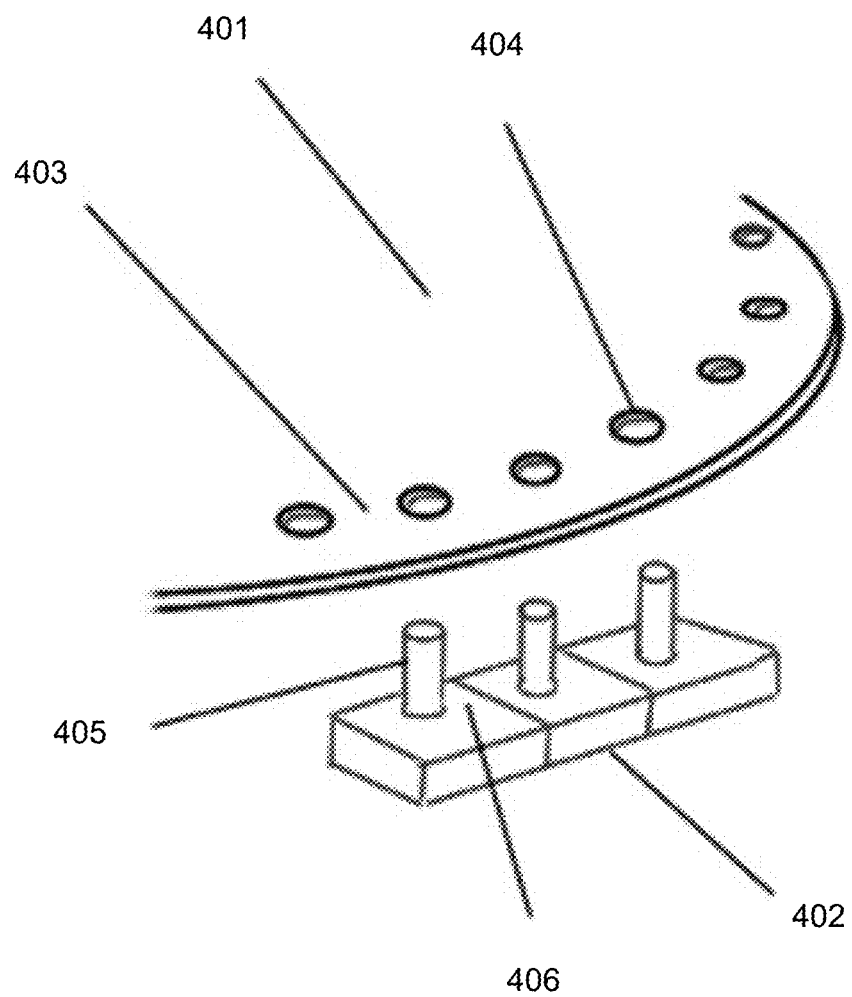
FIG. 4 shows another exemplary physical blocking mechanism to accurately stop the movement of the exemplary camera modules at precise positions along the movement trajectory.

FIG. 4 shows another exemplary embodiment of a physical blocking mechanism that accurately stops the moving mechanism 114 of the camera module 112 (or mirror) at precise places along the movement trajectory by physically blocking the moving component 401 on its face, e.g., as opposed to along the edge in the exemplary physical blocking mechanism of FIG. 3. The exemplary physical blocking mechanism of FIG. 4 is structured to include protrusion components 405 protruding from an interfacing surface of an array 402 of blocking units 406, in which the array 402 of blocking units is configured under or over the face of the moving component 401. The moving component 401 includes an array of holes 404 positioned on the face of the moving component 401 at locations that corresponds to the locations of the protrusion components 405. For example, the protrusion components 405 of the blocking units 406 are configured to interact with the moving component 401 when pushed together to enter through the holes 404 on the interfacing face 403, which stops the moving component 401 to halt the moving component 401 from continuing its rotational path. To permit the moving component 401 to continue along its rotational path, the protrusion components 405 of the blocking units 406 must be removed from the holes 404.

Figure 5:
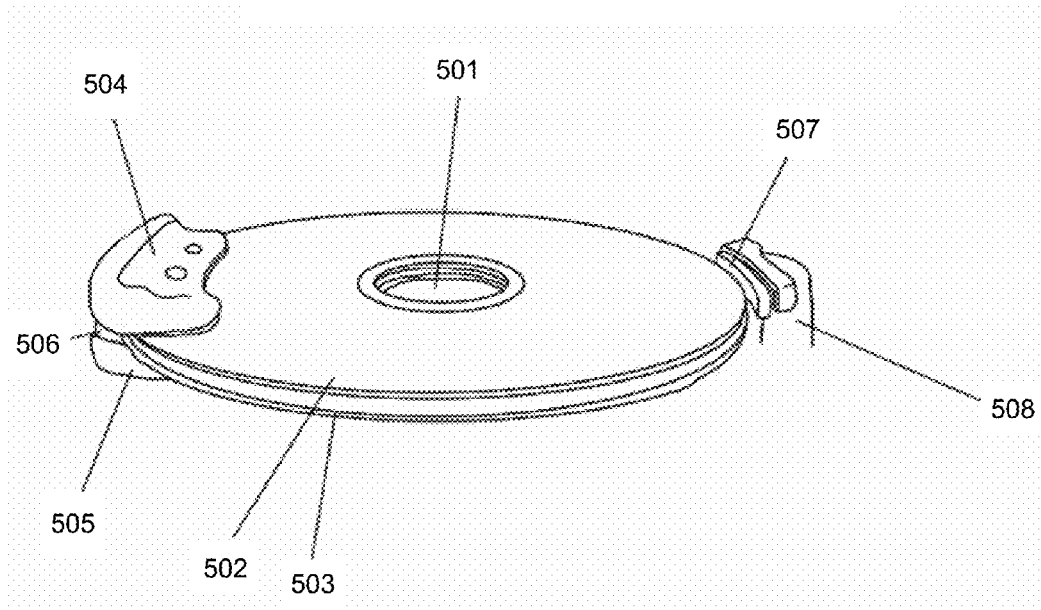
FIG. 5 shows an exemplary mechanism that uses friction to stop the movement of the exemplary camera modules.

In other implementations, friction can also be used to stop the movement of the moving mechanism 114 to stop/stabilize the camera module 112 (or mirror) during image capturing to aid in the rapid capture of reaction images of spectators during an event. FIG. 5 shows a diagram of an exemplary mechanism that uses friction to stop the movement of the camera module 112 (or a mirror module to assist in image capture by the camera module 112). The friction mechanism of FIG. 5 shows how friction between two plates 502 and 503 causes the system to stop in a specific position. This diagram highlights exemplary three methods in which this could occur. In one example, component 506 is used to bring pinch parts 504 and 505 together, which pushes plates 502 and 503 together as one or both are rotting about each other, thereby causing friction between plates 502 and 503 that is ultimately greater than the movement force, causing the movement to stop. In this example, friction can be applied by the pinching of parts 504 and 505 via component 506 on the faces of plates 502 and 503, or pushing one of the plates against the circumference of the other to cause friction, and thereby stop movement at specific positions. For example, either plate 502 or 503 can be attached to a stable or fixed section of the module while the other is capable of moving along a pivot point 501, or across a vertical or horizontal rail (not shown). In another example, the plates 502 and 503 can interact with electromagnetic components, e.g., either on one or both plates so that they attract to each other when electrically signaled, such that there is a greater attraction force than movement force, causing the moving plate (or plates) to stop/stabilize. For example, the electromagnetic components can then turn to a neutral state or even repel state to allow movement to continue. In another example, which can be similar to the physical block methods highlighted in FIGS. 3 and 4, friction can be created by pad 507 on plate 502 that causes the movement to halt. The pad 507 can be held proximate and moved against or away from the plate 502 via the moveable holder 508. All of the described exemplary friction methods in FIG. 5 can either be set up to more rapidly stop/stabilize the movement when the movement is stopping or may just compete against the moving force, e.g., to 'stall' against it.

Figure 6:
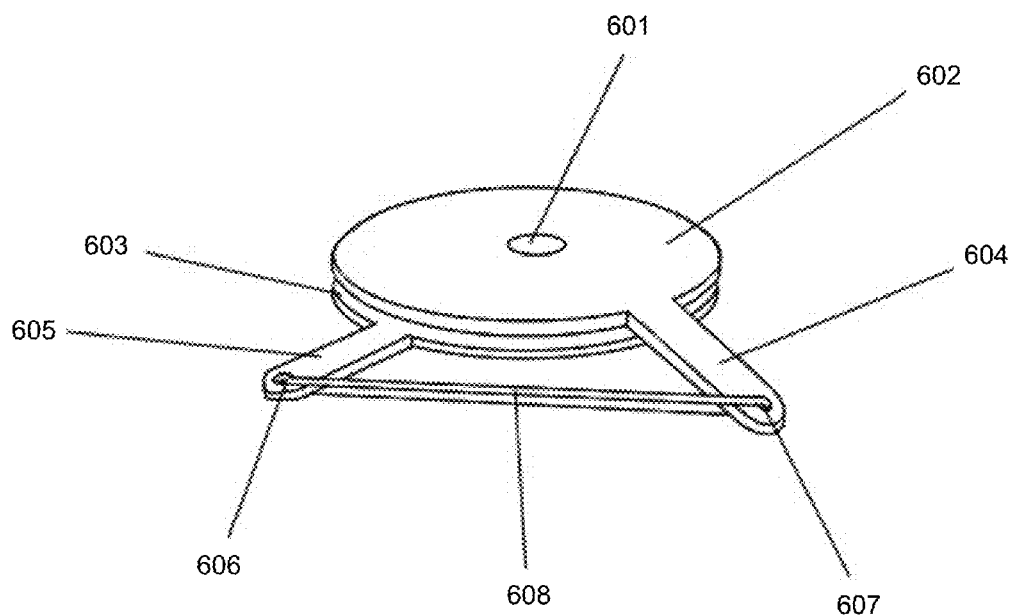
FIG. 6 shows an exemplary mechanism for rapidly moving the exemplary camera modules using an elastic force.

Another method to cause rapid movement of the camera module 112 (or mirror module to assist in image capture by the camera module 112) to the next angle position can be to apply an elastic force to cause rapid movement of the module and release elastic tension that has previously been stored. FIG. 6 shows an exemplary mechanism to move the camera module (or mirror) by applying elastic force on plates 602 and 603 via tension caused by elastic component 608 held at edge parts 604 and 605, which are attached to plates 602 and 603, respectively. For example, when plates 602 or 603 are released, this causes movement along pivot 601. In this example, one of the plates 603 or 602 are moving the camera or mirror, e.g., depending on which plate is attached to the camera and which plate is fixed. For example, the movement does not have to be rotational, such that the exemplary mechanism can move horizontally or vertically. The release of the elastic tension can be implemented in a manner similar to the stopping/stabilization methods described in FIGS. 2A, 2B, 3, 4 and 5.

Figure 7:
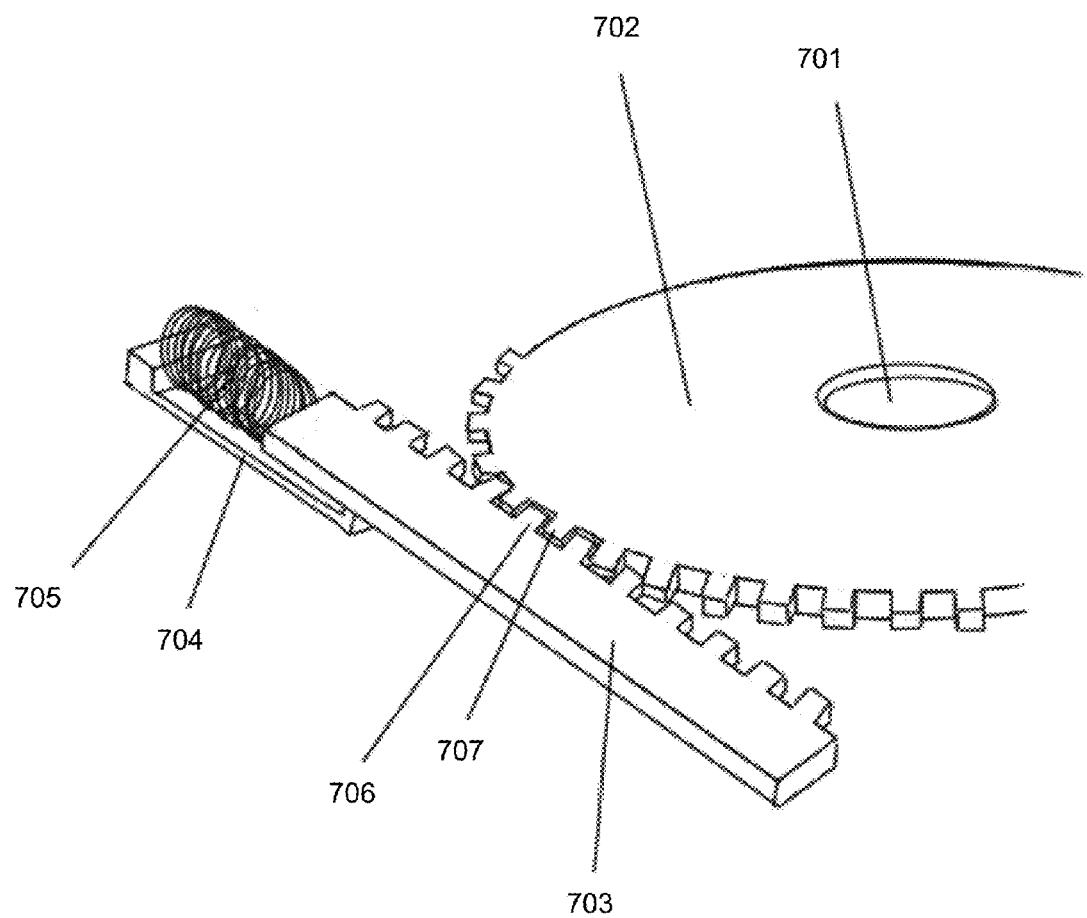
FIG. 7 shows an exemplary mechanism for rapidly moving the exemplary camera modules using spring force.

In some implementations, for example, the moving mechanism 114 can be configured to cause rapid movement of camera module 112 (or mirror) to the next angle position via exerting and releasing tension from a spring, as shown in FIG. 7. In this example, the moving mechanism 114 includes a rotating component 702 structured to include teeth 707 along its circumferential edge and rotate about a pivot point 701. Also, in this example, the moving mechanism 114 includes a translational movement component 703 structured to include teeth 706 and coupled to a base 704 via a spring 705. FIG. 7 shows how the spring 705 puts the component 703 under tension as the base 704 is attached to the spring 705 and a stable part of the camera module 112 (or mirror), so when the translational component 703 is not held in a fixed position with respect to the stable part via a locking mechanism (not shown), the spring 705 releases and translationally moves the component 703 rapidly. For example, the component 703 moves horizontally or vertically and can be attached to the camera/lens 113 (or mirror) to adjust the angle by causing a rotation movement of the rotating component 702. As shown in FIG. 7, a cog system shows how the teeth 707 and 706 of components 702 and 703, respectively, interact to rotate component 702 along pivot 701 when component 703 moves after the spring 705 is released.

Figure 8:
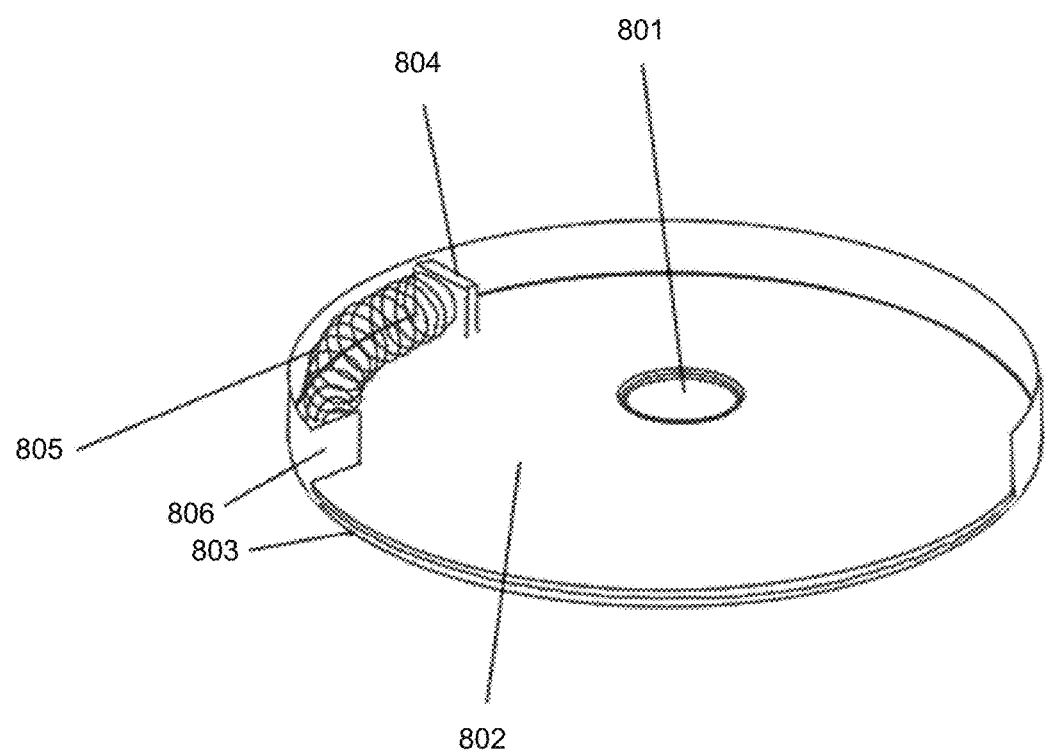
FIG. 8 shows another exemplary mechanism for rapidly moving the exemplary camera modules using spring force.

FIG. 8 shows a diagram of another exemplary set up of a spring-based moving mechanism that shows a spring mechanism used to cause a rotation movement for rapid movement of camera module 112 (or mirror). In this example, the moving mechanism 114 includes a rotating component 802 (e.g., a disk) structured to include a protrusion structure 804 on a top surface of the component 802, which can rotate about a pivot point 801. Also, in this example, the moving mechanism 114 includes a fixed component 803 (e.g., a fixed disk) structured to include a peripheral edge 806 that wraps around at least a portion of the periphery of the rotating component 802. The peripheral edge 806 includes a wall portion that is positioned over the top surface of the rotating component 802 to provide a base for a spring 805 configured between the wall portion of 806 and the protrusion structure 804 of the component 802. In some examples, the release of the spring to cause movement for the spring methods shown in FIGS. 7 and 8 could be similar to the stopping/stabilization methods previously described in FIGS. 2A, 2B, 3, 4 and 5.

Figure 9:
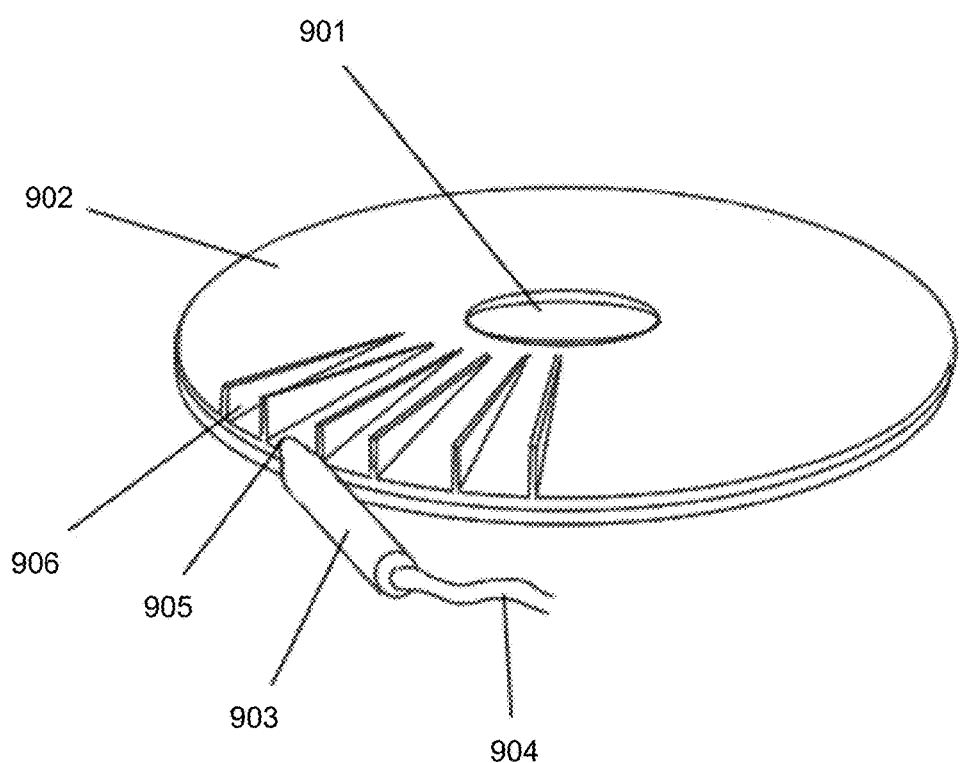
FIG. 9 shows an exemplary mechanism for rapidly moving the exemplary camera modules using gas flow.

In some implementations, for example, the moving mechanism 114 can be configured to move the camera module 112 (or mirror) by using air pressure to apply force against a moving piece. FIG. 9 shows an exemplary mechanism for rapidly moving the exemplary camera modules using a pressurized fluid flow, e.g., such as a gas. In this example, a fluid distribution nozzle 903 provides gas (e.g., pressurized air) from a source 904 (e.g., such as a hose), e.g., releasing the pressurized air from a point 905 of the nozzle 903 so that the air hits blades 906 configured on a top surface of a rotating component 902 to rotate the component 902 around a pivot point 901. In some examples, this movement does not have to be rotational, as the air can also push a translationally moveable part, which is attached to the camera module 112 (or mirror), horizontally or vertically along a rail.

Figure 10:
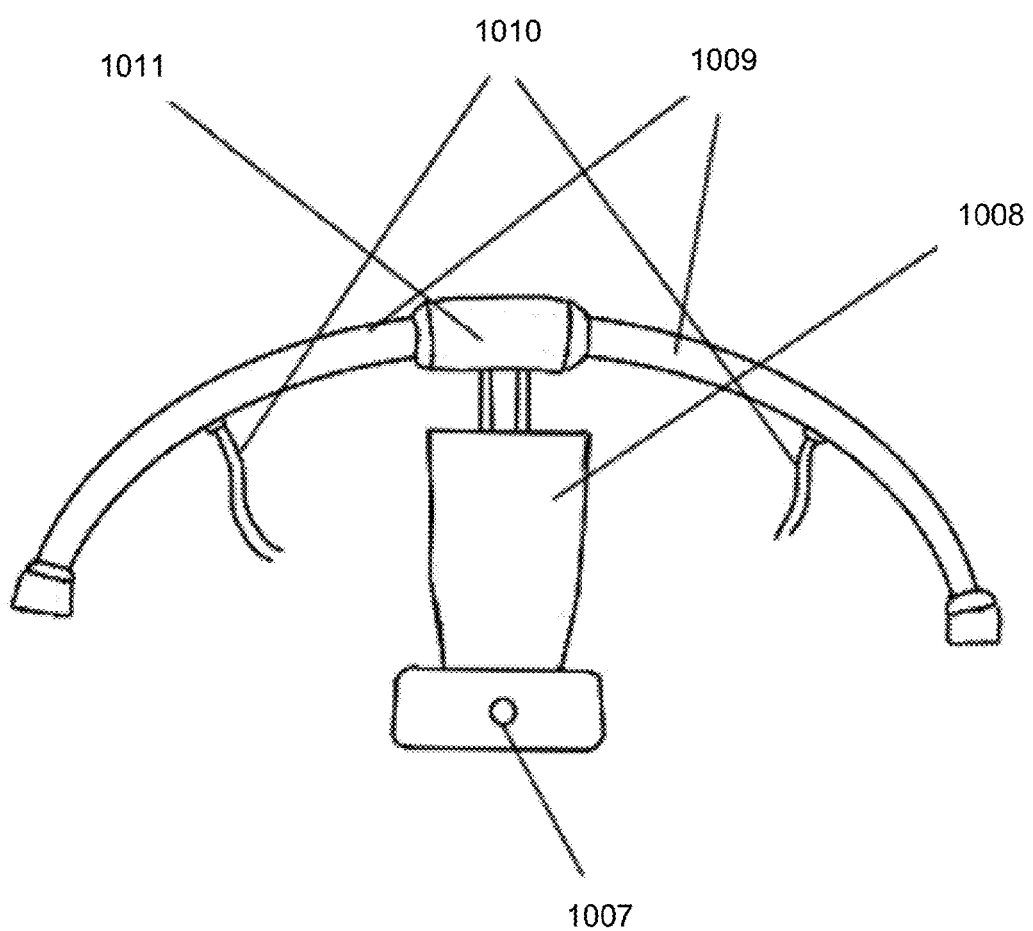
FIG. 10 shows another exemplary mechanism for rapidly moving the exemplary camera modules using gas flow including a rail that moves a connected central unit by injecting gas or a liquid to either side.

FIG. 10 shows another exemplary mechanism for rapidly moving the exemplary camera modules using gas flow including a rail that moves a connected central unit by injecting gas or a liquid to either side. For example, the fluid can include a medium such as gas or liquid to rapidly change the camera module 112 (or mirror) angle. Liquid or gas is injected into the space inside part 1009 from at least one of the points shown by 1010, and the pressure moves a rail 1011 configured along the part 1009 to move a base 1008 of the camera module 112 (or mirror), e.g., which can be held by a pivot 1007.

Figure 11:
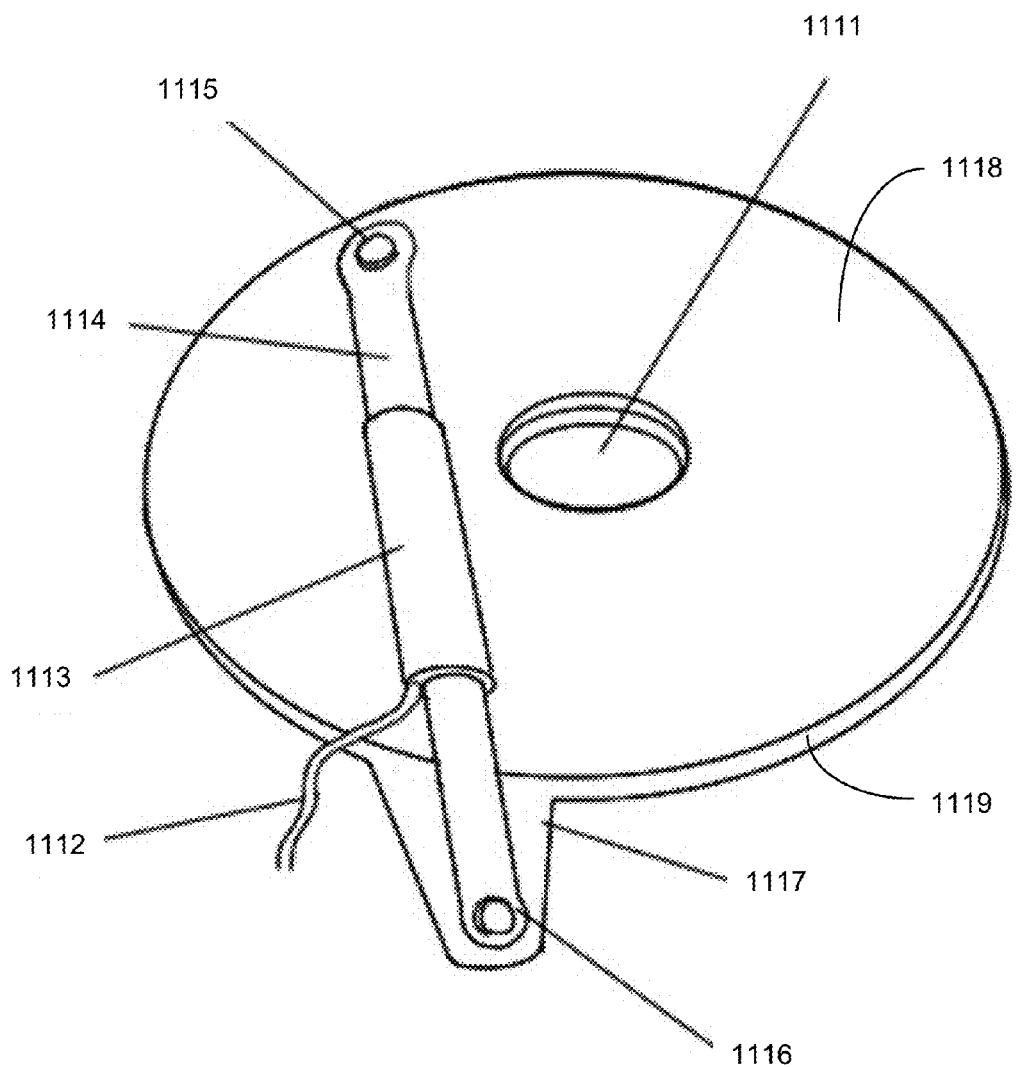
FIG. 11 shows another exemplary mechanism for rapidly moving the exemplary camera modules using a piston.

FIG. 11 shows another exemplary mechanism for rapidly moving the exemplary camera modules using a piston (e.g., such as a liquid or gas based piston). For example, a piston 1113 is attached to a shaft 1114 of the exemplary moving mechanism, in which the shaft 1114 is attached at one end 1115 to a rotating component 1118 (e.g., a plate component) along a top surface of the component 1118, where the exemplary rotating plate 1118 rotates about a pivot point 1111. The other end 1116 of the shaft 1114 is connected to a section 1117 of a bottom plate 1119 positioned under the exemplary plate 1118. can also be used to move the camera module 112 (or mirror) rapidly, as shown in FIG. 11, in which a fluid (e.g., gas or liquid) is injected into the piston 1113 from a tube 1112, such that the pressure of the fluid can cause the shaft 1114 to pivot at the end points 1115 and 1116 to rotate the exemplary plate 1118 the rotate around point 1111. In some implementations, this movement does not have to be rotationally; it can also be horizontally or vertically using a rail system.

For example, when the camera's or the mirror's angle is changed, the subject in a crowd will be at a different distance, which means a different focus is required for the camera to take an image that is not blurred. For example, adjusting the focus of a camera can take time. The disclosed image capturing technology can rapidly capture images by pre-setting the focus parameters of the camera 113 (or mirror) for each position an image is pre-determined to acquire/take, e.g., and thereby reducing any delay in capturing each image and making the system faster. In some implementations, for example, this can be done electronically, and in other implementations, this can be done manually.

Figure 12:
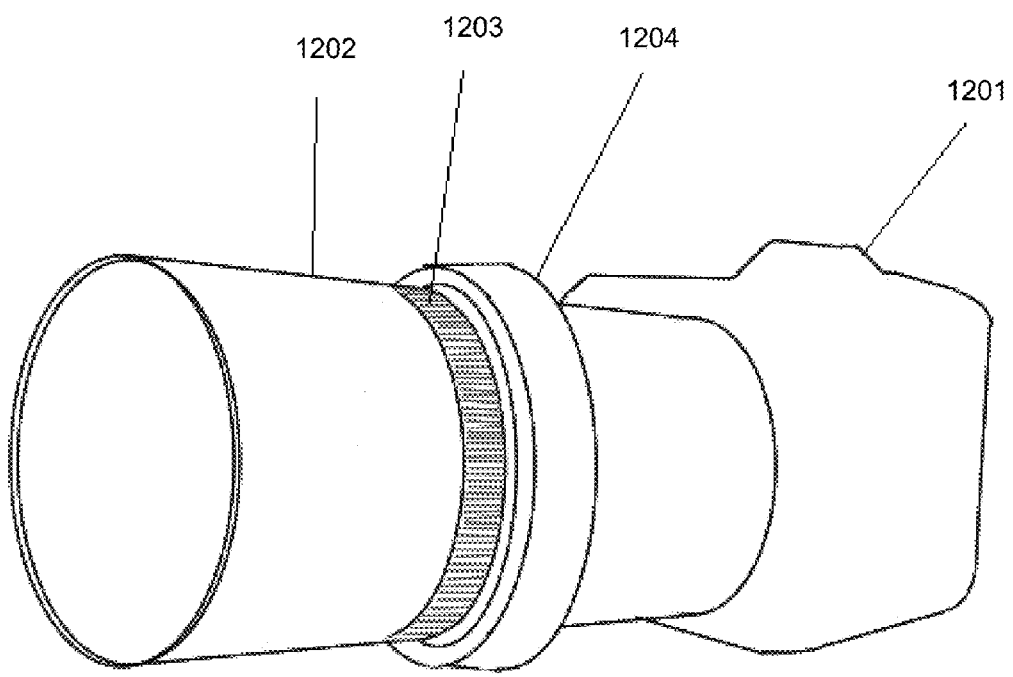
FIG. 12 shows an exemplary attachment mechanism to a camera that physically changes the manual focus of a camera lens for implementing rapid image capture of reaction images of attendees during an event.

FIG. 12 shows an exemplary attachment mechanism to a camera that physically changes the manual focus of a camera lens for implementing rapid image capture of reaction images of attendees during an event. As shown in FIG. 12, a lens 1202 of a camera 1201 can be configured to include an attachment mechanism 1204, which is held to the lens 1202 and adjusts the focus of the camera 1201 by rotating the lens adjustment surface 1203 of the camera 1201. For example, the focusing adjustment provided by implementing the attachment mechanism 1204 can occur in between image shots when the camera module 112 (or mirror) is moving to the next image position via the moving mechanism 114, e.g., to ensure speed is maximized. Therefore after an image is taken by the camera 1201, in this example, during the moving mechanism 114 moving the camera 1201 to the next image position, and the lens's focus is adjusted to the next shot so there is no time delay in refocusing when arriving there. For example, this can occur by using a stopping method, at each image position or timed to adjust during a continually panned movement.

Figure 13:
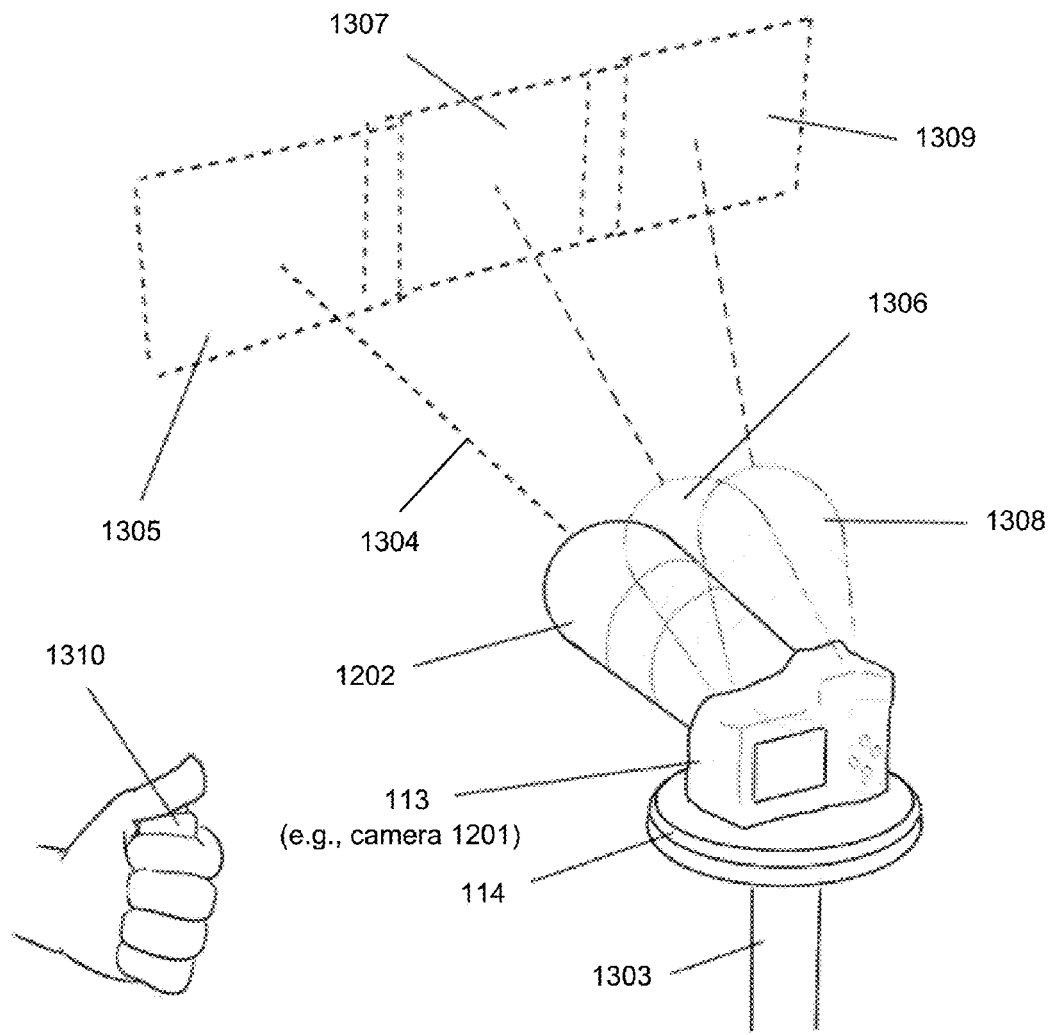
FIG. 13 shows a diagram depicting an exemplary process to trigger an exemplary image capturing system to take the series of images to capture the reaction images of attendees during an event.

FIG. 13 shows a diagram depicting an exemplary process to trigger an exemplary image capturing system to take the series of images to capture the reaction images of attendees during an event. As shown in FIG. 13, for example, a manual trigger 1310 is illustrated as a device including a trigger button to initiate the image capture series to be acquired by the camera 113 (e.g., such as the camera 1201) to focus the imaging lens (e.g., such as the lens 1202, via the exemplary attachment 1204) at multiple imaging positions of the camera (e.g., positions 1304, 1306, and 1308) to take multiple images of attendees (e.g., in a crowd) during a reaction moment based on an instance at the event (e.g., images 1305, 1307, and 1309), respectively. For example, the multiple imaging positions can be based on pre-determined positions for the camera 113 to be moved by the moving mechanism 114. In this example, the camera 113 is coupled to an exemplary moving module 114 positioned above a fixed part or stand, e.g., such as the cylindrical stand 1303. The diagram of FIG. 13 illustrates an exemplary set-up of one module that can model the set-up of many modules for photographing a crowd at large events, e.g., during key movements, which a spectator person can watch and receive the acquired, processed, and distributed images provided by the disclosed technology.

Figure 14:
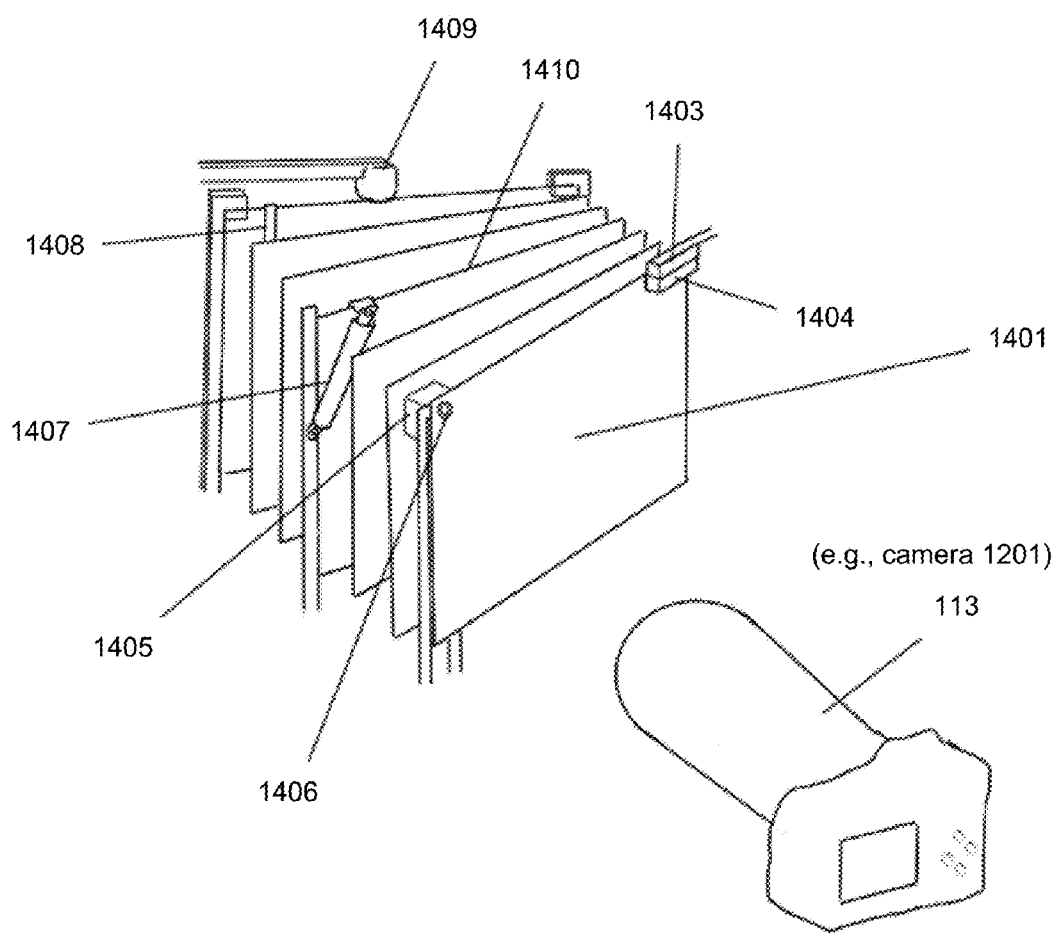
FIG. 14 shows a diagram of an exemplary mechanism to move an exemplary array or series of mirrors so that an exemplary camera module can image a plurality of sections of an event venue to capture reaction images of attendees during an event.

FIG. 14 shows a diagram of an exemplary mechanism to move an exemplary array or series of mirrors 1401 so that an exemplary camera 113 can image a plurality of sections of an event venue to capture reaction images of attendees during an event, e.g., by focusing on each mirror's reflection in sequence to image the plurality of sections. For example, the mirrors 1401 can move along a plan vertically or horizontally or rotate around an axis. Various methods of holding and moving the mirrors 1401 can be implemented, e.g., including using electromagnets, physical barriers, pistons, elastic and spring tension, pressurized air force, electric motors, among other. For example, moving the array of mirrors in a series of set positions to adjust the focusing angles of camera that rapidly moves one mirror out of the way to reveal the next mirror at the new position, can, in some implementations, operate faster than moving a single mirror to new positions. For example, a single system of the series of moveable mirrors be implemented for multiple cameras, in which another camera can focus on the mirror behind the presented mirror while one camera focuses on the presented mirror. The exemplary series of moveable mirrors requires no stopping or stabilization time as the angle is already set. For example, this is shown in FIG. 14, in which camera 113 (e.g., including the camera 1201) is focused on the reflection of the section of the event venue in the presented mirror 1401, e.g., in which this reflection is focused on the crowd as the camera 1201 is positioned at an angle. For example, after the image had been taken, the presented mirror 1401 is moved (e.g., which can include the mirror drops down, pivots or slides away horizontal or vertically) to reveal the next mirror. Various techniques can be implemented to rapidly move these mirrors, e.g., including using electromagnets illustrated as 1403 and 1404 on the presented mirror 1401 to hold it in place then repel away when triggered; using an electric motor illustrated as 1405 and 1406; and using a piston 1407, an elastic component 1408, and an air pressure system 1409 to pull down the mirror. Various methods can hold the mirrors in place such as a physical barrier or an electromagnetic force, e.g., via the components 1403 and 1404.

Figure 15:
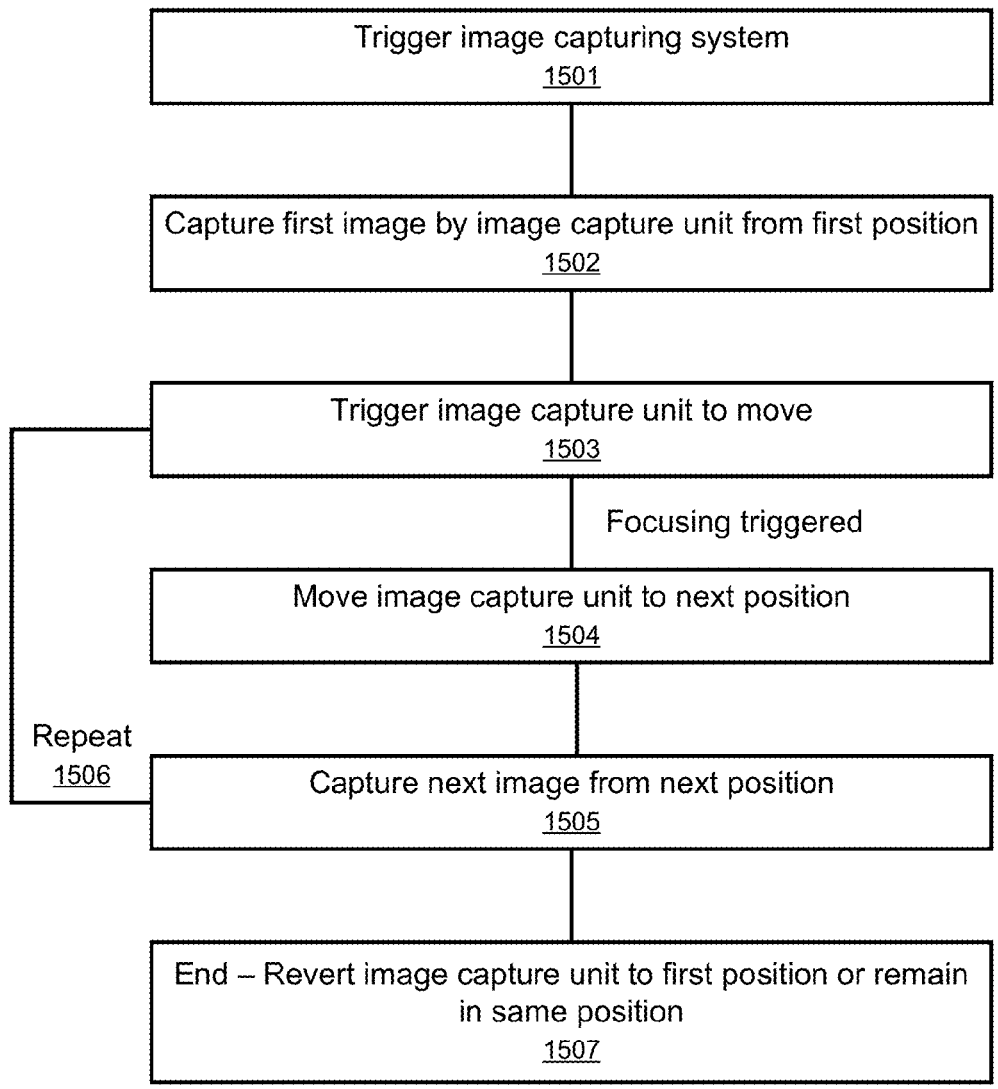
FIG. 15 shows a diagram of an exemplary method of control of an exemplary image capturing unit of the disclosed technology.

FIG. 15 shows a process diagram of an exemplary method of control of an exemplary image capturing device (e.g., such as a camera module) interacting with the robotics hardware of the disclosed technology. For example, the interaction of the movement mechanism hardware and the camera is important to the function of the image capture system. As shown in FIG. 15, the image capturing system is triggered in a process 1501, e.g., based on a manual trigger or automatic trigger caused by a moment or instance during the event. In a process 1502, the camera module captures one or more images (e.g., takes a single or multiple photographs) based on the trigger implemented in the process 1501. The image capture process 1503 includes a trigger the image capture unit (e.g., camera module) to move based on the capturing of the one or more images in the process 1502. In a process 1504, the camera module is moved to its next position by the exemplary robotic hardware coupled to the camera module based on the trigger of the process 1503. For example, during this movement a specific setting for the lens focus of the camera can be adjusted, so that when the camera or mirror is at the next position, it is ready to take the next image without a focusing related delay. The camera module can either be stopped at each image-capturing position, e.g., to take the next image, or the camera module can continuously pan. For example, if stopping, when the exemplary robotic hardware finishes its movement, this triggers the next photograph(s) to be taken, in a process 1505. In the process 1505, the camera module captures one or more images at this next position. For example, if continually panning, the image trigger can be implemented from timings or sensors that measure the movement of the hardware to be triggered, e.g., when the specific position is reached. The method can include a process 1506 for repeating the processes 1503, 1504, and 1505. Once the series of images have been taken, the method can implement a process 1507, in which the image capture system can reset to its original position or stop at the last position in which the hardware has moved to (e.g., so that when retriggered for the next event moment, the exemplary hardware can implement the same image capturing process but in a reverse direction). For each time triggered, for example, the image capturing system can perform multiple sets of series of images taken, either by reverting to the original position or reversing its movement.

Figure 16:
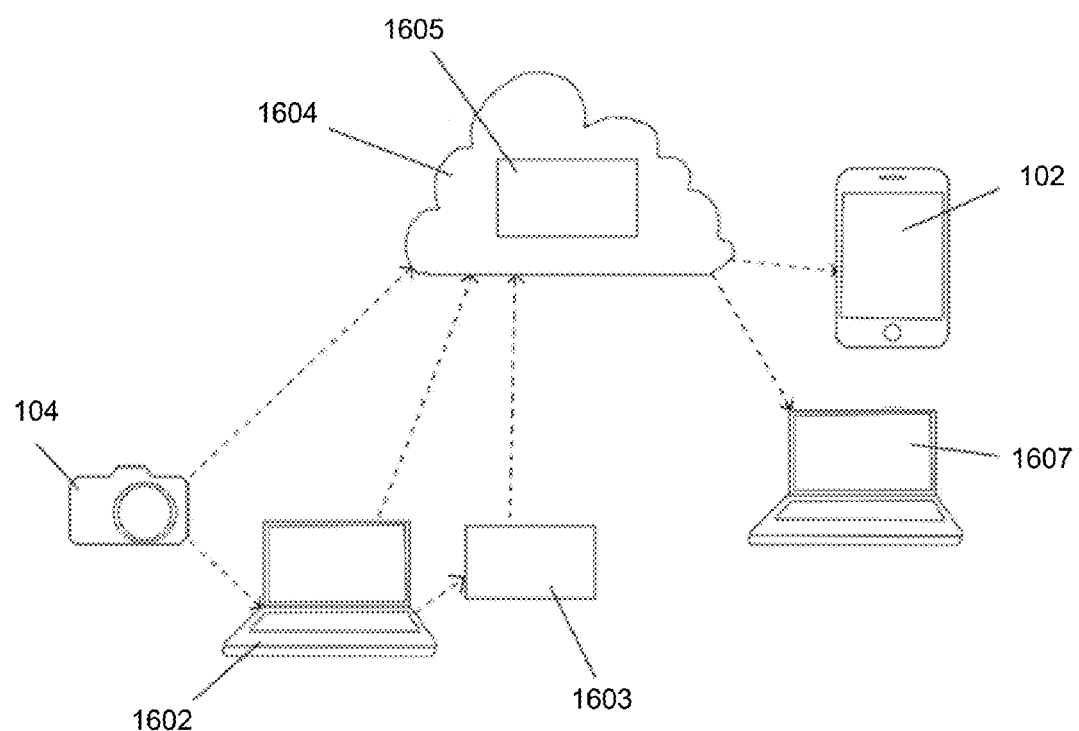
FIG. 16 shows a diagram depicting a process flow of the images captured, processed, and distributed at an event by the exemplary image capture units at the event venue.

FIG. 16 shows a diagram depicting a process flow of the images captured, processed, and distributed at an event by the exemplary image capturing modules 104 (e.g., including cameras 113 of camera modules 112) at the event venue. The cameras 113 are configured to capture images during a specific moment of the event, e.g., such as a reaction moment by the attendees of the event, or to rapidly obtain the crowd's photographs to use for a security aspect of the event. For example, the captured images can then be uploaded straight to an image data processing unit that can be located at the event venue or in a communication network accessible via the Internet (e.g., including a data processing system in the cloud), to which the software of the image data processing unit processes the captured images. The processed images can be stored on the image data processing unit or other computer of the exemplary cloud system for users (e.g., attendees at the event) to access. The images can be requested by a user's mobile device during or after the event, as well as by a computer to receive the processed image and image location coordinates, e.g., to produce the images so that they can be accessed by the particular attendees imaged at the image location coordinates (e.g., such as a reaction image of the attendee at his/her location at the event venue in response to an reaction-inducing moment during the event).

This process is illustrated in the diagram of FIG. 16, where the image capturing modules 104 (e.g., cameras 113) capture images of the attendees during a specific moment of the event and/or at various or controlled moments for a security purposes during the event. In capturing images of the attendees during a specific moment (e.g., to capture their reactions to that moment), the image capturing process can be triggered by the specific moment of the event (e.g., either manually by an operator spectating the event, or automatically) from a visual reaction, from a noise or audio reaction, or from a physical force or perturbation (e.g., vibration) based on a calibration setting of the image capturing modules 104 or built into another detection system in communication with the image capturing modules 104, e.g., such as 'goal line technology' to confirm that a goal is scored (e.g., using imaging devices or lasers, etc.) In some implementations, the images or series of images can then be sent straight from the image capturing modules 104 to a data processing system in the cloud 1604, in which the captured images are assigned identification data, e.g., becoming labeled images, which can be associated to a specific grid and further image data processing to form processed images 1605. In some implementations, the labeled images can be pulled from the cloud system 1604, and the grid is added from a computer, after which the labeled images associated with the grid are put back to the cloud system 1604 for further image processing. In addition or alternatively, for example, the images or series of images can be transferred from the image capturing modules 104 straight to a data processing unit located at the event venue or in direct wired or wireless communication not located at the event venue, as depicted by the computer(s) 1602, which can perform some or complete image processing of the captured images or series of images to produce the processed images 1603. For example, the processed images 1603 can then be sent straight to the cloud system 1604. If the captured images stored on the computer 1602 are not processed by the data processing unit of the computer 1602, for example, the images can be labeled and/or assigned to a specific grid by the cloud system 1604 upon uploading the images to the cloud system 1604; or, for example, the identification information can be added to the images by the computer 1602 and then they are uploaded to the cloud system 1604 to assign the grid to the labeled images. A user's mobile device 102 or Internet site can be used to specify the user's photo position in the captured images or series of captured images, e.g., which could be a seat or area code, in which this information is provided to the data processing system in the cloud 1604 or on the computer 1602 so that a specific image or images associated with the user's location (e.g., photo position) can be distributed to the user based on the specific gridded processed image 1605 to be provided on the user's requesting device, e.g., user mobile device 102 or user computer device 1607 (e.g., such as a laptop or desktop computer).

Figure 17:
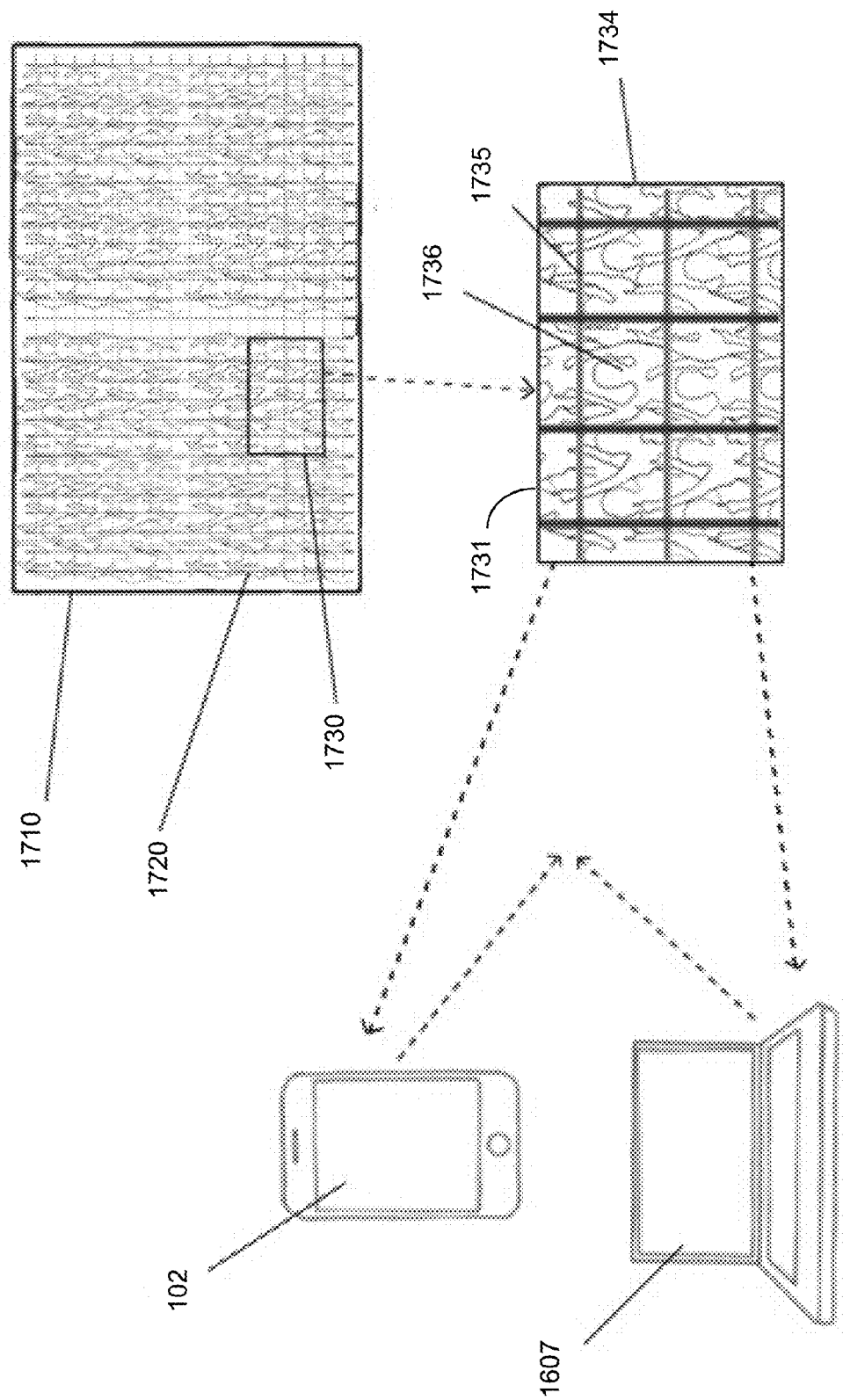
FIG. 17 shows a diagram illustrating image processing and delivery of a processed image of the disclosed technology.

FIG. 17 shows a diagram showing how the exemplary image processing software is able to send a processed image, e.g., containing a desired portion of the captured image) based on the coordinates of the image to a user device (e.g., mobile device 102 or user computer device 1607) for a particular photograph taken among the captured and processed images of the event when the user provides identification information (e.g., including the user identifies his/her position or location at the event, to allow the user to view his/her reaction captured in the image). As shown in the diagram of FIG. 17, a captured image 1710 is processed to create a grid 1720 attached or added to the captured image to provide an image recall system. For example, the captured image 1710 is labeled and is preset to attach to a specific grid, or has a specific grid attached to it. This connection of the grid occurs after the image 1710 has been taken. When the user provides identification information from his/her mobile device 102 or a computer device 1607 via a website or software application on the user device, the user's location is coded to relate to not only specific labeled images but also a part/portion 1730 of the grid that is associated with the user identification information (e.g., the user's location, such as a seat number). The portion 1730 of the image, which corresponds with a specific part of grid 1720, can be processed (e.g., segmented) to form a new processed image, shown as image 1731 in FIG. 17. The processed image 1731 includes the user 1736 and other attendees and features of the background captured in the captured image 1710 surrounding the user 1736, which represents only a specific and/or desired area of the captured image 1710 based on a selected region of the grid 1720. For example, the processed image 1731 can be segmented along the gridlines 1735 of the grid 1720 to a particular image size 1734 including a length and width and center grid of reference, e.g., such as the center grid being the grid that includes the user 1736 identified by the user-provided identification information. For example, the processed image 1731 can be produced based on the gridlines 1735 of the grid 1720 or sub-regions of the grid between gridlines 1735 based on the desired image size 1734 having the length and width and a reference point associated with the location of the user 1736 in the captured image. The processed image 1731 is sent to the user, e.g., providing an image of him/her/themselves during a key moment during the event. In some implementations, for example, another method to process and delivery the desired image includes collecting user identification information and having the user focus on a specific part of the grid 1720 using the user device 102 or 1607 to identify the user region of interest (e.g., portion 1730), e.g., such that the user is a location director. For example, the described methods can provide benefits including allowing the user to adjust the focal point and also choose the amount of image area they wish to keep in their image.

Figure 18:
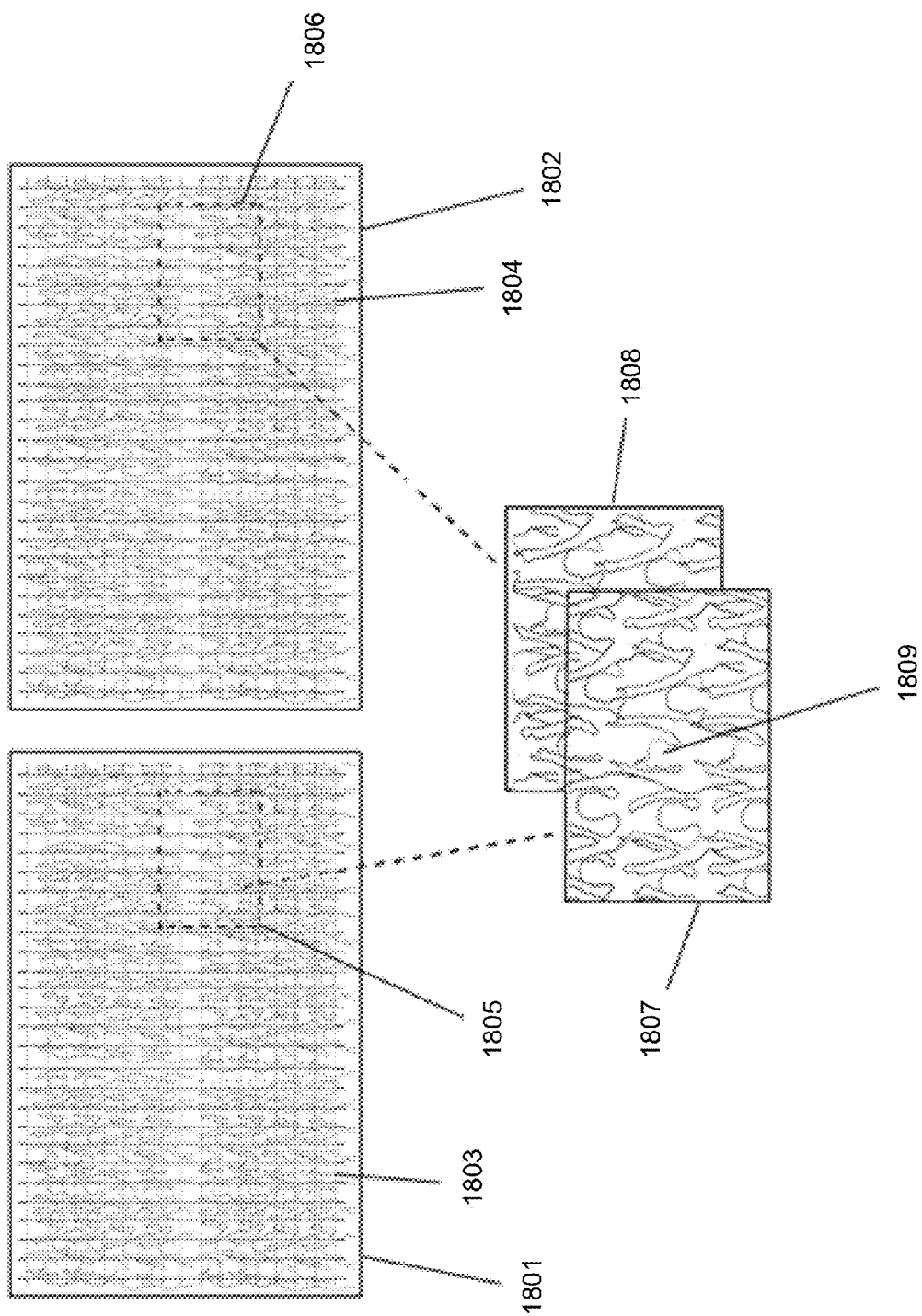
FIG. 18 shows a diagram illustrating image processing and delivery of a series of processed images of the disclosed technology.

For example, after the user has identified his/her location in the crowd, each of the sections of the processed image that he/she is in can be pooled together so that the user can quickly obtain a series of images of him/her/themselves, and thus when requested each of the processed images from the series of images can be rapidly displayed or provided to the user, e.g., on the user device. FIG. 18 shows a diagram illustrating image processing and delivery of a series of processed images of the disclosed technology. The diagram of FIG. 18 illustrates how the exemplary image processing software uses specific coordinates from two images 1801 and 1802 (e.g., from different 'moments' during the event) and pools them together so that the user can quickly access the series of images as processed images 1807 and 1808 taken of him/her throughout the event (e.g., located in the processed images 1807 and 1808 at user 1809). For example, the user 1809 can identify his/her location, and, during the event, images 1801 and 1802 are captured of the attendees of the event including the user and others surrounding the user during different moments in the event. For example, these images 1801 and 1802 could also be during the same moment, but at different times during this moment. The images 1801 and 1802 are mapped to grids 1803 and 1804, respectively, e.g., based on the predetermined locations, and segmented regions 1805 and 1806 of the images 1801 and 1802 are processed and pooled together to provide the user with the series-processed images 1807 and 1808. For example, in some implementations, the user can choose an exact focal point in image 1807 so all images processed afterwards re-orientate so that the image 1808 and after sets to the same zoom or focal point or parameters, except with different content in the images as the timings of the images would be different.

Figure 19:
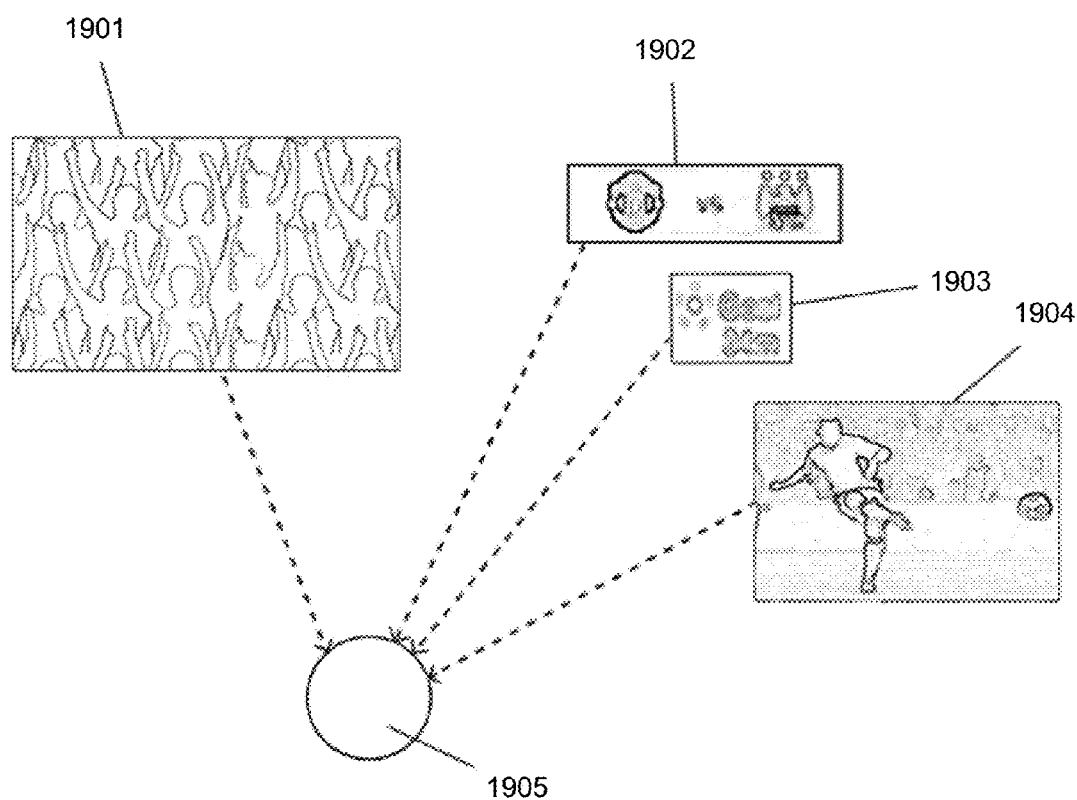
FIG. 19 shows a diagram illustrating image processing of captured images of attendees at an event combined with other content to produce processed images of the disclosed technology.

In some implementations, for example, during an event, each moment captured of the crowd can be associated with the information associated with that event. FIG. 19 shows a diagram illustrating the image processing of captured images of attendees at an event combined with other event-related content to produce the processed images. For example, the event-related content can include a visual emblem of the event, information of the moment, e.g. such as the time of occurrence, associated score or performance information, etc., which can accompany the processed image of the moment in order to relate the reaction image at such large events with the moment it was taken. As shown in the diagram of FIG. 19, an image of the crowd at a particular location in the event venue can be processed into a processed image 1901 and attached to other data including the event-related information 1902 (e.g., such as teams competing in a match, date, time, and location of the match, etc.), the moment-related information 1903, and the image 1904 of the event being witnessed by the attendees that triggered the reaction moment of the attendees captured in the image 1901. These data can all be combined as data 1905 to be recalled by a user or combined when a user recalls the images 1901. For example, these data can be combined into one image or to form a collage, or just associated with this image as meta-data to form a description.

Figure 20:
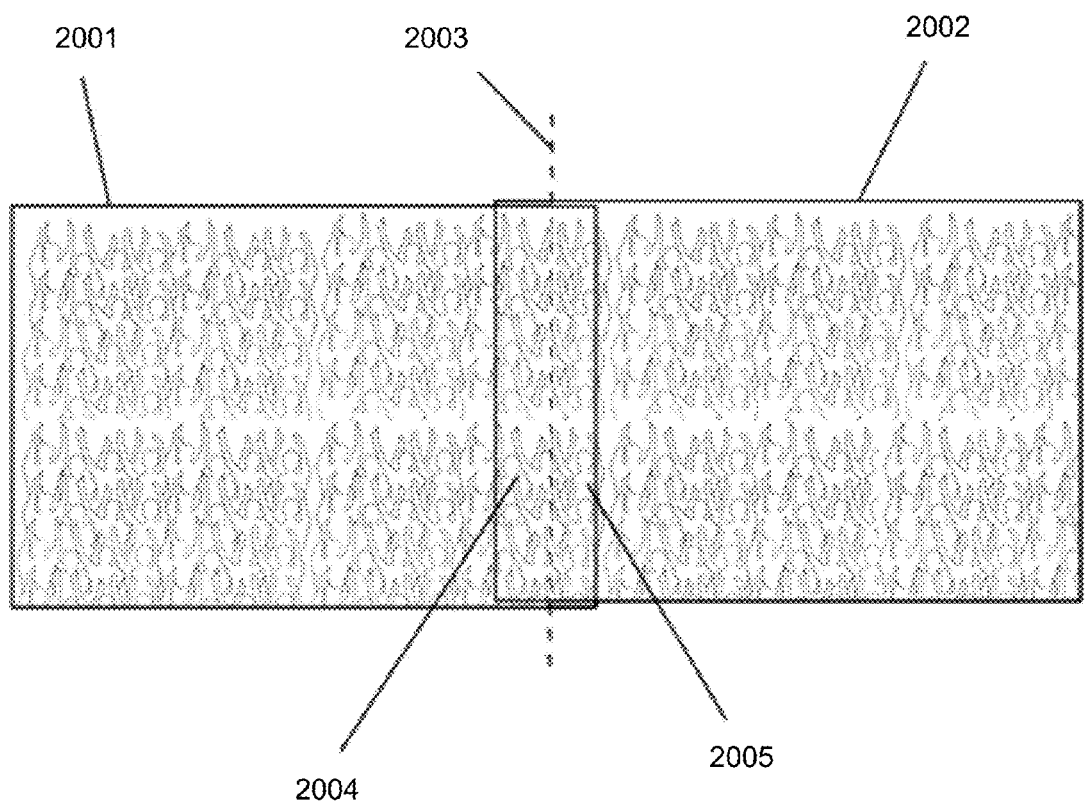
FIG. 20 shows a diagram illustrating an exemplary image capturing and processing technique of the disclosed technology for overlapping images.

For example, as each image capture module is set-up to capture images of multiple, different sections of crowd in response to a particular moment of the event, this could potentially cause some people to be cut at the edges of each photograph and therefore offer poor image quality of some attendees during that moment. The disclosed image capturing and processing technology resolves this potential issue. FIG. 20 shows a diagram illustrating an image capturing and processing technique depicting how to prevent any of the users from receiving poor quality image such as unwanted cropping of attendees at peripherals of the captured images during an image capture sequence. In some examples, the image processing technique can overlap each image taken and form a new, merged image. In other examples, the image processing technique can overlap adjacent captured images, e.g., such as adjacent captured images 2001 and 2002 in FIG. 20, and select the best image of the attendee. For example, the image capturing and processing technique can capture images 2001 and 2002 such that the imaging overlaps some of the features in the captured images (e.g., the portions of the crowd shown by the portion 2004 of image 2001 and 2005 of image 2002). For example, such features (e.g., attendees in the crowd) in portions 2004 and 2005 can have two photographs taken of them. For example, these images represent the same moment being captured but may be at slightly different times if using the same camera to capture images 2001 and 2002, or these images can represent the same moment at the same time if image 2001 is captured using a different image capture module that is synchronized to the image capturing module that captures image 2002. For example, to ensure the image being sent to the user or the location of the image the user is directed to is not cut through at the photograph edge, e.g., depending on the users location in the crowd, can include determining which image (e.g., 2001 or 2002) is used. This can be controlled by using a dividing system represented by the dotted line 2003 in FIG. 20. For example, the line 2003 can be used such that the user that is to the left of the line 2003, e.g., at a location in portion 2004, gets sent part of the image from image 2001, or directed to image 2001, so they can obtain an uncut image. If the user is located to the right of the dotted line 2003, e.g., at a location in portion 2005, then they get sent part of the image from image 2002, or directed to image 2002. Instead of using a dividing line to determine which image each location uses, the location and photograph edge could be used to choose the most appropriate image, 2001 or 2002, for example. This can done by determining which image is nearest the photograph edge depending on what location has been given. Therefore user at the location in the portion 2004 will be near the image 2002's edge so the image used will be from image 2001. Another method to determine which image to use is to have all the locations within the image portions, e.g., 2004 and 2005, predetermine specified assignments or indexing of attendee locations to the appropriate image. In such examples, therefore, the user at a location in the portion 2005 is predetermined to receive an image or location of the image from image 2002.

Figure 21:
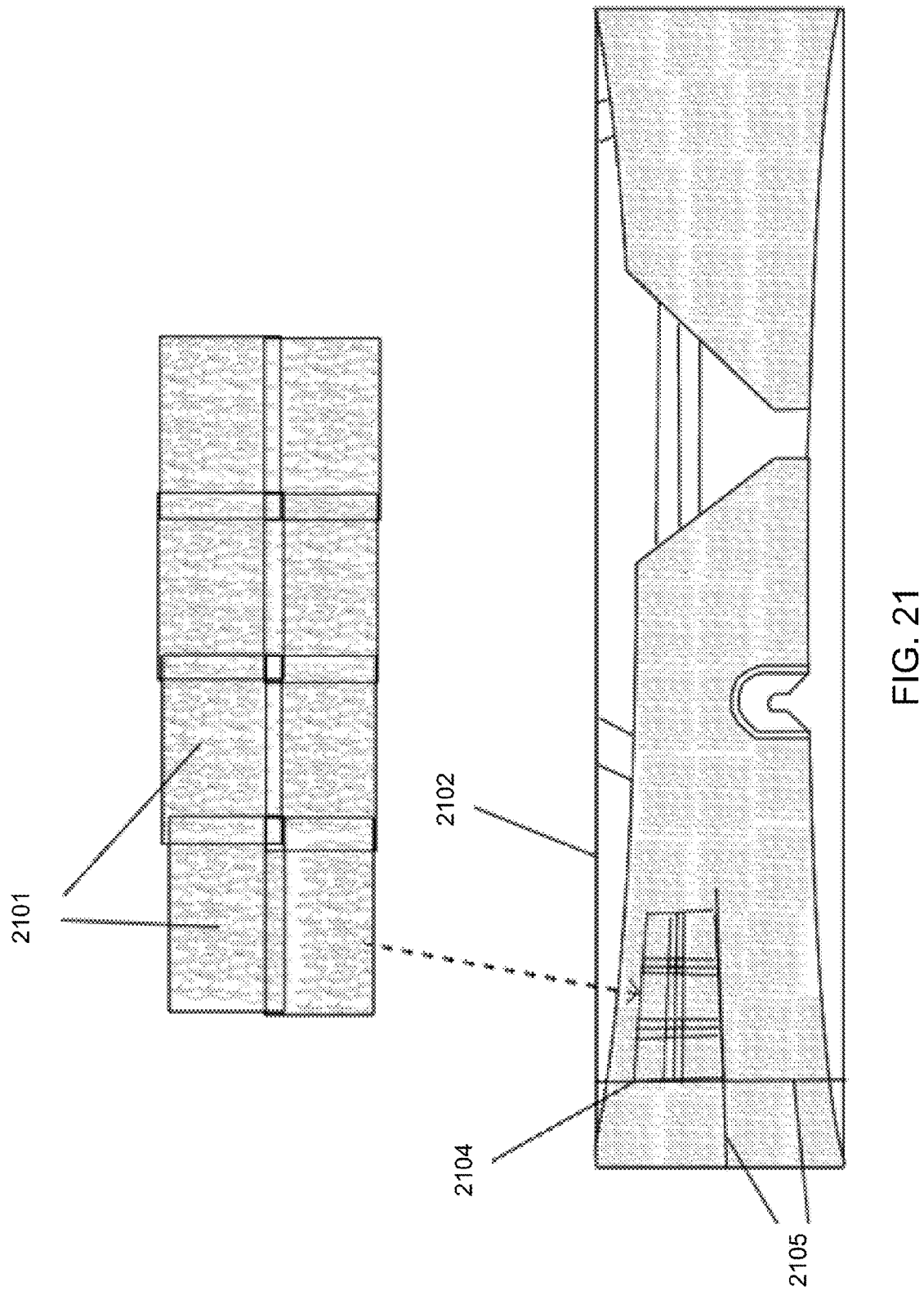
FIG. 21 shows a diagram illustrating an exemplary image capturing and processing technique of the disclosed technology for panoramic imagery.

In some implementations, for example, the image capturing and processing technique can rapidly produce a panoramic image of the crowd after specific moments using a premade panoramic image and including an overlay the specific images at particular points to fill in the crowd. FIG. 21 shows a diagram illustrating how the exemplary image processing software can overlap specific images to specific points on a premade panoramic image, which can give the impression that the whole panoramic image was taken at that specific moment the reaction images were taken. In this exemplary process, adjacent captured images 2101 are coded so that they are overlaid at specific points of the images, in which the specific points can be configured by a grid 2104 defining pre-captured images 2105 on the premade panoramic image 2102. For example, the exemplary process includes placing the new content (e.g., captured images 2101) over and/or replacing the images 2105 of the premade panoramic image 2102, which gives the impression that the full panoramic image was taken during the specific moment the individual images 2101 were taken.

Figure 22:
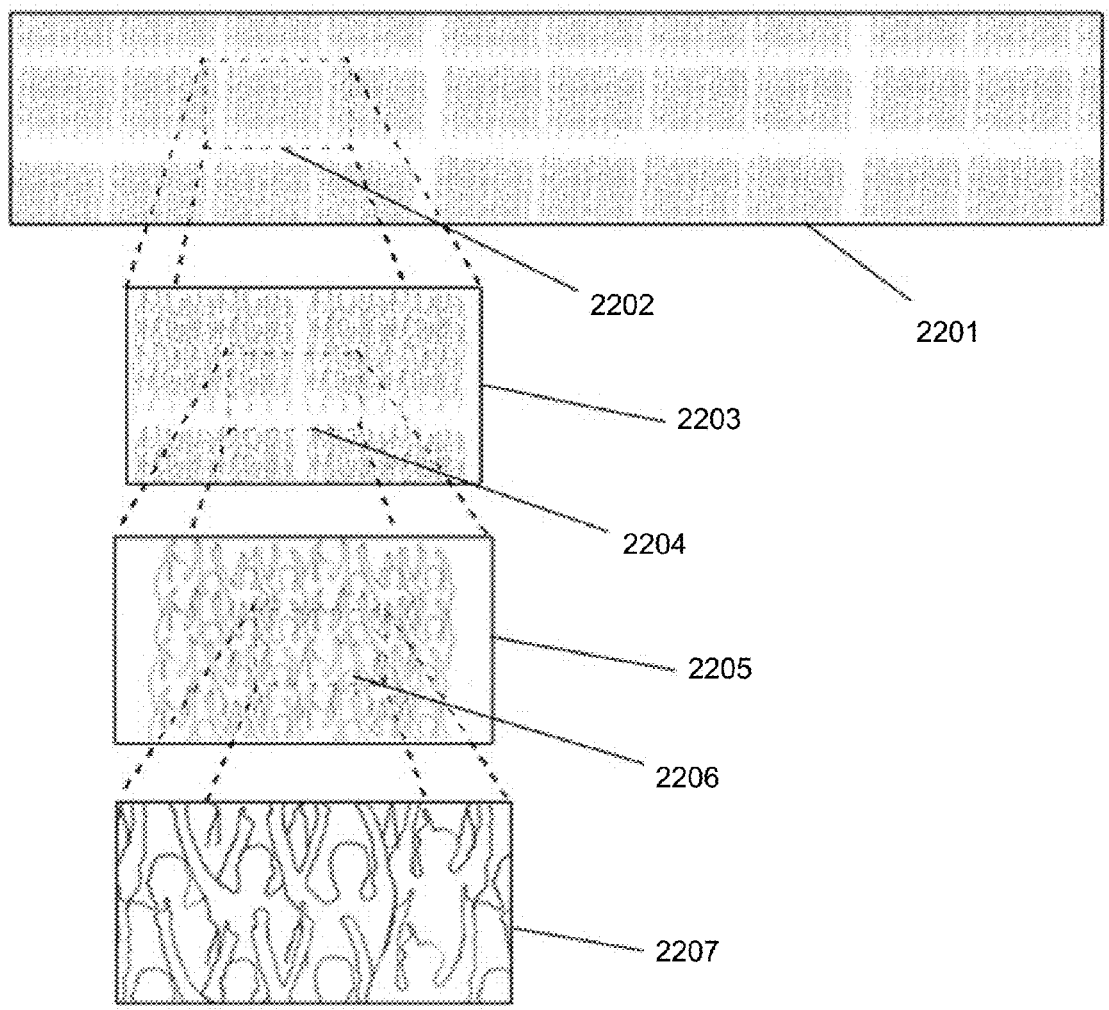
FIG. 22 shows a diagram illustrating an exemplary image processing and delivery technique of the disclosed technology for loading processed images to a mobile device.

FIG. 22 shows a diagram illustrating an exemplary image processing and delivery technique of the disclosed technology for loading processed images to a user device. For example, the diagram shows how the panoramic images can rapidly load on either a mobile device or computer when the user has identified their position at the event to obtain a rapid and fluid zooming animation. For example, a series of images 2201, 2203, 2205, 2207 can be processed and loaded to a user device, which are a sequence of processed images ranging from a wide-view full panoramic processed image 2201 to the most detailed view 2207 of the user's position at the event, but with different amounts of pixels (e.g., reduced pixel) loaded for each image. In some implementations, for example, the full panoramic image 2201 may only load at a very low resolution relative to how large that image is, and each image in the sequence that is more zoomed-in can load at a relatively higher resolution, e.g., for each subsequent image. In this example, therefore, when all images are loaded, the user is zoomed into each image portion of the previous, wider-view, e.g., such as image portions 2202, 2204, and 2206 of images 2201, 2203, and 2005, respectively, until it is replaced by the closer, higher resolution images. For example, implementation of this exemplary image processing and delivery method allows for a rapid, fluid zoom into a specific area with a lower loading time. For example, in some implementations where multiple images are taken of the attendees for a particular moment or multiple moments occur within a particular time interval, these first images in the sequence that are loaded on the user's device (e.g., the images 2201, 2203, and 2205) may be kept the same for the next moment sequence, such that only changes are in the final detailed image of the sequence, e.g., image 2207, to the appropriate reaction shot, e.g., when a user is clicking/tapping/swiping to the next image using the user device for viewing the delivered images.

Figure 23:
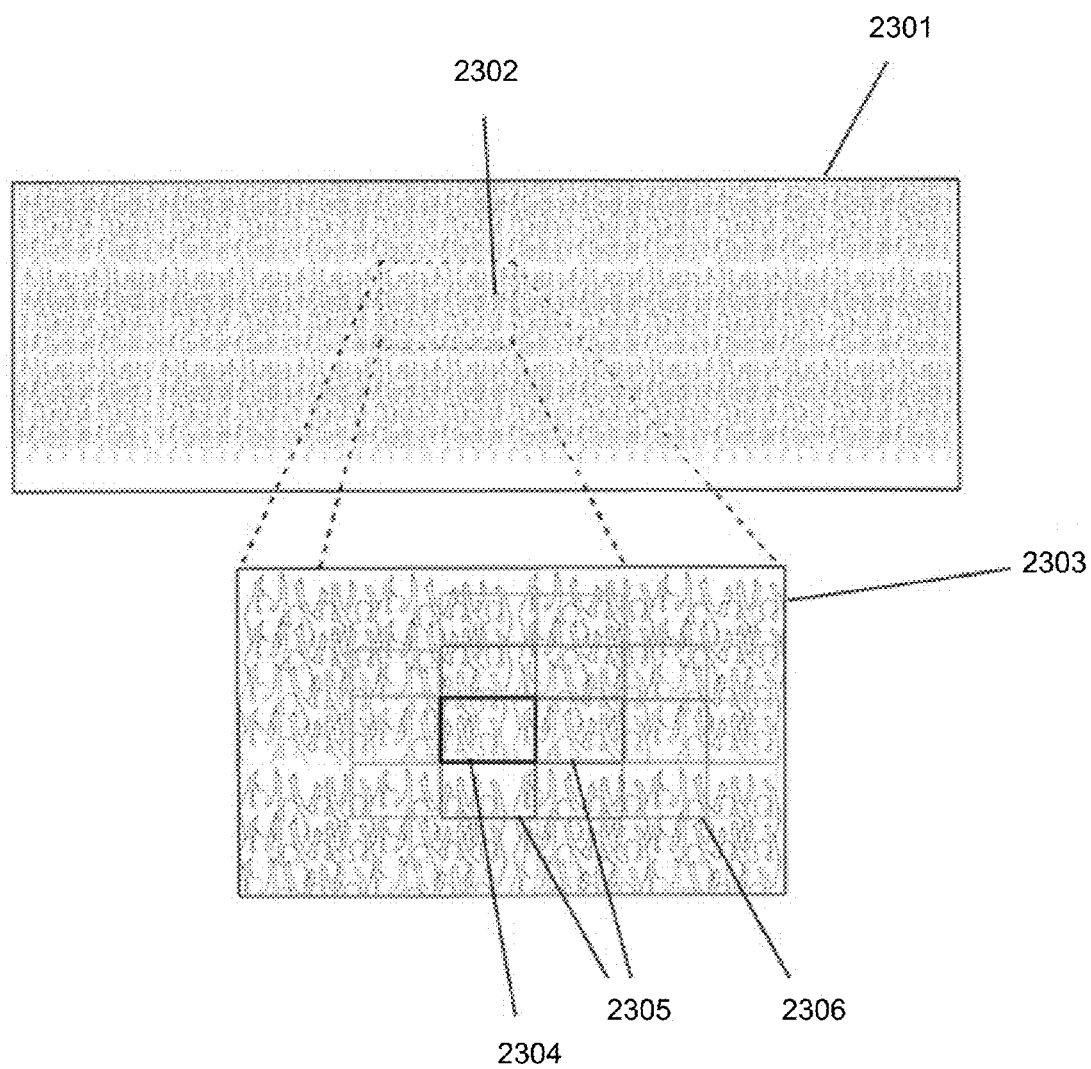
FIG. 23 shows a diagram illustrating an exemplary image delivery technique of the disclosed technology for loading processed images to a mobile device.

FIG. 23 shows a diagram illustrating an exemplary image delivery technique of the disclosed technology for loading processed images to a mobile device. For example, the diagram shows how the panoramic images can rapidly load on either a mobile device or computer by starting from a specific point in which the user has defined and then loads sections of each image around it, e.g., which can include also taking scrolling behavior into account. For example, each panoramic image 2301 can contain a large amount of data, and in addition to processing a portion 2302 of the panoramic image 2301 to form a segmented image 2303, the loading times of the segmented image 2303 and/or the entire panoramic image 2301 or portion thereof can be decreased by first loading only a specific part of the image 2303, e.g., including portion 2304, and then loading the other parts 2305 and 2306 after, etc., of the segmented image 2303. For example, the order or sequence of image parts to be loaded can take into account the behavior of the users scrolling to load the next images that are likely to be looked at next. If viewing on a mobile device, for example, each part of the image 2303, e.g., represented by the image parts 2304, 2305, and 2306, can be accessed by scrolling or swiping vertically or horizontally to view the adjacent image.

Figure 24:
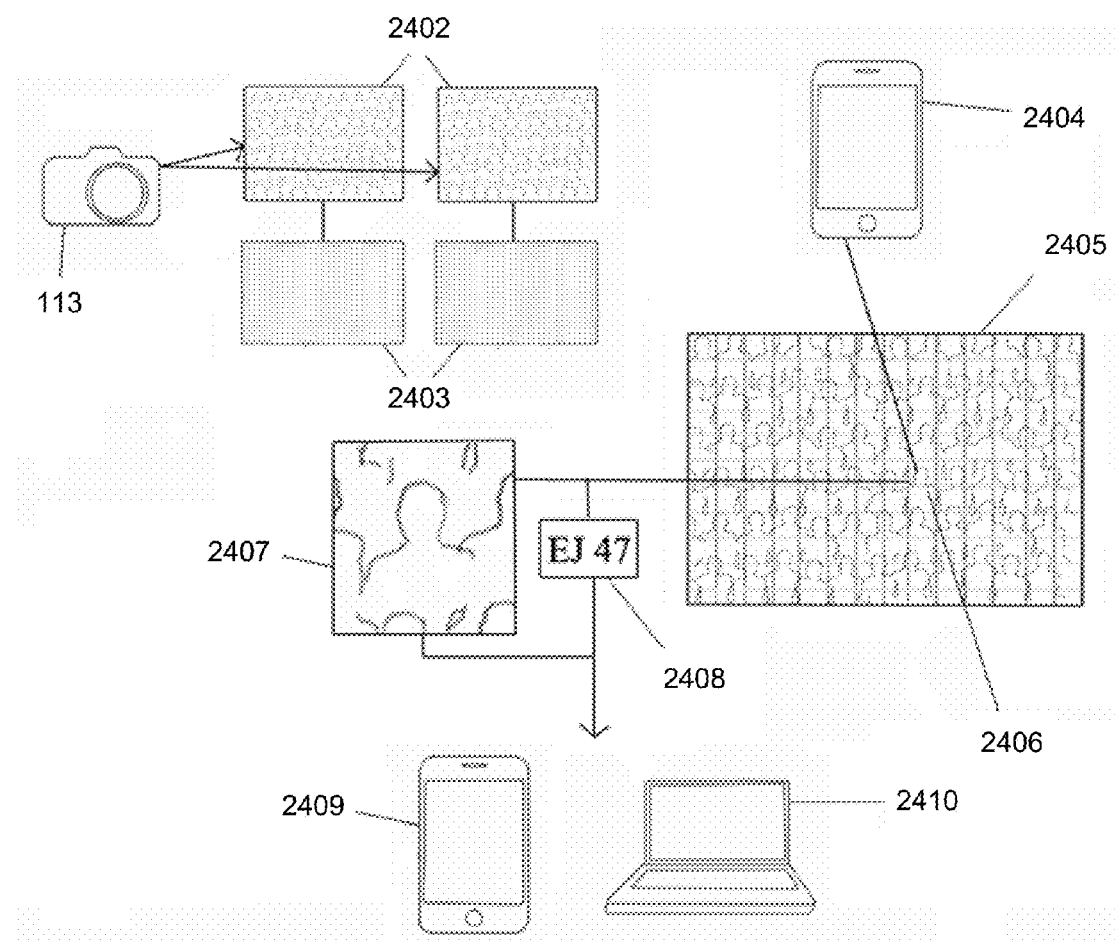
FIG. 24 shows a diagram of an exemplary image processing technique of the disclosed technology for assigning grids to captured images and used in a security system and method during an event.

FIG. 24 shows a diagram illustrating an exemplary image processing technique of the disclosed technology for assigning grids to captured images and used in a security system and method during an event. For example, the diagram shows how the captured images are assigned to grids, in which a specific part of the image is identified using a mobile device which relates to a specific part of the grid, which then sends a section of the image and grid reference to another mobile device and/or computer of the user. In some implementations of the disclosed technology, for example, the technique can be used for a crowd sourced security system, in which the images provide a virtual display of the crowd for other individuals to point out issues at the event. In this example, the camera system 113 takes a series of images 2402 which can be processed to map locations of the images to a corresponding series of specific grids 2403. For example, when an individual sees an issue (e.g., safety or security) at the event, such as with another crowd member, the individual can use an application (app) on his/her mobile device 2404 that provides the individual with the processed images (e.g., of the individual in captured moments of the event) to identify a location and/or other attendees to authorities at the event venue. For example, in addition to the images of the captured reaction moments of the attendees, the app can also provide users with images of the event venue locations and/or the user's section and/or other sections of the event venue during various instances of the event, such that the individual can view an image (e.g., image 2405 of FIG. 24) and drop an indicator on the image of the specific person 2406 that they wish to identify to the authorities. For example, the indicator can be placed directly over the disruptive/accused crowd member, in which the indicator shall determine the location of the identified crowd member based on the predetermined locations mapped in the grid. For example, the individual can use their own location as a reference to aid in the identification of the security/safety issue location by using an image with the individual in it displayed. This indicator applied by the individual can result in an image 2407 and seat number 2408 of the accused crowd member to be sent to a mobile device 2409 or computer system 2410 used by event venue staff, as well as to others including the individual him/herself.

Figure 25:
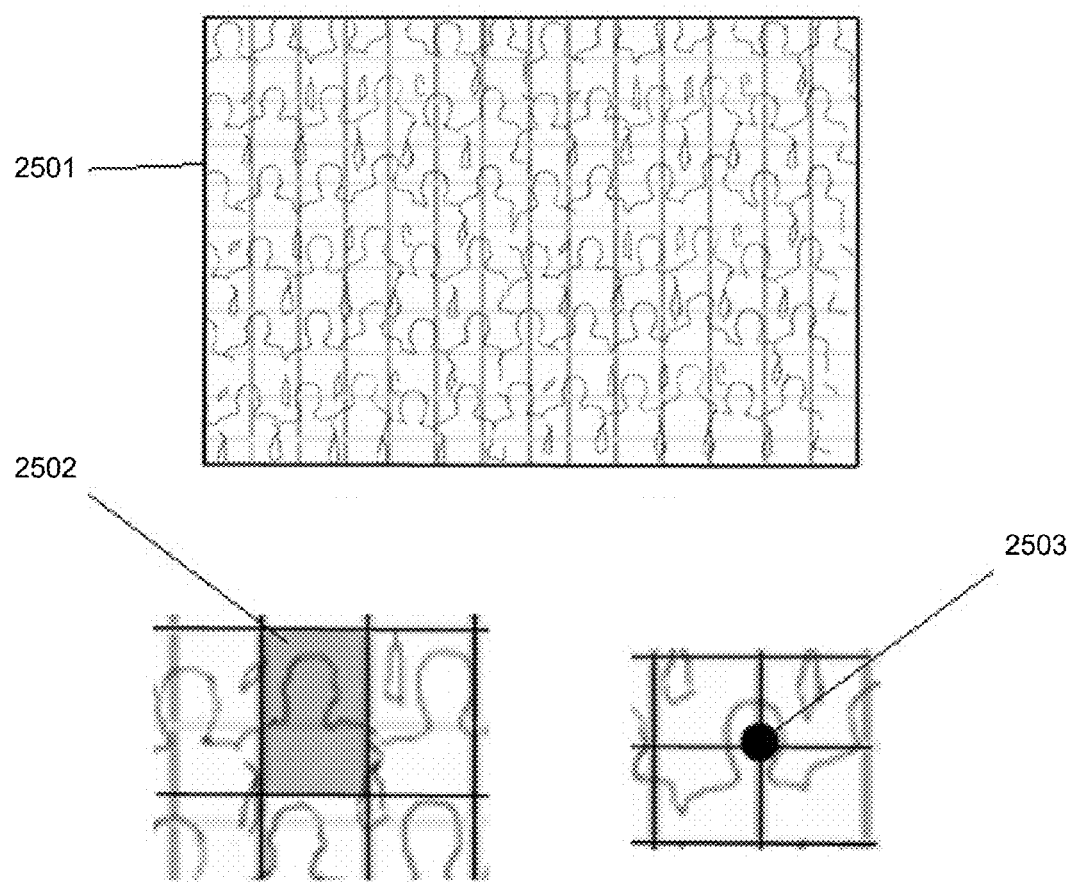
FIG. 25 shows a diagram of an exemplary security system and technique of the disclosed technology.

FIG. 25 shows a diagram of an exemplary security system and technique of the disclosed technology. For example, the diagram shows how a user identifies a crowd member by placing a marker on a processed image via an app on the user's mobile device, which corresponds to the grid by being within the marker being placed within a specific area covering the individual or the marker being closest to the nearest point which represents an individual. In this example, the indicator being dropped on the users image is assigned to a seat number. Image 2501 has a premade specific grid assigned to it, and the indicator, when dropped on the image 2501, can be assigned to the specific seat code that the indicator was dropped within a box of the grid (e.g., box 2502) or by being placed closest to the nearest point of the grid (e.g., point 2503).

Figure 26:
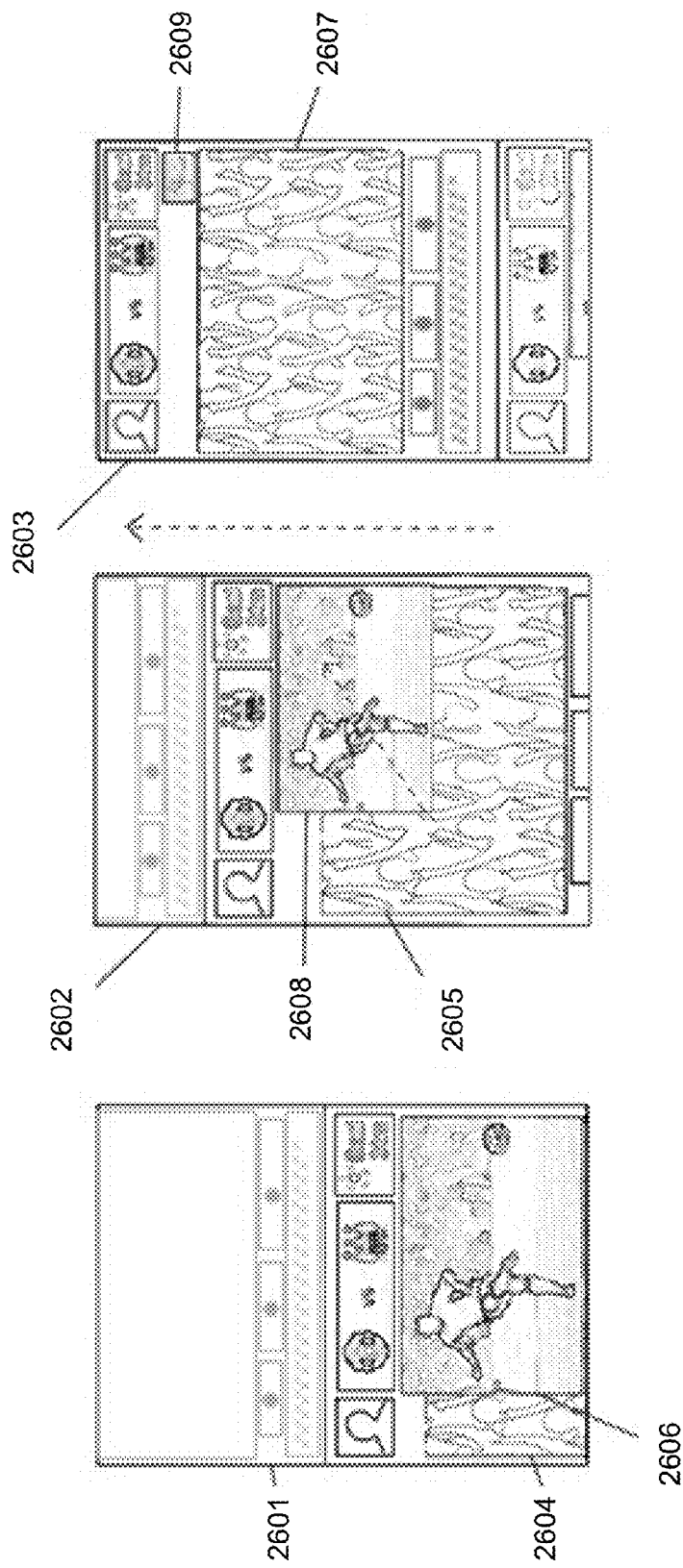
FIG. 26 shows a diagram illustrating an exemplary display including combined content.

FIG. 26 shows a diagram illustrating an exemplary display of user-provided images including event-related content combined with the attendees' reaction to a moment during the event. For example, the diagram shows how two images can interact on a newsfeed when the user is scrolling. This allows the user to view the detail of the two combined images (e.g., one of the reaction photo of the user and the other the moment in the event that caused that reaction) in a high resolution while scrolling by adjusting the size, position or clarity of one of the images. For example, the images provide the content for a social network and the interface when viewing this content, on a computer or mobile device of the user, and associates each user's photograph with information and an image of the event corresponding with it. Implementation of the disclosed technology can provide this exemplary interface that seamlessly combines the two (or more) images and information into a stream, which may require only scroll movement but displays all of this content on a small screen. In FIG. 26, image 2601, 2602, and 2603 represent a progression of how the interface interacts when the user scrolls to see more content on a feed. Image 2604, 2605, and 2607 are the same images, as are images 2606, 2608 and 2609, but at different stage of the interface movement in the images 2601, 2602, and 2603, respectively. At the first stage (image 2601) the image 2606 starts by being most prominent, in front of the image 2604; and as the user scrolls, as shown in stage two, (image 2602), the image 2608 becomes less prominent to image 2605, until stage three (image 2603) has been reached, in which image 2607 is now the most prominent as compared to 2609. For example, the adjustment of image 2606 can be reducing in size, sliding or fading so image 2604 becomes the one in view, all in one motion of scrolling by the user.

One of the main aspects of the disclosed technology is an application (app) that provides the foundation for a mobile, sports specific social network. Other functionality like navigation, security, log-in etc., that also contribute to the app experience are also detailed in a list of exemplary functional features. For example, a user may log in using Facebook credentials, Twitter, or another social network or create a new profile to access the mobile app. If a user logs in with Facebook credentials, then their friends list can be pulled in, e.g., automatically. A user may use their email, Facebook, or phone contact list to find and invite new users to the app. A user can "follow" each other to be able to view each other's photos. For example, Geo-Location feature and current date/time from users smart phone can allow the app to identify which sports game user is attending. For example, by a user entering his/her seat number, the user "checks-in" to the game and this data is saved to the user's profile. For example, by "checking-in" to a game, this allows users to browse their photos from the match. While browsing photos, users can view the metadata (e.g., touchdown, homerun, etc.) of the moment on the field, e.g., including pictures, from which the users demonstrating their reactions to that moment were photographed. For example, a user may apply different photographic filters to the user's images. For example, a user may use native multi-touch features to pinch and spread to zoom his/her photo to the desired crop. For example, a user may add a caption to their photo. For example, photos can be shared on the Feed of the app, in which these photos are visible to those contacts that follow the user. For example, photos can be 'liked', 'cheered' or 'booed' and commented on by other users. A user can share their photos on Facebook, Twitter or Instagram or other social networks if they allow permission to do so. For example, the app can provide a repository to view past photos organized by the game attended. When checked-in to a game, the result of the game (win or loss) is recorded to users profile. For example, a user profile can include a chosen profile photo, an editable text bio, and stats from the game(s) attended, including statistics personalized to the user's experience and interaction with their attendance to particular events (e.g., such as a particular team): for example, a team's and/or a user's win-loss record, win %, win streak, team win % when user attends, and team win % when user does not attend. For example, a user can have ability to use a search function that allows him/her to find event-, team- and player-specific photo content from other users who are not friends with the use of hashtags and '@' symbols. A user will be able to upload photos to the app that are from their camera roll or able to take a photo themselves. A user will be able to "drop a pin" on other fans in the venue and report them for aggressive or disruptive behavior. User will be able to set an alert, which signifies that there is an issue (e.g., regarding safety or security) in that area.

The app can be used in a variety of cases. Some examples include: marketing materials at sporting events can be used to prompt downloading of the app by the user; "checking-in" to a game can also be prompted at the game, e.g., in which "Fans, remember to check-in to the game using the app to get your free photos after the game; the app notifies the user when at an event to enter their seat number. The app can be used during games (e.g., directly after a moment of the game captured by the image capturing system), immediately after games and any time after games.

FIGS. 27-35 illustrate exemplary screen shots and displays of the user interface (UI) of the app. The exemplary app mockups contained herein reflect the desired functionality and may not represent the look of the final product.

Figure 27:
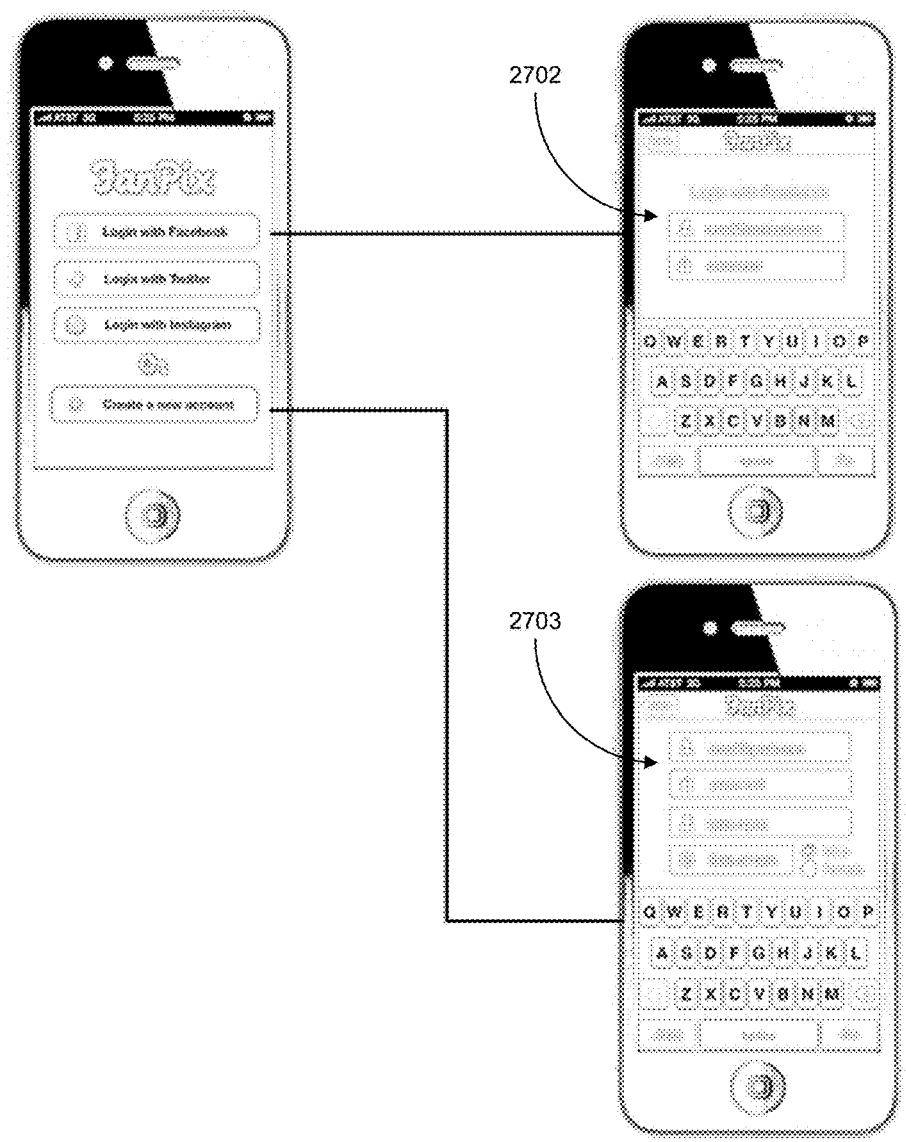
FIG. 27 shows an exemplary log-in feature of an exemplary mobile software application (app) of the disclosed technology.

FIG. 27 shows an illustration of an exemplary UI of the app depicting the log-in flow for a given user with multiple options for credentials. The upper path to the exemplary user interface 2702 shows a login using Facebook credentials, while the lower path to the exemplary user interface 2703 shows the creation of a completely new account.

Figure 28:
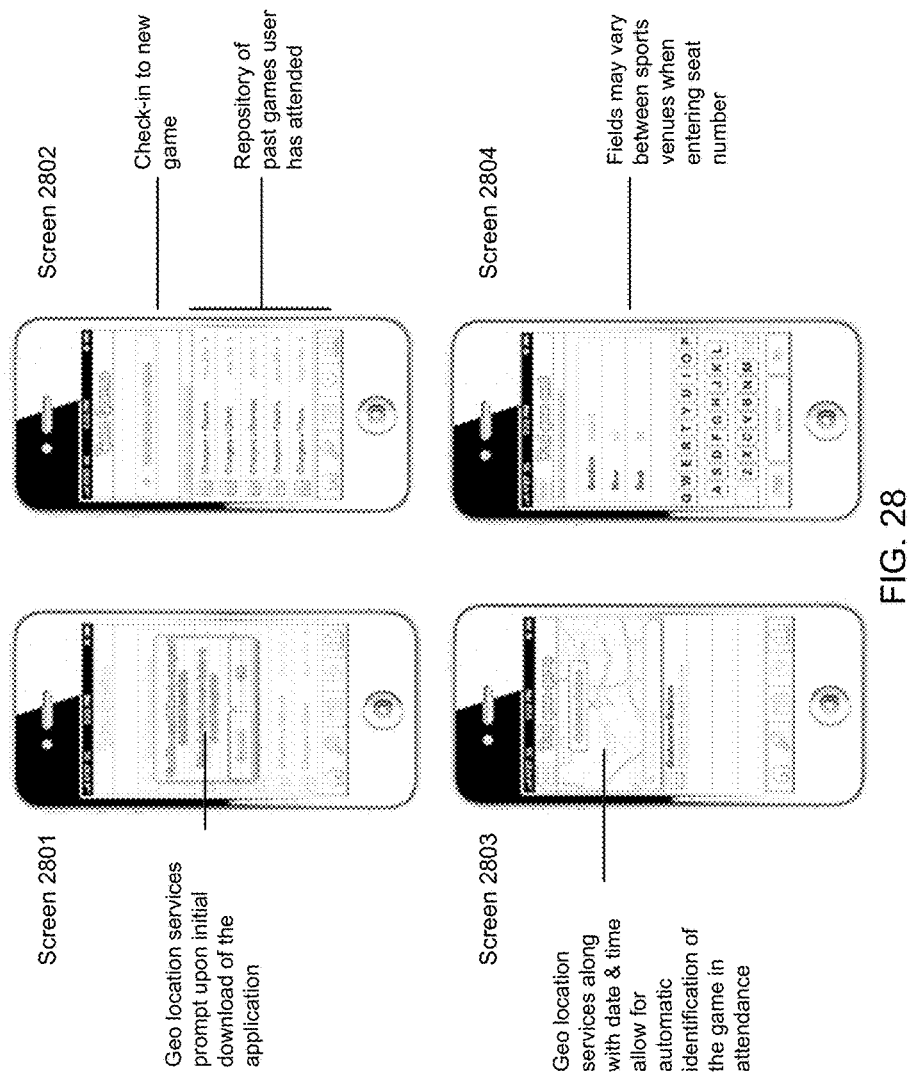
FIG. 28 shows an exemplary checking-in feature of the exemplary app.

FIG. 28 shows an illustration of an exemplary UI of the app depicting the flow of a user checking-in to a game they are attending. Moving from screen 2801 to 2802 to 2803 to 2804, the combination of geo location services and the date and time from the mobile device's internal data enable the app to identify which game the user is attending. Once checked-in, for example, that game will be saved to their profile and they are able to view the photos from the match.

Figure 29:
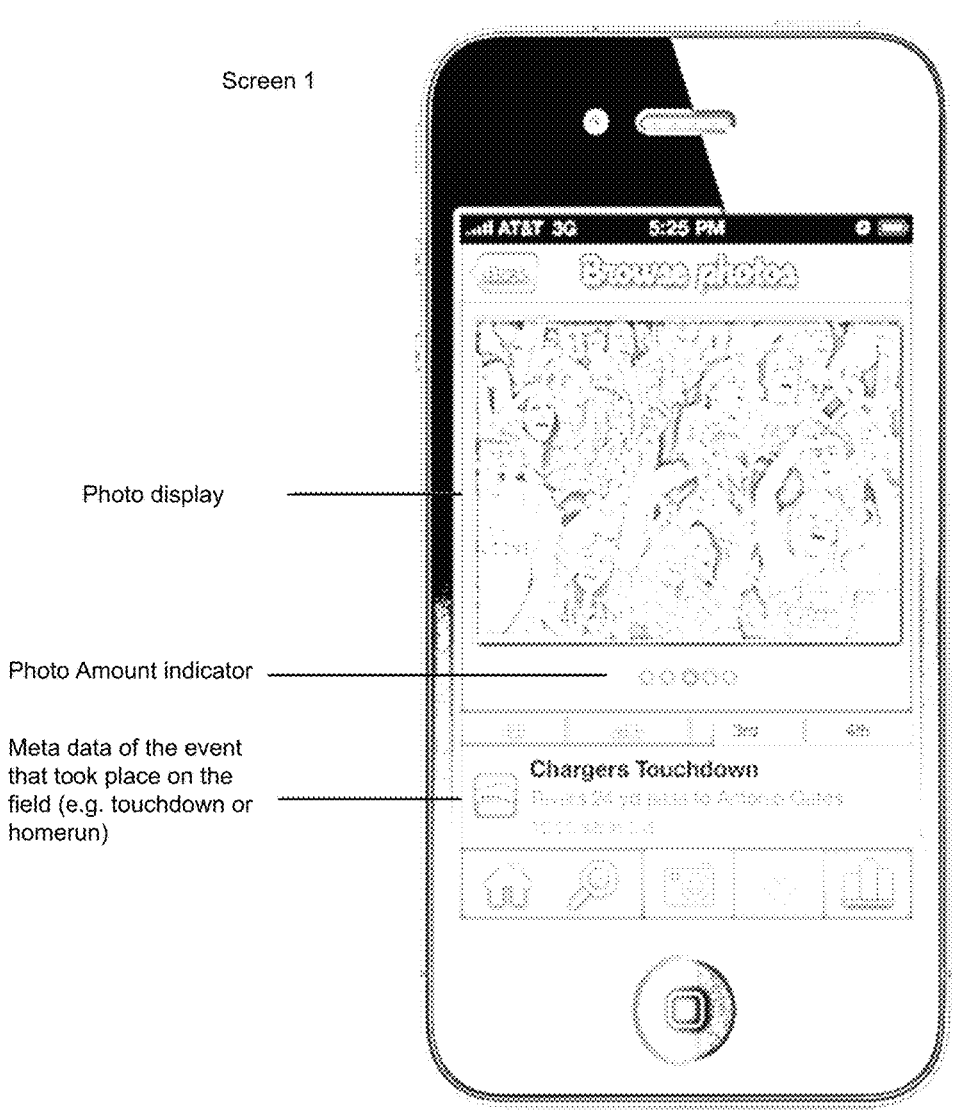
FIG. 29 shows an exemplary browsing feature to browse captured photos of the exemplary app.

FIG. 29 shows an illustration of an exemplary UI of the app depicting the browsing function after a user has checked into a game. The user photos are viewable through the main display, and swipe gestures allow the user to move between photos. There is an indicator for the amount of photos from the game along with metadata and a timeline that allows a user to identify which moment in the game it was.

Figure 30:
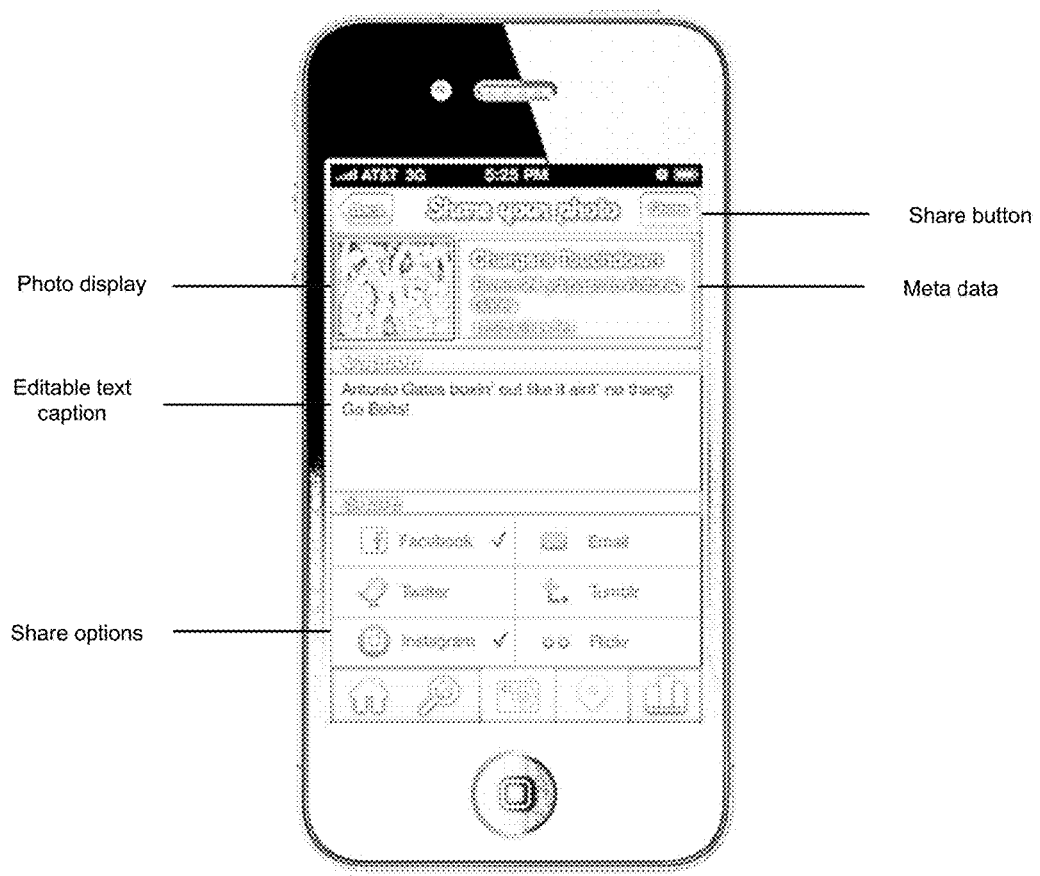
FIG. 30 shows an exemplary feature for sharing captured photos of the exemplary app.

FIG. 30 shows an illustration of an exemplary UI of the app for user sharing of one or more photos captured from the match. For example, after selecting a photo, a user may add a caption and select any additional networks to share the photo with. By default, the photo will be shared into the social network.

Figure 31:
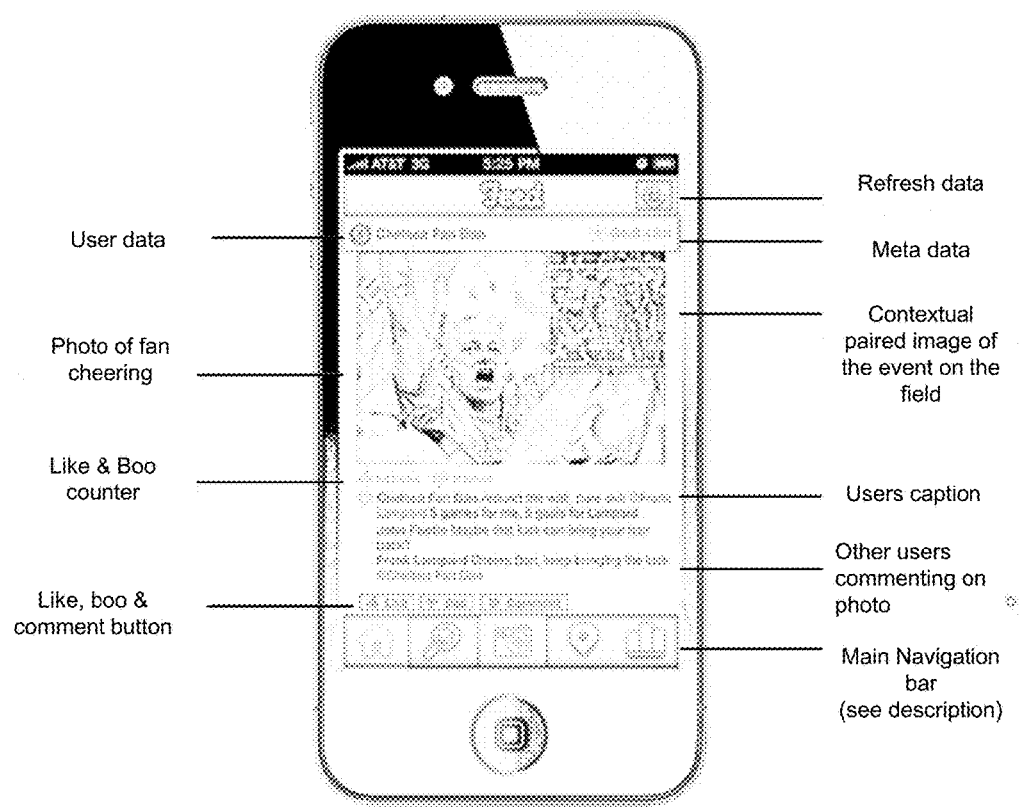
FIG. 31 shows an exemplary Fan Feed feature of the exemplary app.

FIG. 31 shows an illustration of an exemplary UI of the app depicting the Fan Feed, the main display screen of shared photos from fans and their friends. The Fan Feed can provide a primary communication medium of interaction for fans using the app, as they can see their friends' photos and have and state options to "like", "boo" or "comment" on them. For example, on the Fan Feed, data of the user and sports moment are also displayed along with a contextual image of what happened on the field while the user is celebrating.

The UI of the Fan Feed can include a persistent navigation bar, e.g., found along the bottom of the screen, which can function similar to other mobile applications as the primary means of navigation. For example, the navigation bar can include exemplary icons like those shown in FIG. 31 and described below:

Home Icon—Brings user to the "Feed" that shows all of their own and friends photos posted along w/ any associated "likes" "boos" or comments.

Magnifying Glass—Brings user to the search function to find event, team and player specific photo content from other users who are not friends with the use of hashtags and '@' symbols similar to twitter (e.g. #yankees, #homeruns, #buzzerbeater).

Camera—Brings user to a split screen that allows a swipe to choose between browsing their photos generated or taking and/or uploading their own.

Bar Graph—Brings user to their profile page that show their profile photo, bio, games attended and your accumulated stats.

Map Pin—Brings user to the "Check-in" screen to allow them to check-in to a new game.

Cog (off of the profile tab)—Access to the "Report a fan" feature along with settings for sharing, privacy, version number, legal and help menus.

Figure 32:
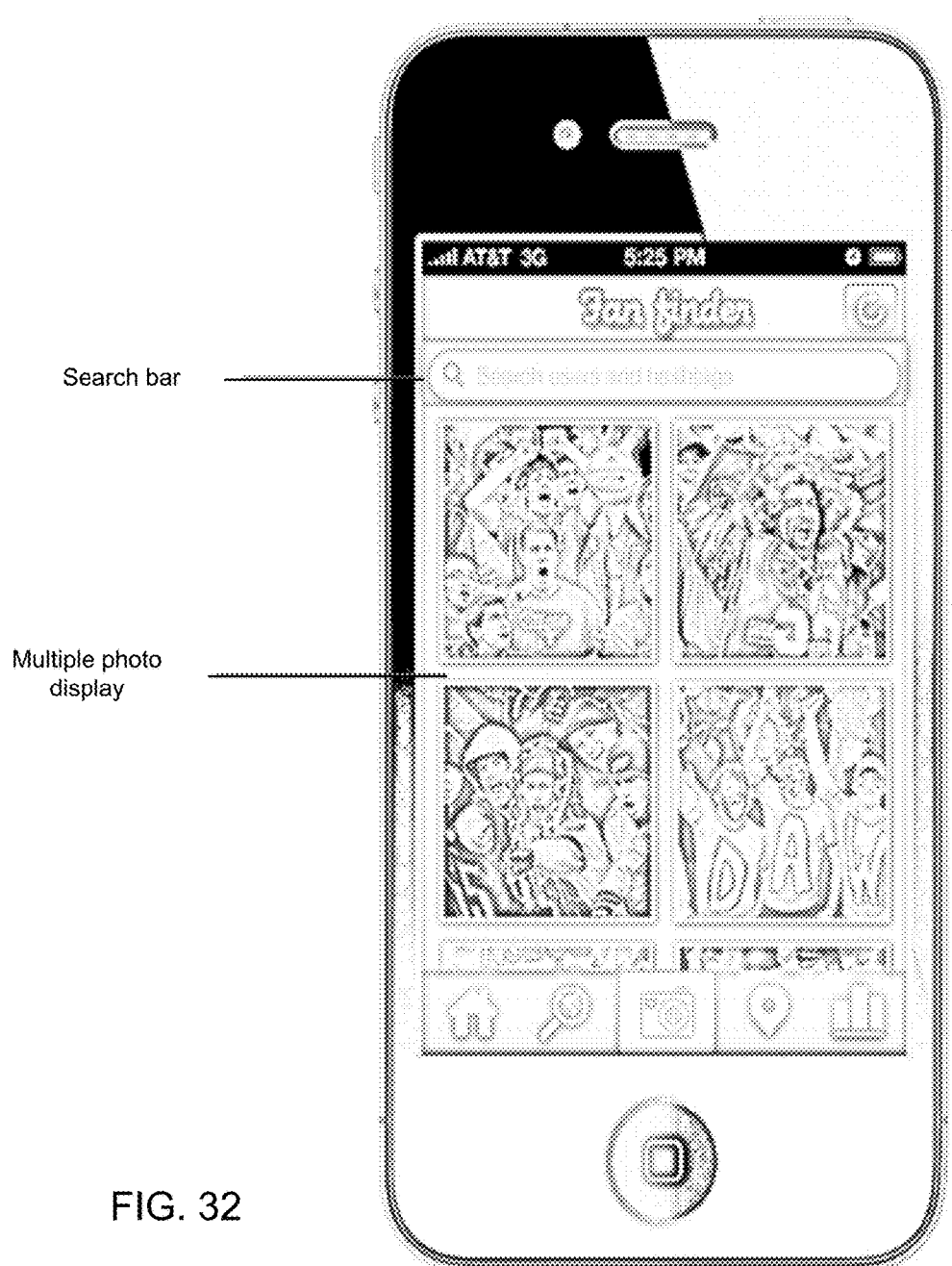
FIG. 32 shows an exemplary Fan Finder feature of the exemplary app.

FIG. 32 shows an illustration of an exemplary UI of the app depicting the Fan Finder, a way for fans to search specific events in sports. User will be able to filter by event, team and player to find specific photo content from other users who are not friends. For example, this can be done using hashtags and '@' symbols similar to twitter.

Figure 33:
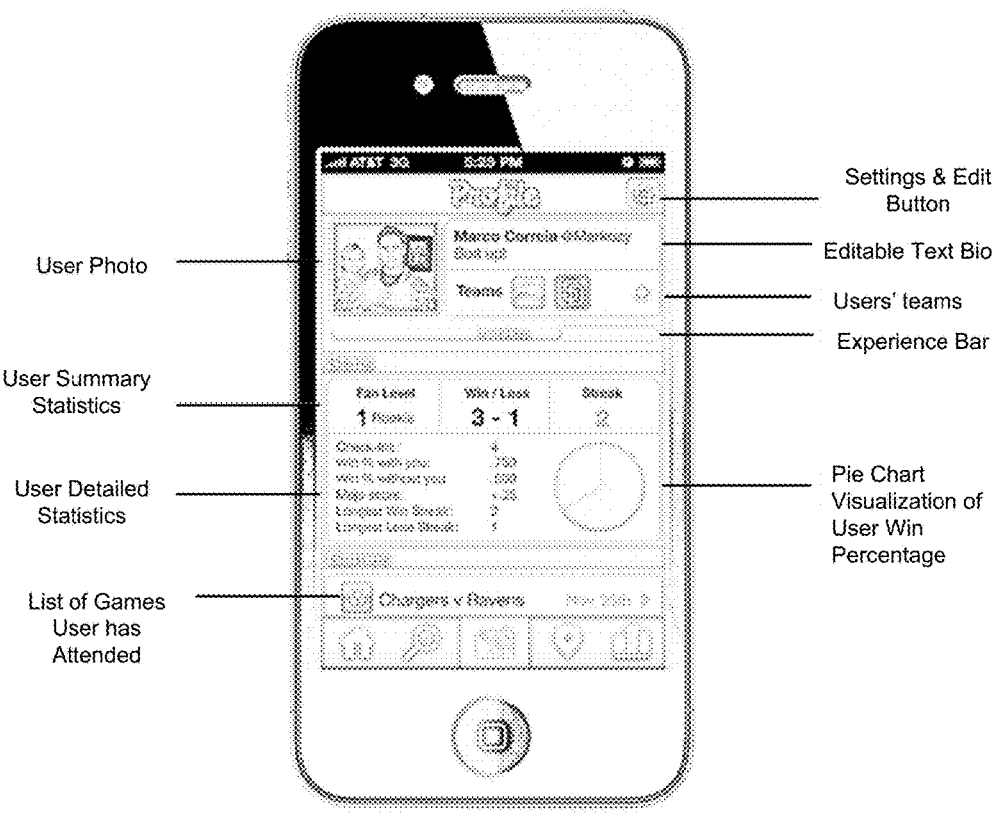
FIG. 33 shows an exemplary user profile and stat tracking feature of the exemplary app.

FIG. 33 shows an illustration of an exemplary UI of the app depicting the user profile. For example, when checked-in to a game, the result of the game (win or loss) is recorded to the user's profile so that the user can accumulate data over time. The user profile includes a user-chosen profile photo, an editable text bio, and stats from the game(s) attended: for example, a team's and/or a user's win-loss record, win %, win streak, team win % when user attends, and team win % when user does not attend. By recording stats from the game, it allows users to create a fun way to compare such information with their friends and other fans, e.g., proving to others that they are either a jinx or a good luck charm.

Figure 34:
FIG. 34 shows an exemplary professional player profiles and stat tracking feature of the exemplary app.

FIG. 34 shows an illustration of an exemplary UI of the app depicting the player profile, the profile of a professional player for a particular team or sport (e.g., in this scenario, Frank Lampard who is a European soccer star from Chelsea Football Club). With the stat tracking provided by the app via the player profile, fans can even determine their performance down to the player level. For example, in this drawing, "Chelsea Fan Dan" has seen 5 goals by Frank Lampard when he specifically attends, e.g., which is more than any other fan using the app. For example, this person can be designated as the "Luckiest Fan" when viewing a professional players profile. This data creates a more personal context for users and players to interact with each other, giving fans an extra incentive to attend matches.

Figure 35:
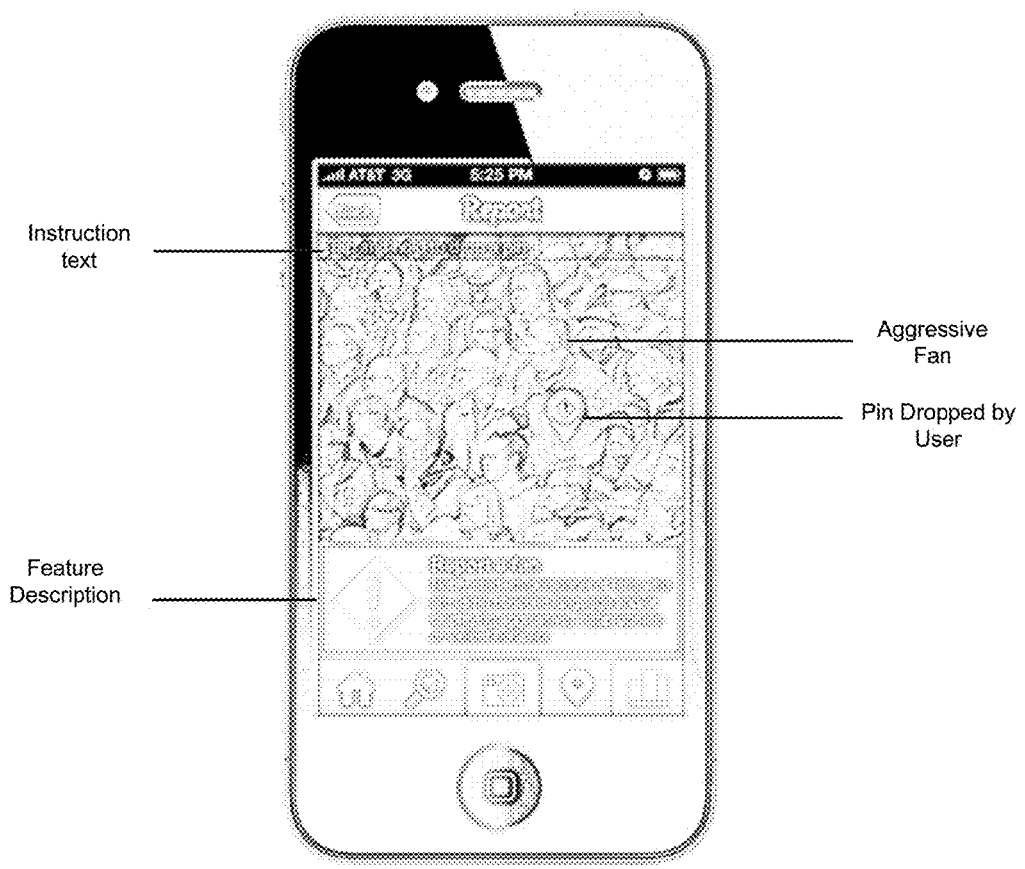
FIG. 35 shows an exemplary the fan reporting security feature of the exemplary app.

FIG. 35 shows an illustration of an exemplary UI of the app depicting the "Report a Fan" feature, which allows users to anonymously report aggressive or disruptive behavior. When a fan is checked-in, they are able to view their seat location as well as those sections adjacent to it. For example, if there happens to be a fan that is using obscene language or disrupting the experience in any way, a fan can "drop a pin" on this person and it will notify stadium personnel. For example, the exemplary feature can be implemented as a form of an anonymous 'neighborhood watch' for a sports venue. For example, stadium personnel would be able to see if there are multiple tags in a certain section of the stadium and send extra security to observe and assess the situation. This feature may help to deter bad behavior by attendees at events. For example, an image and seat number of the tagged fan can be saved and sent to the appropriate devices.

The exemplary app features described here are also for a website based interface.

For example, in some implementations, each image that is shared on a social network can be configured to a link to an external website added to it. This can allow for various brands to advertise in conjunction with the image content produced. For example, these links can be adjusted according to the users data, the event the image was taken at, the moment the image was of and the time the image was shared.

For example, in some implementations, the app can also include an option to purchase hard copy versions of the image content generated.

In some aspects, for example, a method for image capture and delivery to one or more attendees at an event can include capturing images the attendees in a crowd while they are viewing the event at the venue, in which the images captured are during the attendees emotional reaction to exciting moments during the event, and the reaction images are captured using one or more cameras which are in communication with a data processing system (e.g., server or servers). The attendee can provide information about their location at the venue to a server so when the reaction images are captured and processed, a specific image or set of images of the attendees reaction to the event moment are sent to the attendee. The cameras capture the entire crowd during reaction image capture, the location information can be used to recall images, in which the images can be sent or made available to the attendee during the event, and the reaction images can be accessed on a mobile or personal device via an application or website.

In some aspects, for example, a method for capturing and processing crowd images, in which the images of a crowd are of them reacting to an instance during an event at a venue, e.g., using an unmanned robotic camera system, can include the following. Images can be captured during specific moments of the crowds' reaction, in response to an instance in the event, which triggers the image capture sequence. The imaging sequence can be calibrated prior to the event and the positions are stored on the server. The robotics can include electric motors to provide multiple axis camera movement. Servers are in communication with the camera and movement robotics, for example, in which the server can be part of each camera unit and/or, for example, the server can be at the event venue or remote, The camera can be configured to pre-defined movement positions calibrated, and this sequence can be stored on a server and applied to the robotics when triggered. The robotics can move the camera to each position in the sequence to capture an image of a crowd area at each pre-defined position. The method can include capturing images in short periods of time between each image taken, e.g., capturing at least two images per second. The robotics can stop the camera to capture the image at each pre-defined position in the imaging sequence. The robotics can capture images while the robotics are still moving the camera for the imaging sequence. The robotics can slow down the robotics moving the camera to capture the image at each pre-defined position in the imaging sequence when there is slower movement. For example, during the image capture sequence, the image capture on the camera can be triggered when the camera has reached its pre-defined position. For example, during the image capture sequence, the image capture on the camera can be triggered when the camera has reached its pre-defined position and is stable using a feedback mechanism. For example, once the image has been captured, the camera feedback can relay a message to the server which triggers the robotic motors to move the camera to the next pre-defined position in the sequence to capture the next image. This continues through the series of images in the sequence. For example, for each capture position, the focus value on the camera can be preset so that the correct focus value is driven to the camera as it is moving to each position. In some examples, the focus drive on the camera can be controlled by sending information to the camera by the server. In some examples, the focus drive on the camera can be controlled manually by sending information from the server to an electric motor that drives the camera lens to a pre-defined value associated with its image capture position. Once the sequence is complete, the camera position is set at its next position, ready to be triggered in the next instance during the event that causes a crowd reaction.

In some aspects, for example, a method for capturing a calibrated sequence of images of a crowd and processing the images, in which the images of the crowd are of them reacting to an instance during an event at a venue, can include the following. For example, each image of the calibrated sequence can be used as a reference to define an image space within the larger captured image that corresponds to a potential attendee location. For example, this image space can be an iterative cropped area of the larger image. For example, a series of image spaces can be defined in each image to create an index that will represent a series of attendee locations during an event. For example, this index can later be applied to a captured image during the event to produce a series of smaller individual images that were part of the larger captured image, these are specific to the individual image space of an attendee. For example, the image processing can occur after the images are captured and using pre-defined information/index/mapping. For example, the attendee can provides his/her location information (e.g., including seat assignment), which can be used as the location to process the series of specific images of attendee at the event. For example, the location information can be manually entered by a user via a website, mobile device or computer application, or other. For example, the location information can be obtained automatically from a mobile device using geo-location. For example, each image space can be labelled, and the pre-defined label can be added to each image once captured. For example, the attendee location information can be assigned to the image space label so this image can be delivered to each attendee. For example, the attendees can be sent their individual images via a website, mobile device or computer application, or directly, etc. For example, the servers can be used to process the images either at the venue or remotely.

In some implementations, for example, a triggering system can be used to capture the images of the crowd reacting to an instance during the event, in which the triggering system is communicatively coupled to the image capture system. For example, the trigger can initiate due to an instance during the event, e.g., caused by an audio, visual, or mechanical perturbation stimulus. For example, all camera units in the venue can be triggered to capture images from the same trigger instance. For example, the trigger can include a manual trigger from an operator in communication with a server. For example, the trigger can be automatic, triggered by a sound, e.g., such as threshold decibel level or sound profile. For example, the trigger can be automatic from another detection system such as a visual or paired system. For example, the trigger can be based on emotions displayed in the crowd, based on a movement threshold of the crowd monitored by the cameras, and be used to identify the best images if they are being continually captured.

In some aspects, a method of image processing and delivery of images of a crowd, in which the captured images are of the crowd reacting to an instance during an event at a venue, can include associating with the captured images information used to describe the instance or moment that the crowd is reacting to at the event. For example, this information can be text or images; this information can be pre-constructed or added during the event after each instance; this information is added to the image as metadata; and/or this information can be overlaid on the attendees cropped individual image.

In some aspects, a method of image processing and delivery of images of a crowd, in which the captured images are of the crowd reacting to an instance during an event at a venue, can include using lighting that is focused on the areas of crowd being captured (e.g., such as at a dark venue). For example, the lighting system can emit light in pulses and timed with the image capture sequence. For example, the lighting system can move its focus with the image sequence movement. For example, the lighting system movement or pulsing can be connected to the camera, server with feedback more movement or light pulsing/flashing. For example, the lighting system can be implemented to remain static while being reflected in a mirror to focus on the crowd being captured.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for providing an image of attendees at an event, comprising:
   operating one or more image capturing devices to record images of attendees of an event situated at locations in an event venue;
   processing the images, the processing including:
      mapping the locations to a grid including coordinates corresponding to predetermined positions associated with the event venue,
      defining an image space containing an individual at a particular location in the event venue based on the coordinates, and
      forming a processed image based on the image space; and
   distributing the processed image to the individual in real time during the event, the distributing including:
      identifying the event the individual attended based on geolocation information of a mobile device of the individual;
      receiving a confirmation from the mobile device of the individual that the individual checks-in to the event; and
      transmitting the processed image to the mobile device of the individual.

2. The method of claim 1, wherein the event venue includes at least one of a stadium, an arena, a ballpark, an auditorium, a music hall, an amphitheater, a building to host the event, or an outdoor area to host the event.

3. The method of claim 1, wherein the attendees include fans or spectators at a sporting event.

4. The method of claim 1, wherein the predetermined positions include seating in the event venue.

5. The method of claim 1, wherein the operating includes manually triggering the one or more image capturing devices to record the images at an operator-selected instance based on an occurrence of the event.

6. The method of claim 1, wherein the operating includes automatically triggering the one or more image capturing devices to record the images based on at least one of sound, visual stimulus, or mechanical perturbation generated at the event venue.

7. The method of claim 1, wherein the operating includes temporally capturing a series of images of the attendees after one of a manual triggering or an automatic triggering of the one or more image capturing devices.

8. The method of claim 7, wherein the series of images are captured at a speed of at least two images per second.

9. The method of claim 7, wherein the one or more image capturing devices are automated to record the images by continuously panning in one or both of horizontal and vertical directions along a predetermined trajectory to capture the series of images with a predetermined focusing of the locations in the event venue.

10. The method of claim 7, wherein the one or more image capturing devices are automated to record the images by moving to and stopping at a plurality of imaging positions along a predetermined trajectory to capture the series of images while stopped at the corresponding imaging position, wherein the one or more image capturing devices are configured to have a predetermined focusing of the locations in the event venue.

11. The method of claim 1, wherein the one or more image capturing devices are configured to have a predetermined focusing of the locations in the event venue.

12. The method of claim 1, wherein the forming the processed image based on the image space includes producing a segmented image.

13. The method of claim 12, wherein the producing the segmented image includes cropping at least one of the recorded images to a size defined by the image space.

14. The method of claim 13, wherein the producing the segmented image further includes overlapping two or more of the recorded images to form a merged image.

15. The method of claim 1, wherein the distributing includes wirelessly transmitting the processed image to a mobile device of the individual.

16. The method of claim 15, further comprising producing a graphical user interface on the mobile device to present the processed image to the individual.

17. The method of claim 16, wherein the graphical interface further presents event-related content with the processed image.

18. The method of claim 17, wherein the event-related content includes one or both of information associated with the event and an image of an occurrence of the event, the occurrence temporally corresponding to the processed image.

19. The method of claim 16, wherein the graphical interface includes an interface to report a security-related incident to authorities at the event venue.

20. The method of claim 1, wherein the processing the images further includes attaching meta data with image data of the processed image.

\* \* \* \* \*